United States Patent [19]
Dent

[11] Patent Number: 6,157,811
[45] Date of Patent: Dec. 5, 2000

[54] CELLULAR/SATELLITE COMMUNICATIONS SYSTEM WITH IMPROVED FREQUENCY RE-USE

[75] Inventor: Paul W. Dent, Stehags, Sweden

[73] Assignee: Ericsson Inc., Research Triangle Park, N.C.

[21] Appl. No.: 08/602,707

[22] Filed: Feb. 16, 1996

Related U.S. Application Data

[62] Division of application No. 08/442,648, May 16, 1995, abandoned, which is a division of application No. 08/799,953, Jan. 11, 1994, Pat. No. 5,619,503.

[51] Int. Cl.$^7$ ........................................... H04B 7/185
[52] U.S. Cl. ................................. 455/12.1; 455/21
[58] Field of Search ............................ 455/12.1, 13.1, 455/13.2, 13.3, 13.4, 15, 20, 21, 22, 23, 24, 427, 428

[56] References Cited

U.S. PATENT DOCUMENTS

| | | |
|---|---|---|
| 3,789,142 | 1/1974 | Shimasaki et al. . |
| 3,917,998 | 11/1975 | Welti ............................................ 332/3 |
| 3,925,782 | 12/1975 | Andrel et al. . |
| 3,963,990 | 6/1976 | DiFonzo . |
| 4,105,973 | 8/1978 | Arnold et al. . |
| 4,145,573 | 3/1979 | Arnold . |
| 4,228,401 | 10/1980 | Wachs et al. .............................. 455/22 |
| 4,228,538 | 10/1980 | Scharla-Nielsen et al. . |
| 4,259,741 | 3/1981 | Kawai . |
| 4,425,639 | 1/1984 | Acampora et al. . |
| 4,450,582 | 5/1984 | Russell ...................................... 455/12 |
| 4,513,447 | 4/1985 | Carson . |
| 4,752,967 | 6/1988 | Bustamante et al. . |
| 4,811,421 | 3/1989 | Havel et al. . |
| 4,825,172 | 4/1989 | Thompson . |
| 4,831,619 | 5/1989 | Rosen . |
| 4,876,737 | 10/1989 | Woodworth et al. . |
| 4,882,588 | 11/1989 | Renshaw et al. . |
| 4,901,310 | 2/1990 | Ichiyoshi . |
| 4,907,003 | 3/1990 | Marshall et al. . |
| 4,931,802 | 6/1990 | Assal et al. . |
| 5,001,776 | 3/1991 | Clark . |
| 5,025,485 | 6/1991 | Csongor et al. . |
| 5,073,930 | 12/1991 | Green et al. . |

(List continued on next page.)

OTHER PUBLICATIONS

"*Basic Array Theory*", Wolgana H. Kummer, Life Fellow, *Proceedings of the IEEE,* vol. 80, No. 1, pp. 127–140, Jan. 1992.
"*Adaptive Processing Array Systems*", William F. Gabriel, Life Fellow, *Proceedings of the IEEE,* vol. 80, No. 1, pp. 152–162, Jan. 1992.
"*An Adaptive Array for Mobile Communication Systems*", Sören Anderson et al, *IEEE Transactions on Vehicular Technology,* vol. 40, No. 1, pp. 230–236,, Feb. 1991.
"*Analysis of Modified SMI Method for Adaptive Array Weight Control*", Ronald L. Dilsavor et al., *IEEE Transactions on Signal Processing,* vol. 41, No. 2, pp. 721–726, Feb. 1993.
"*Request for Pioneer's Preference*", Filed May 4, 1992 before the Federal Communications Commission, Washington, D.C. 20554, 24 pages, Docet No. 90–314.
Appendix A, "*Appendix to Request of Spatial Communications, Inc. for a Pioneer's Preference in the Licensing Process for Personal Communication Services*", Implementing SDMA in the PCS Environment Technical and Economic Factors; Appendix B, Spatial Communications, Inc. Corporate Resume; and Appendix C, Declaration of Dr. Richard H. Roy.

(List continued on next page.)

*Primary Examiner*—Thanh Cong Le
*Attorney, Agent, or Firm*—Burns, Doane, Swecker & Mathis, L.L.P.

[57] ABSTRACT

Radiocommunication systems and methods for minimizing co-channel interference are disclosed. The systems and methods are applicable to, for example, landmobile communications, satellite communication systems and hybrids thereof. Signal processing using matrix models of received and transmitted signals provides for minimized interference.

16 Claims, 39 Drawing Sheets

U.S. PATENT DOCUMENTS

| | | | |
|---|---|---|---|
| 5,111,534 | 5/1992 | Benner | 455/33.2 |
| 5,119,504 | 6/1992 | Durboraw, III | 455/54.1 |
| 5,121,391 | 6/1992 | Paneth et al. . | |
| 5,125,100 | 6/1992 | Katznelson . | |
| 5,134,417 | 7/1992 | Thompson . | |
| 5,161,248 | 11/1992 | Bertiger et al. | 455/17 |
| 5,191,594 | 3/1993 | Argo et al. | 375/1 |
| 5,204,874 | 4/1993 | Falconer et al. . | |
| 5,247,702 | 9/1993 | Su et al. . | |
| 5,249,181 | 9/1993 | Wang et al. | 370/60 |
| 5,280,472 | 1/1994 | Gilhousen et al. . | |
| 5,303,393 | 4/1994 | Noreen et al. | 455/3.2 |
| 5,343,512 | 8/1994 | Wang et al. | 379/59 |
| 5,355,138 | 10/1994 | Cances et al. . | |
| 5,363,428 | 11/1994 | Nagashima | 379/58 |
| 5,394,560 | 2/1995 | Kane . | |
| 5,398,247 | 3/1995 | Delprat et al. . | |
| 5,455,960 | 10/1995 | Pelchat et al. | 455/21 |
| 5,471,647 | 11/1995 | Gerlach et al. . | |
| 5,473,601 | 12/1995 | Rosen et al. . | |
| 5,812,947 | 9/1998 | Dent | 455/427 |

OTHER PUBLICATIONS

"*Final Report of Study on Digital Beamforming Networks*", (European Space Agency Contract Report), A. D. Craig et al., British Aerospace (Space Systems) Ltd., Jul. 1990, 28 pages.

"*Requirements of a Mobile Satellite Service*", Timothy M. Abbott, Skylink Corp., USA, pp. 212–215.

"*SDMA Technology Overview and Development Status*", Array Comm., M. Cooper et al., pp. 1–16, Sep., 1992.

MAPPING OF 2-BIT MULTIPLEXED I AND Q SIGNALS TO K-BAND CARRIER VECTOR

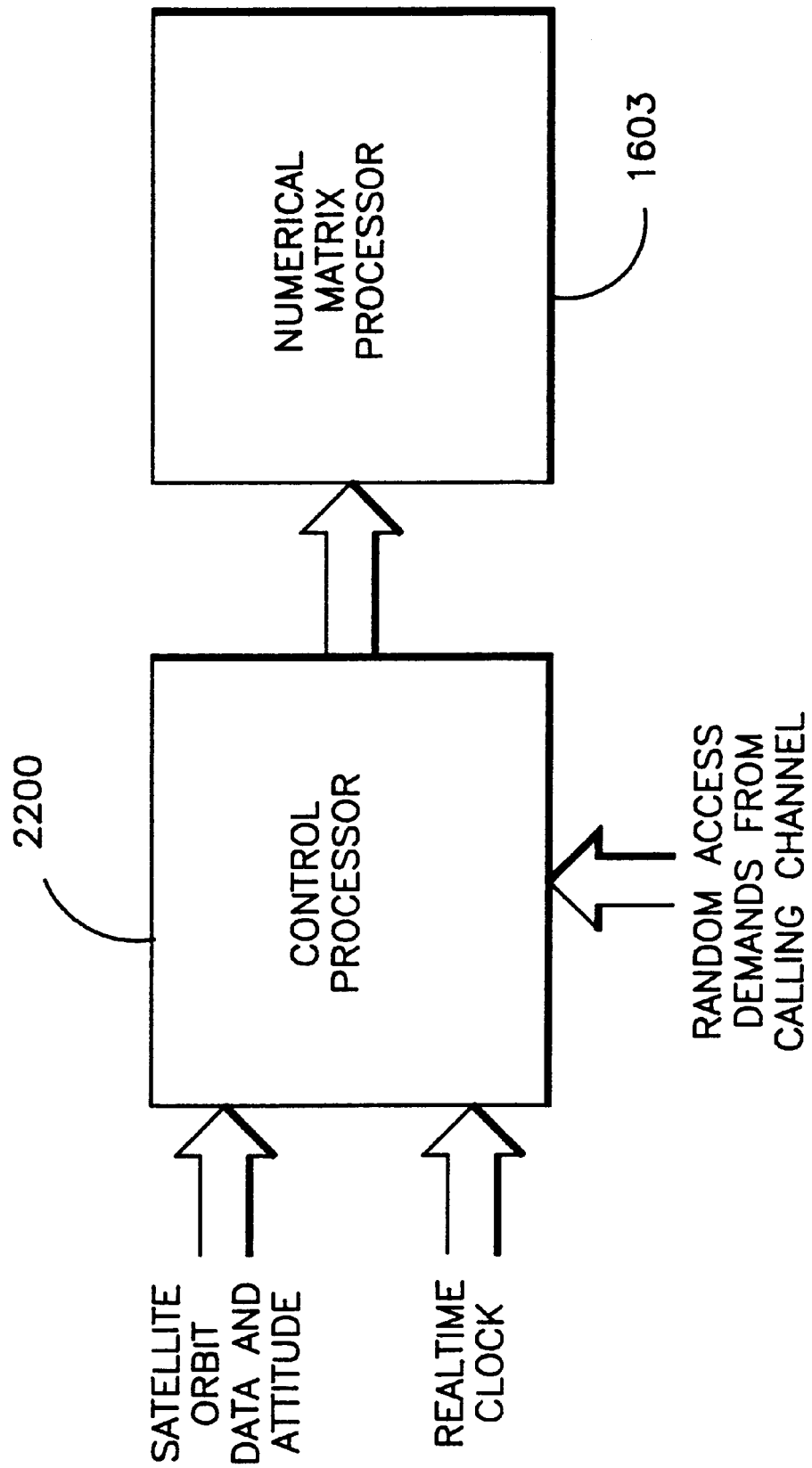

THE CHARACTERS OF EACH GIVEN COLOR ARE TOUCHING (1 CELL PLAN) BUT THE SMALLER CIRCLES FORM A 3-CELL PATTERN

7 COLORS USED SYSTEMATICALLY SUCH THAT LARGER CIRCLES OF ANY COLOR TOUCH WHILE THE SMALLER CIRCLES FORM A 7-CELL RE-USE PATTERN WITH THE OTHER COLORS

CELLULAR/SATELLITE COMMUNICATIONS SYSTEM WITH IMPROVED FREQUENCY RE-USE

This application is a divisional of application Ser. No. 08/442,648, filed May 16, 1995, abandoned, which application is a divisional application of U.S. patent application Ser. No. 08/179,953, filed Jan. 11, 1994, U.S. Pat. No. 5,619,503.

BACKGROUND

The present invention relates to radio communication systems with increased capacity. The system can include a number of roving, automobile-mounted or handheld telephone sets served by either fixed, ground-based stations or by orbiting satellites or by a combination of both. The capacity of such systems to serve a large number of subscribers depends on how much of the radio spectrum is allocated for the service and how efficiently it is used. Efficiency of spectral utilization is measured in units of simultaneous conversations (erlangs) per megahertz per square kilometer. In general, spectral efficiency can be improved more by finding ways to re-use the available bandwidth many times over than by attempting to pack more conversations into the same bandwidth, since narrowing the bandwidth generally results in the need to increase spatial separation between conversations thus negating the gain in capacity. Therefore, it is generally better to increase the bandwidth used for each conversation so that closer frequency re-use is possible.

Spread-spectrum communications systems (e.g., CDMA systems) that increase the signal bandwidths using heavy redundant coding, such that a signal can be read even through interference from other users, offer high spectral efficiency. Using such systems, several users in the same cell can coexist in the same bandwidth, overlapping in both frequency and time. If co-frequency interferers in the same cell can be tolerated, co-frequency interferers one or more cells away can also be tolerated since distance will lessen their interference contribution, so it would be possible to re-use all frequencies in all cells.

Spread-spectrum system capacity is said to be self-interference limited because each unwanted signal that is received simultaneously with the desired signal, and on the same frequency, contributes an interference component. Some systems, however, such as satellite communications systems, are already limited by natural noise, so the wideband spread-spectrum approach is then not necessarily the best technique for maximizing capacity. Consequently it would be desirable to re-use the whole spectrum in every adjacent cell or region without incurring the self-interference penalty of wideband spread-spectrum.

FIG. 1 shows a typical arrangement of a cellular telephone network using land-based stations. This figure is illustrative of such networks only, for example, cells are not always of such regular size and shape and as a general definition a cell may be described as an area illuminated with a distinct signal.

Cells can be illuminated from their geographical centers, but it is more common to illuminate a cluster of three cells from a common site at the junction of the three cells, as site real estate cost is a major economic consideration. The antenna radiation patterns for central illumination of a cell would generally be omnidirectional in azimuth. It is also common to narrow the radiation pattern in the vertical plane so as to concentrate the energy towards land-based telephones and avoid wasting energy skywards. When the transmitters and antennas for three cells are collected onto the same site for economy, the antenna patterns are then only required to illuminate 120 degree sectors, and the resultant azimuthal directive gain largely compensates for the double distance to the far side of the cell. The antenna pattern can be shaped appropriately so as to provide a gain commensurate with the maximum range needed in each direction, which is halved at ±60 degrees compared to mid-sector. Thus a sectorized antenna pattern can be narrowed to −12 dB at ±60 degrees, giving a mid-sector gain of about 8 to 9 dB to assist in achieving the maximum range in that direction.

Using central illumination, the U.S AMPS cellular mobile telephone system denies re-use of the same frequency within a 21-cell area around a given cell. This is called a 21-cell frequency re-use pattern and results in co-channel interference being approximately 18 dB below a wanted signal when all channels are concurrently in use (commonly called maximum load). Such a 21-cell re-use pattern is illustrated in FIG. 2. Certain re-use pattern sizes such as 3, 4, 7 and products thereof (e.g., 9, 12, 21 . . . ) result in co-channel interferers being equidistant from the wanted signal and located on the vertices of a hexagon, separated by a number of cells equal to the square root of the pattern size.

In practice, illumination takes place from sites at the junction of three cells. Although the re-use pattern is a 21-cell pattern, it can also be described as 7-sites each having a 3-frequency re-use pattern around the three, 120 degree sectors. The signal to co-channel interference characteristics arising from this form of illumination are not exactly equivalent to those characteristics which result from central illumination (due to the antenna directivity it can be shown that interference with respect to a particular signal arises principally from two other sites whose antennas are firing in the right direction, and not from six equidistant cells which transmit on a common frequency as would be the case in central illumination).

The 3-sector, 7-site method of illumination is sometimes called sectorization, which can give the erroneous impression that an originally larger cell was split into three smaller cells or sectors by use of directional antennas. This impression, however, is inaccurate because the arrangement used for illuminating three cells from the same site is merely an economic arrangement that actually has slight disadvantages over central illumination with respect to technical performance but is otherwise very similar.

Cell-splitting is another concept entirely, being a way of obtaining more capacity per square kilometer by providing base stations more densely on the ground. Introducing cell splitting in an already existing system usually requires complete revamping of the frequency re-use plan, as it is conventionally not possible simply to split a cell, for example, into three cells and to re-use the original frequencies three times over. This would result in the three new cells operating on the same frequency with no spatial separation, which would present a problem for a mobile phone on the boundary between two cells where it receives equal strength (but different content) signals on the same frequency from both. Thus, it would be desirable to allow a cell to be split into sectors with the same frequencies being used in each without the above-described interference problem.

Similar capacity issues arise in designing a satellite communications system to serve mobile or handheld phones. On handheld phones, omnidirectional antennas of indifferent performance are all that in practice the majority of consumers are willing to accept. Directional antennas that have to be oriented toward the satellite or larger, more cumbersome antennas do not now find favor in the marketplace, so it is necessary for the satellite to provide a high enough signal strength at the ground to communicate with such devices. The signal strength received at the ground from a satellite is usually measured in units of watts per square meter or dBW per square meter on a logarithmic scale. For example, a flux density of the order on −123 dBW per square meter is used for voice communication to provide an adequate link margin for multipath fading, shadowing, polarization mismatch etc., using a downlink frequency of 2 GHz. The total number of watts radiated by the satellite is then equal to this required flux density times the area of the geographical region it illuminates. For example, to provide such a voice channel anywhere in the entire United States, having an area of 9 million square kilometers requires a total radiated power of:

$10^{-12.3} \times 9 \times 10^{12} = 4.5$ watts from the satellite.

One voice channel would not, of course, provide a useful capacity. Five to ten thousand Erlangs is a more reasonable target for serving the United States. One way of increasing the capacity would be to generate 4.5 watts on other frequencies too, each of which could carry one voice channel; but a 45 k watt satellite would be very large and expensive to launch and would not be an economic way to provide 10000 erlangs capacity. It is therefore more efficient, having used 4.5 watts of satellite RF power to create one voice channel's worth of flux density at all places in the United States, to find ways which will allow the voice carried by that flux to be different at different places, thus supporting many different conversations using no more power or bandwidth.

The ability of a satellite to modulate the same radiated flux density differently in different directions depends on the angular discrimination provided by its antenna aperture. The angular discrimination of an antenna (in radians) is on the order of the ratio of the wavelength to the diameter of the antenna. Using an exemplary downlink frequency of 2 GHz (15 cm wavelength) an antenna of 1.5 meters in diameter theoretically has an angular discrimination on the order of $\frac{1}{10}$th of a radian or 5.7 degrees, which, from an orbital height of, for example, 10000 kilometers, allows discrimination between 37 different directions within the United States coverage area. Thus, the same 4.5 watts of satellite radiated power could then support not just one, but 37 different conversations.

One way of creating 37 different beams is shown in FIG. 3. A parabolic reflector focuses the radio energy from a pattern of 37 different feeds down to the earth. An image of the feeds is projected onto the ground forming the desired separately illuminated areas. Unfortunately, using this technique there is spillover from one area to another, and in any case a mobile phone on the boundary between two or three cells receives equal signals from two or three feeds. If these signals are independently modulated, the phone receives a jumble of three conversations which it cannot decipher. Accordingly, conventional systems have been unable to exploit the potential capacity increases which would be realized using discrimination.

SUMMARY

These and other drawbacks and difficulties found in conventional radio communication systems, satellite communication systems and hybrids thereof are overcome according to the present invention.

According to exemplary embodiments of the present invention, matrix processing can be used to form numerical combinations of data sample streams. The matrix coefficients are selected, and can be periodically adjusted, so that each of a plurality of receivers receives its intended signal with substantially zero interference.

According to another exemplary embodiment of the present invention, signal processing does not adapt to the movement of mobile phones or to new call set-up and termination, but operates in a deterministic way and instead the traffic is adapted to the deterministic characteristics of the signal processing using a dynamic traffic channel assignment algorithm.

BRIEF DESCRIPTION OF THE DRAWINGS

The foregoing, and other, objects, features and advantages of the present invention will be more readily understood upon reading the following detailed description in conjunction with the drawings in which:

FIG. 22 is a block diagram illustrating part of an exemplary implementation of a dynamic channel assignment embodiment of the present invention;

DETAILED DESCRIPTION

Figure 1:
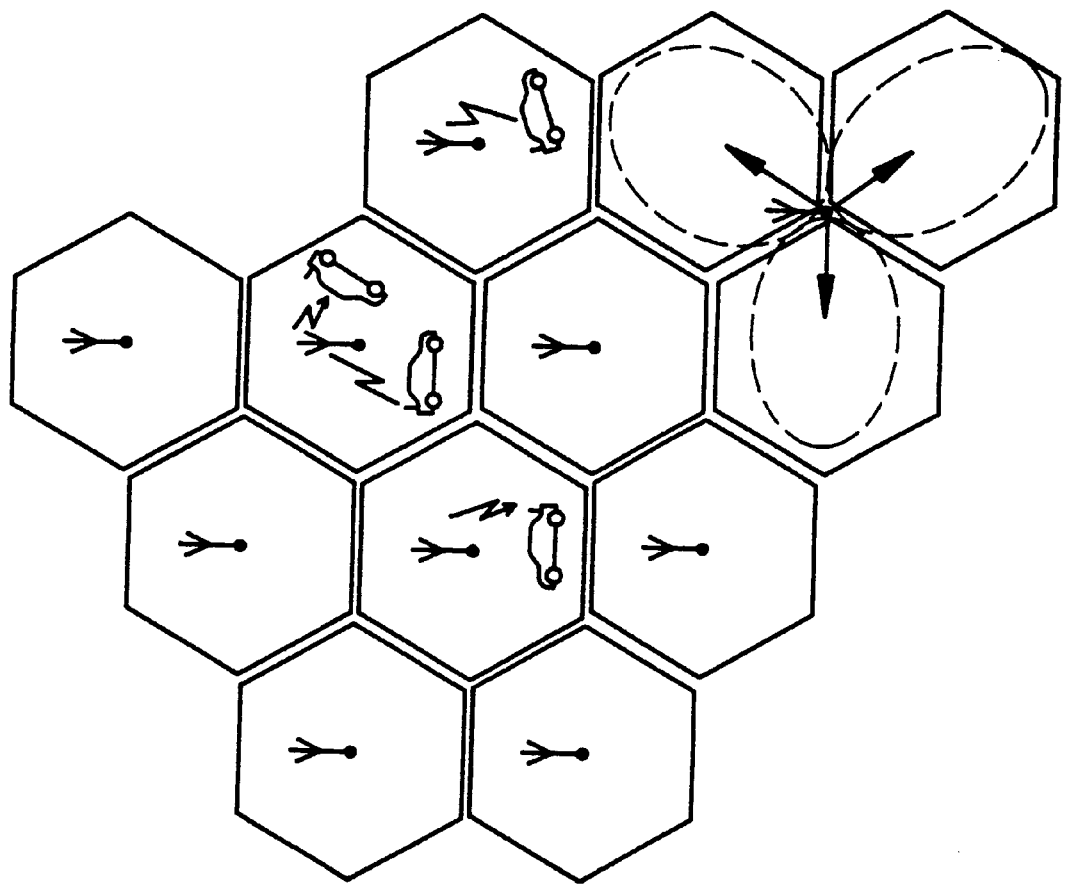
FIG. 1 illustrates a conventional land based cellular network.
Figure 2:
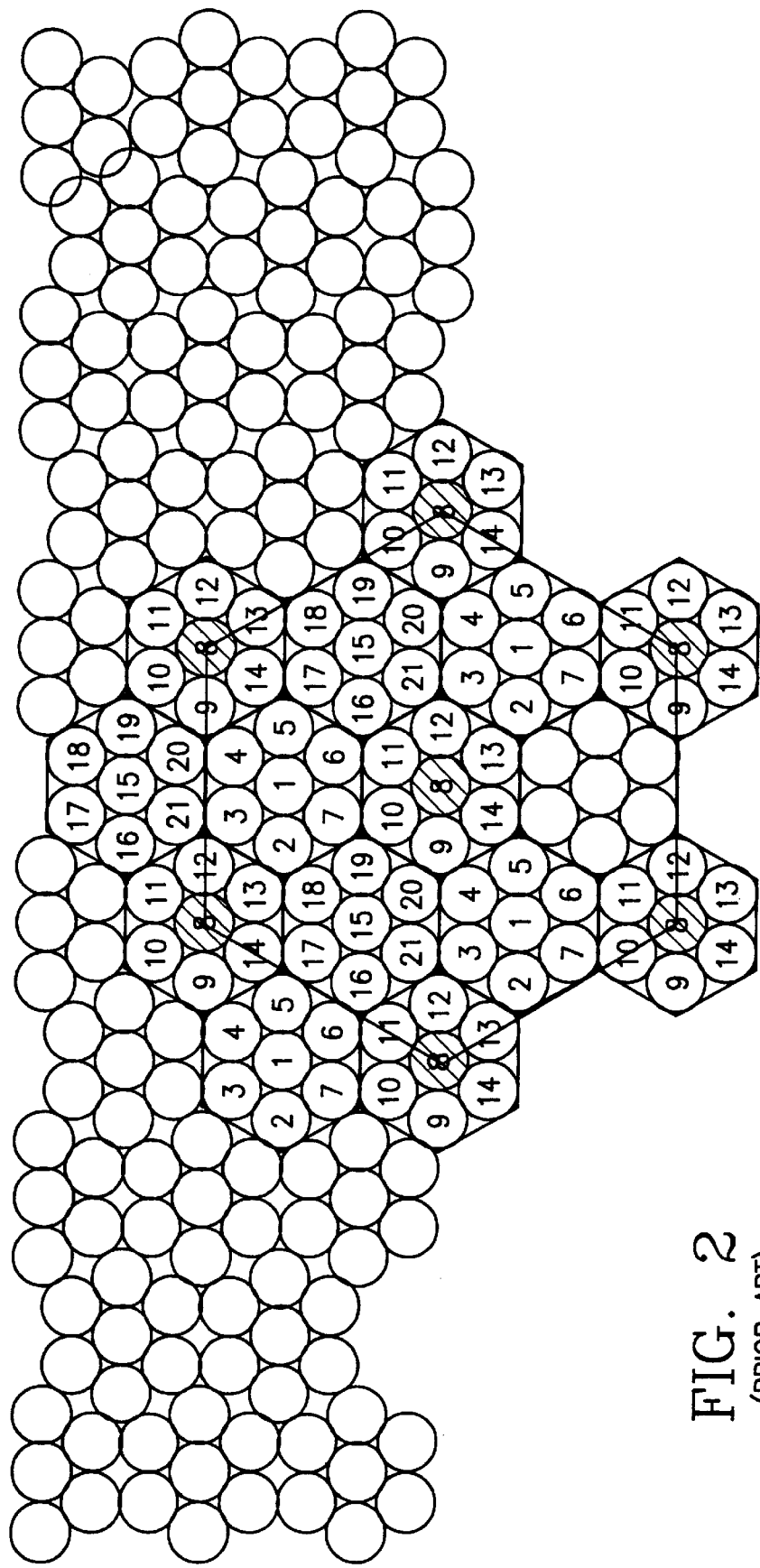
FIG. 2 illustrates a conventional 21-cell frequency re-use plan.
Figure 3:
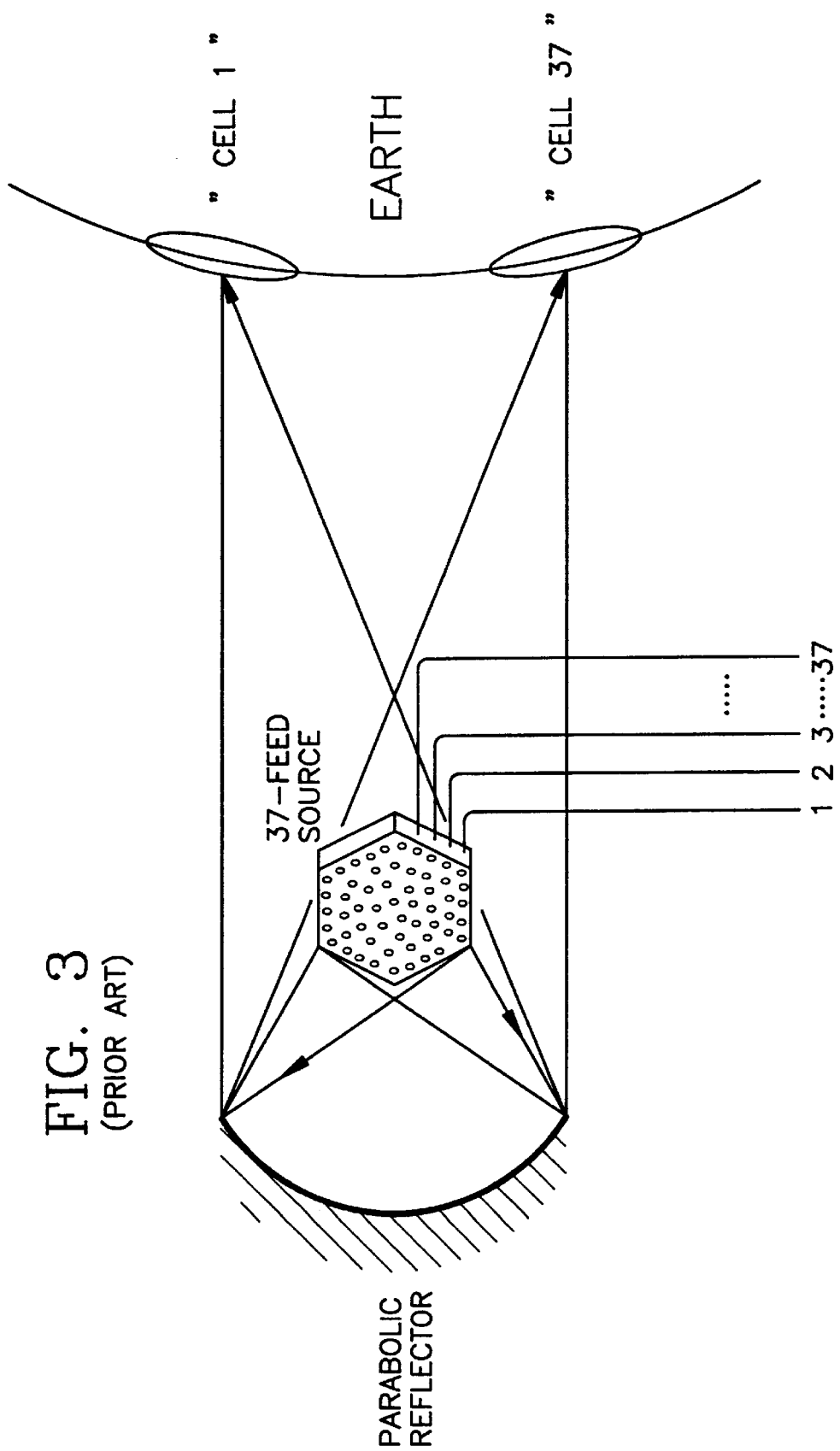
FIG. 3 shows a conventional satellite implementation of 37 beams illuminating a region of the Earth.
Figure 4:
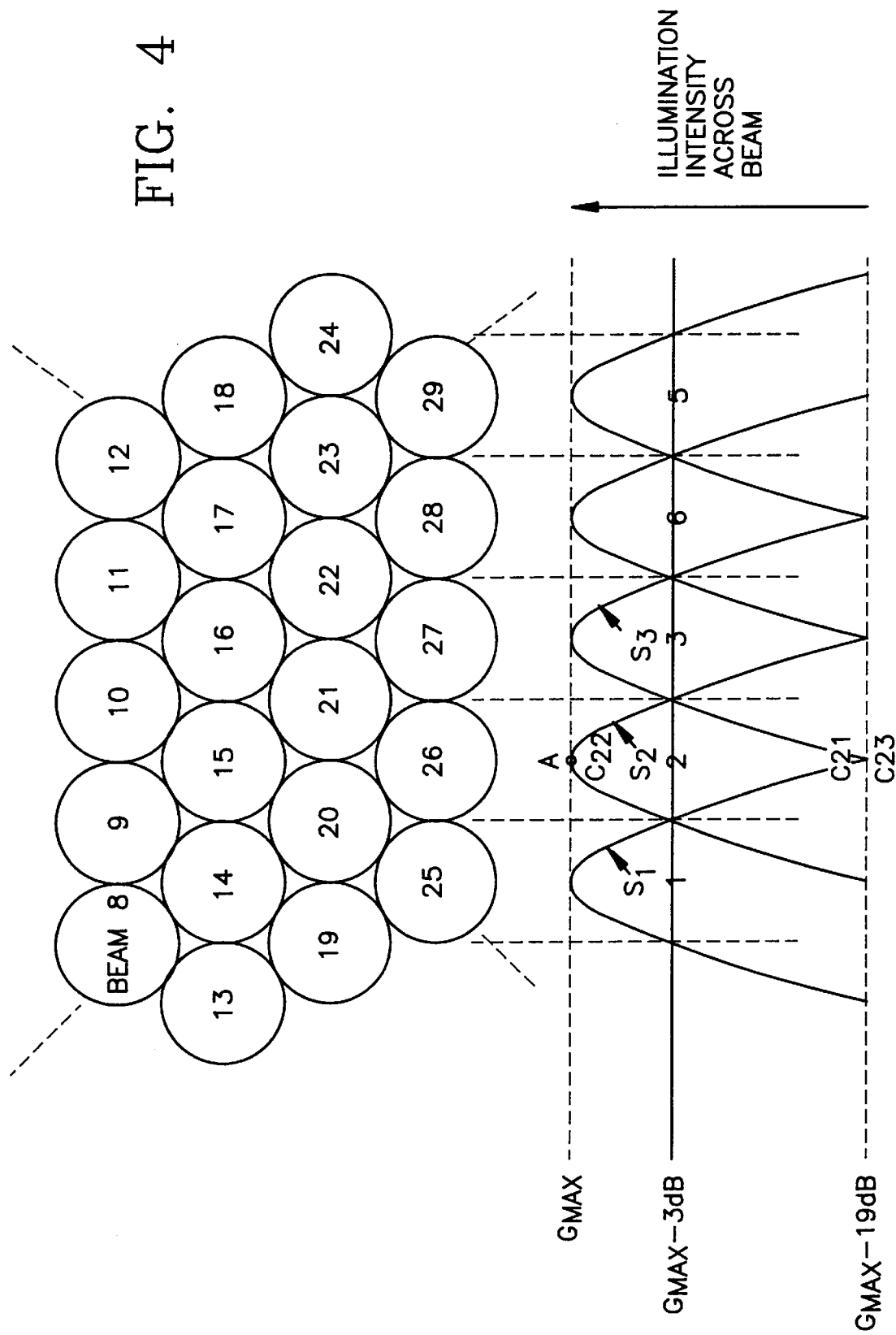
FIG. 4 illustrates an illumination pattern used to describe a feature of the present invention.

Initially, it is helpful to understand the interference problems associated with the transmission of signals from conventional antenna arrays, such as the one illustrated in FIG. 3. FIG. 4 illustrates a cross section of the illumination intensity produced on the ground from an antenna, such as the antenna shown in FIG. 3. Even for a best interference case where a mobile unit is located at the center of beam 2 (point A) the illumination from beams 1 and 3 is not zero, but only somewhat reduced. The total signal received by mobile 2 can be described as the sum of three components, such as:

an amount C21 times the beam 1 signal S1 (small)

an amount C22 times the beam 2 signal S2 (large)

an amount C23 times the beam 3 signal S3 (small)

Considering now the reverse (uplink) direction, and assuming reciprocal propagation, the satellite receives in beam 2 a contribution from three mobiles, namely C21.M1+C22.M2+C23.M3 where M1, M2, M3 are respectively the signals radiated from mobiles in cells 1, 2 and 3. If mobile 1 is not close to the edge of beam 2, C21 will be small; since mobile 2 is within beam 2, C22 will be large; and if mobile 3 is not close to the edge of beam 2, C23 will be small. Thus as long as mobiles are ideally placed and not on the edges of cells, it may be that the level of inter-cell interference can be tolerated.

Figure 5:
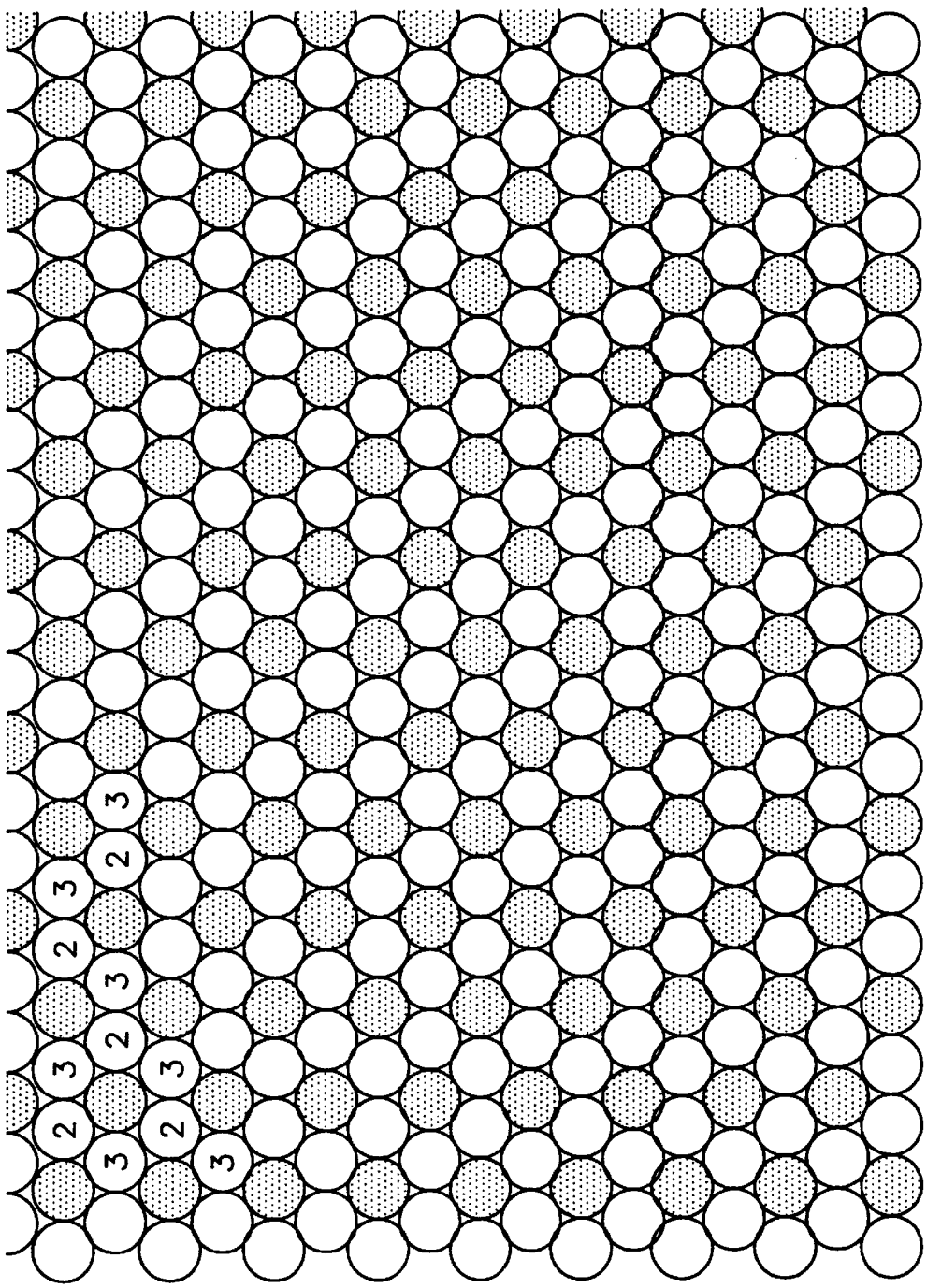
FIG. 5 shows a 3-cell frequency reuse plan.

On the other hand, if a mobile unit is, for example, close to the boundary between cell 1 and cell 2, the coefficient C21 will be large and M1 will interfere with the decoding of signal M2. The conventional technique for avoiding this problem is to deny use of the same frequency in immediately adjacent cells. For example, the 3-cell frequency re-use pattern shown in FIG. 5 might be used. The shaded cells in FIG. 5 are those using a first frequency f1, while the other cells use f2 and f3 in the indicated pattern. It can be seen that cells using the same frequency f1 do not abut, and have edge-to-edge separations of just less than one cell diameter. A mobile on the edge of one beam is quite far down the illumination intensity curve of other cells using the same frequency, and thus avoids interference. However, the drawback is that only one-third of the available frequencies may be used in each cell, reducing the spectral utilization efficiency by a factor of three. Accordingly, the present invention provides, among other features, a means of cancelling the co-channel interference without the loss of spectral efficiency entailed in denying spectral re-use in adjacent cells.

If the expressions for the signals received in all beams B1, B2, B3 . . . etc., are collected together, and we assume for the moment the same number of mobile signals as beams, then the following set of equations results:

$$B1 = C11.M1 + C12.M2 + C13.M3 + C14.M4 \ldots C1n.Mn$$

$$B2 = C21.M1 + C22.M2 + C23.M3 + C24.M4 \ldots C2n.Mn$$

$$B3 = C31.M1 + C32.M2 + C33.M3 + C34.M4 \ldots C3n.Mn$$

$$Bn = Cn1.M1 + Cn2.M2 + Cn3.M3 + Cn4.M4 \ldots Cnn.Mn$$

which can be abbreviated to $\underline{B} = C.\underline{M}$ where $\underline{B}$ and $\underline{M}$ are column vectors and C is a square, n×n matrix of coefficients.

From the signals received by the satellite in each of its beams, it is desirable to determine the signals transmitted by the mobiles; according to the present invention this can be done by solving the above set of equations to obtain:

$$\underline{M} = C^{-1}.\underline{B}$$

This solution can be obtained as long as the matrix C is invertible (i.e., has a non-zero determinant) and results in cancellation of substantially all interference between mobile signals and complete separation therebetween. All the elements of the above equations, that is mobile signals Mi, beam signals Bk and matrix elements Cki, are complex numbers having both a real and an imaginary component so as to be able to represent not only signal amplitude differences but also signal phase relationships. According to the present invention the signals received in the different antenna beams are sampled at the same time at a rate sufficient to capture all signal components of interest according to Nyquist's criteria. One set of such samples forms the column vector $\underline{B}$ at any instant, and each such vector is multiplied by the inverse of C, for example, once per sample period to obtain a set of samples M representing interference free mobile signals. Successive values of the same element of M form the sample stream corresponding to one mobile signal. This stream is fed to a digital signal processor for each mobile signal that turns the sample stream into, for example, an analog voice waveform or 64 KB PCM digital voice stream as required by the telephone switching system to which the system is connected.

According to another aspect of the present invention, the matrix C does not have to be inverted every sample period, but can be inverted less frequently or only once at the beginning of a call. The matrix C and its inverse vary relatively slowly because the rate at which the C coefficients change due to the mobile unit shifting position within the beams, or due to the beam illumination intensity distributions changing due to satellite movement in the non-geostationary case, is relatively low. In an exemplary satellite embodiment of the present invention, typical cell sizes are in the hundreds of kilometers diameter range and satellites orbiting at medium altitudes take an hour or two to pass by a typical cell. Thus the need to compute a new matrix inverse due to movements may not arise for the duration of, for example, a typical 3-minute telephone call. The principal reason that changes in the inverse C-matrix would be beneficial, however, is that conversations are continually being connected and disconnected. If n=37, for example, and the average call duration is 3 minutes, then on the average one mobile and its corresponding column of matrix C drops out and is replaced with another column of coefficients every 5 seconds. The process whereby new inverse C matrices are introduced when this occurs will be explained later, suffice it to say that this represents a relatively negligible computational effort compared to the total digital signal processing involved in demodulating and decoding 37 mobile signals.

An exemplary embodiment which applies these principles will now be described with reference to FIGS. 6–11.

Figure 6:
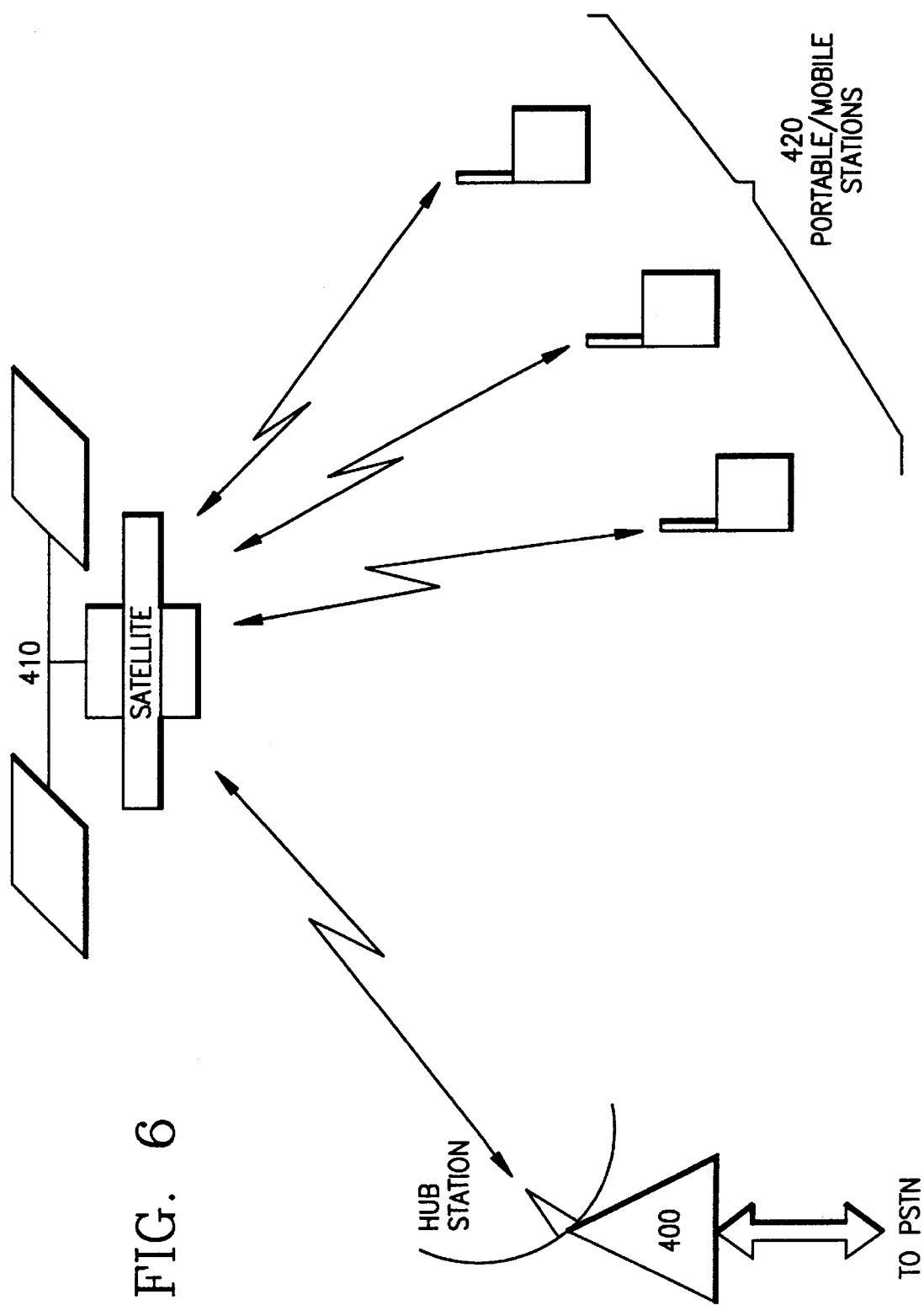
FIG. 6 shows a satellite-mobile communication system according to an exemplary embodiment of the present invention.

FIG. 6 illustrates a plurality of portable stations 420 in communication via satellite 410 with a hubstation 400. The hubstation is connected, for example via a local exchange, to a public switched telephone network (PSTN) to allow calls to be placed between the portable phones and any telephone subscriber worldwide, as well as between the satellite phones. The satellite receives signals from the portable phones at a relatively low microwave frequency, such as 1600 MHz. At such frequencies the transmitters in battery operated phones can be efficient and their antennas can be small and omnidirectional. The satellite translates the received signals from 1600 MHz to a higher frequency for relaying to the hubstation.

A higher frequency can be used because the bandwidth needed on the satellite-to-hub link is at least n times the bandwidth allocated at 1600 MHz for each beam, where n is the number of beams. For example, if 6 MHz of bandwidth is re-used in each of 37 beams at 1600 MHz, then at least 37×6 or 222 MHz of bandwidth will be needed on the satellite-hub link. Since one method of maintaining coherent beam signal transport uses at least twice this bare minimum bandwidth, and the reverse direction requires the same amount, 1 GHz of bandwidth is needed. This suggests that a carrier frequency around, for example, 20 GHz is appropriate for the satellite-hub forward and return links.

At such a frequency, even relatively small hubstation dishes will have very narrow beamwidths, so that exclusive use of this bandwidth by any one system is not necessary, and the entire bandwidth can be re-allocated to other satellites and ground stations without interference as long as the sightline from a first ground station to a first satellite does not intersect with a second satellite. This can be avoided by allocating unique "stations" to satellites in geostationary orbit, or, in the case of lower orbiting satellites that move, the probability of intersection is low and can be handled by having an alternative hub location which is activated when such an event threatens.

Figure 7:
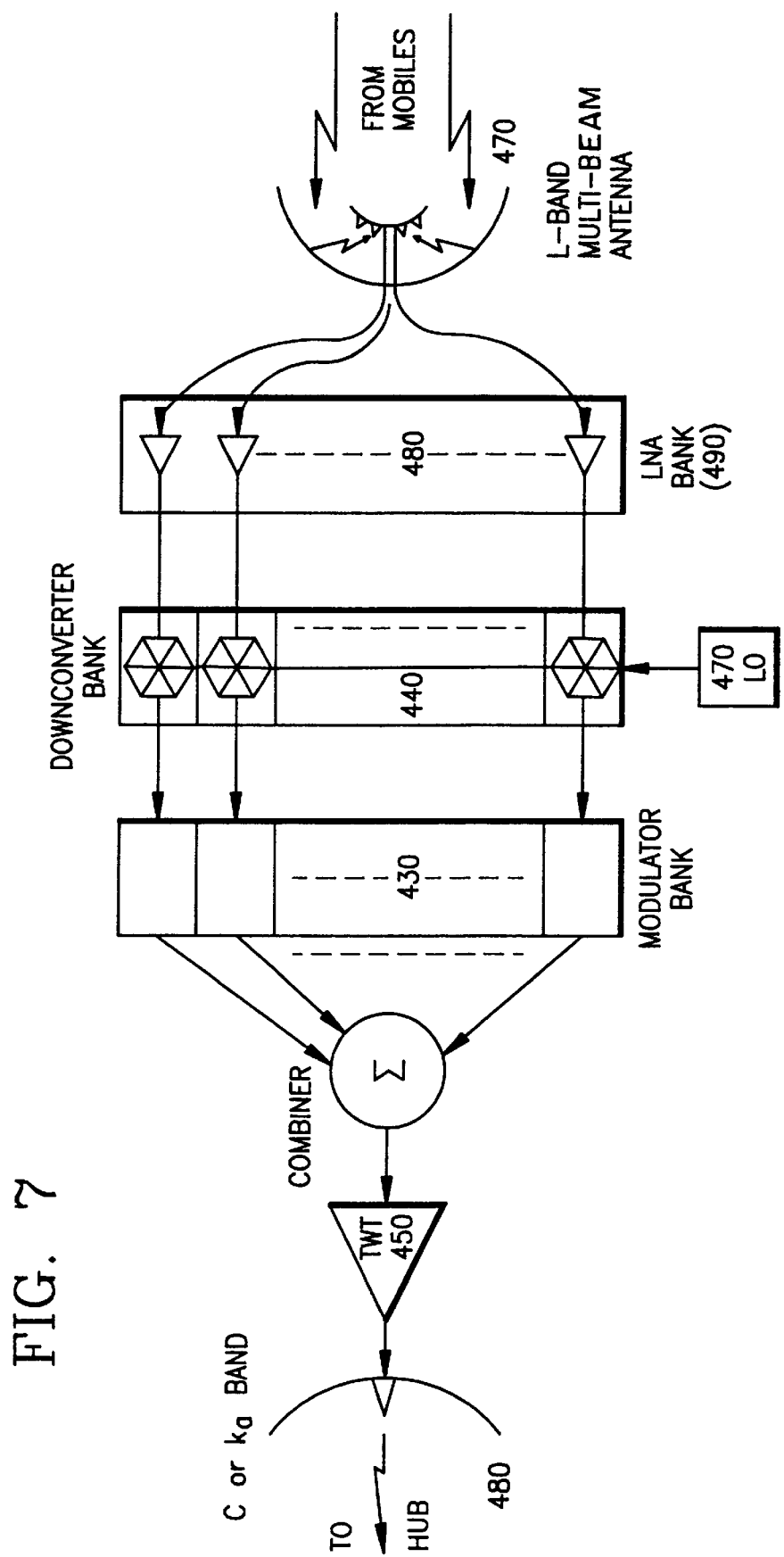
FIG. 7 illustrates a mobile-to-hub transponder according to an exemplary embodiment of the present invention.

FIG. 7 shows a block diagram of an exemplary satellite transponder for relaying mobile-originated signals to the hubstation. The L-band (e.g., 1600 MHz) multi-beam satellite antenna 470 receives signals from a plurality of mobile phones distributed between the various beams and amplifies them in respective low-noise amplifiers 480. The composite signal from each beam contains, for example, signals from 400–500 mobile phones using different frequencies spaced at 12.5 KHz intervals over a total bandwidth of 6 MHz. The composite signals of each beam are downconverted in respective mixers 440 to obtain baseband signals, for example, spanning the range of 1–7 MHz. This type of signal will be referred to hereafter as a "video" signal as it is typical of the frequency range spanned by signals from a TV camera. To downconvert the composite received signal to the video signal, the downconverters can, for example, be image-rejection type downconverters. The downconversion process can optionally take place in one or more steps using appropriate intermediate frequencies.

The downconvertors in the system can use the same local oscillator signal so as to preserve the phase relationships at the downconverted frequencies that were received at the antennas. The inadvertent introduction of fixed phase mismatches and small amplitude differences between channels is not a problem as this can be calibrated out by analog or digital processing at the hubstation.

The baseband signals are used to modulate respective carriers at the satellite-hub frequency band, e.g., 20 GHz. If single-sideband modulation of a 1–7 MHz "video" signal were applied to a 20 GHz carrier frequency, the resulting signal would occupy the frequency range 20.001 to 20.007 GHz. However, using single-sideband modulation can make it difficult to preserve the phase coherency between the beam signals. Accordingly, double-sideband modulation techniques can be used instead. For example, the 1–7 MHz video signal can be used to frequency or phase modulate a 20 Ghz carrier frequency. The frequency range occupied by the modulated carrier would then be approximately 19.993–20.007 MHz, or more, depending on the frequency or phase deviation employed. To allow some margin over the bare 14 Mhz bandwidth, a 25 Mhz carrier spacing might be appropriate in the 20 Ghz band. Thus, 37×25 or 925 MHz can be used for the one-way satellite-hub link. This bandwidth can be halved by intelligent use of orthogonal polarizations as described later.

Figure 8A:
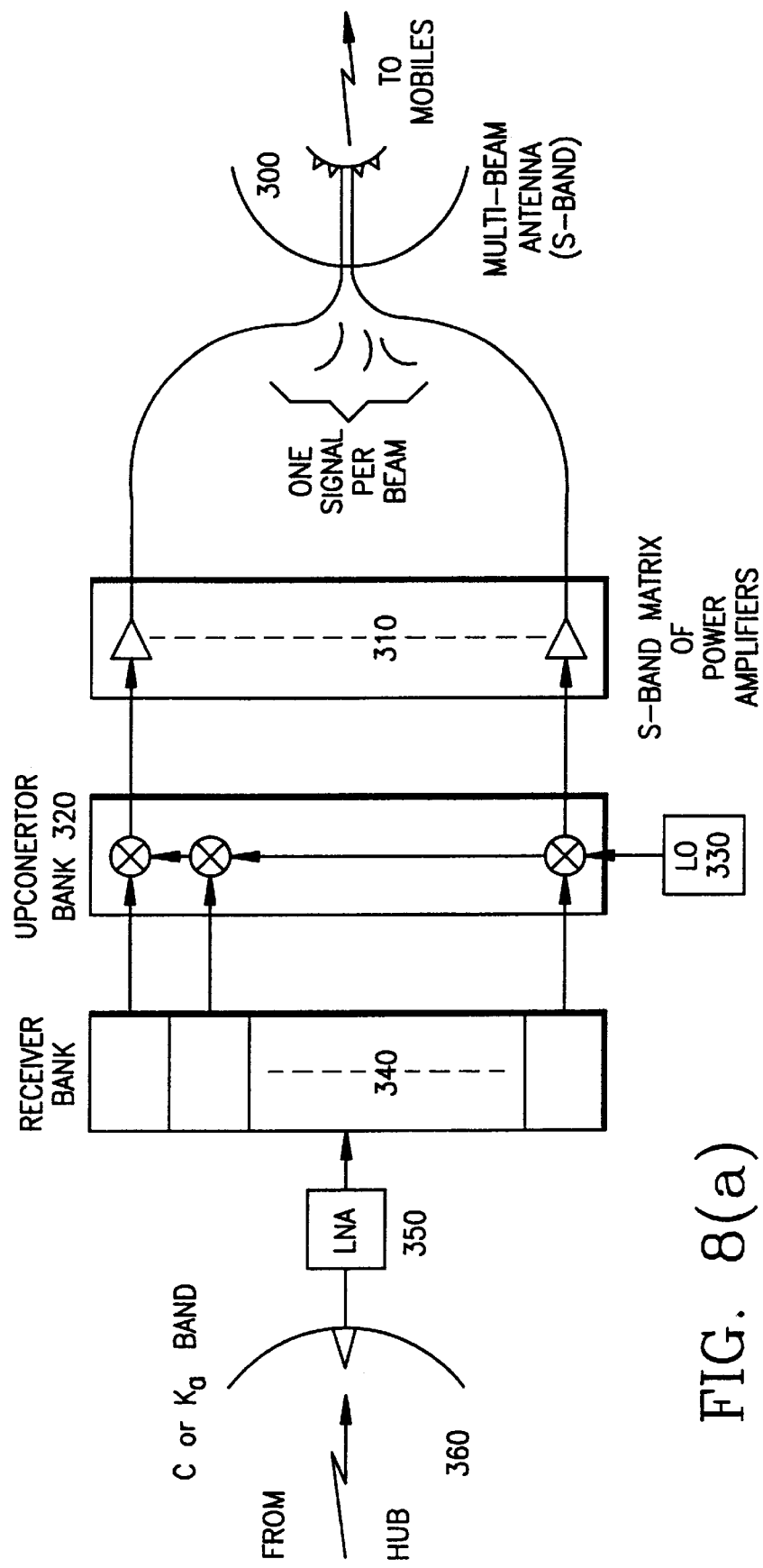
FIG. 8(a) illustrates a hub-to-mobile satellite transponder according to an exemplary embodiment of the present invention.

FIG. 8(a) shows an exemplary satellite transponder for the hub-mobile relay direction. The same method described above for the mobile-to-hub transmissions can be used in reverse for the coherent transport of multiple beam signals to the satellite. The hub station (not shown) transmits a number of Ka band frequency or phase modulated carriers to the satellite. These are received using a suitable Ka band antenna 360, amplified in a common low-noise amplifier 350, and then fed to FM receiver bank 340 where each carrier is demodulated by a respective receiver to produce a video frequency version of the signals for transmission in respective beams. These video signals, for example occupying the band 1–7 MHz, are then unconverted in respective upconverters 320, using a common local oscillator 330 to preserve relative phase relationships, and then amplified using power amplifier matrix 310 for transmission via multi-beam antenna 300 to the mobile phones. A suitable frequency for the satellite-to-mobile link is, for example, 2.5 GHz (S-band). The amplifiers in the power amplifier matrix can be linear amplifiers to reduce intermodulation between signals destined for different phones. The power amplifier matrix can for example, either be a bank of n separate amplifiers each associated with respective beams, or a bank of N (greater or equal to n) amplifiers coupled by n×N Butler matrices at their inputs and N×n Butler matrices at their outputs. The effect of the Butler matrices is to use each amplifier to amplify part of every beam signal, thus evening the load, providing graceful degradation in the event of failure, and reducing intermodulation by absorbing a proportion of the intermodulation energy in N-n dummy loads. Examples of such power amplifier matrixes can be found in U.S. patent application Ser. No. 5,574,967, 08/179,947 entitled "Waste Energy Control and Management in Power Amplifiers" and filed on Jan. 11, 1994 which is incorporated here by reference.

According to another exemplary embodiment of the present invention, in communication systems using TDMA signals relayed through an earth-orbiting satellite having a communications transponder using such a matrix power amplifier, the power amplifier can have its input Butler combining network located at the ground station instead of the satellite. A Butler combining operation may be performed by digital signal processing at the ground station to form weighted sums of the desired beam signals to generate drive signals corresponding to each amplifier of the matrix power amplifier. These weighted sums are transmitted using coherent feeder links to the satellite's communications transponder which receives them and translates them to a second frequency band for driving the power amplifier in such a way that, after Butler combining the power amplifier outputs, the output signals correspond to signals desired to be transmitted in different antenna beam directions to respective ground-terminals, which may be, for example, a small handportable station.

Figure 8B:
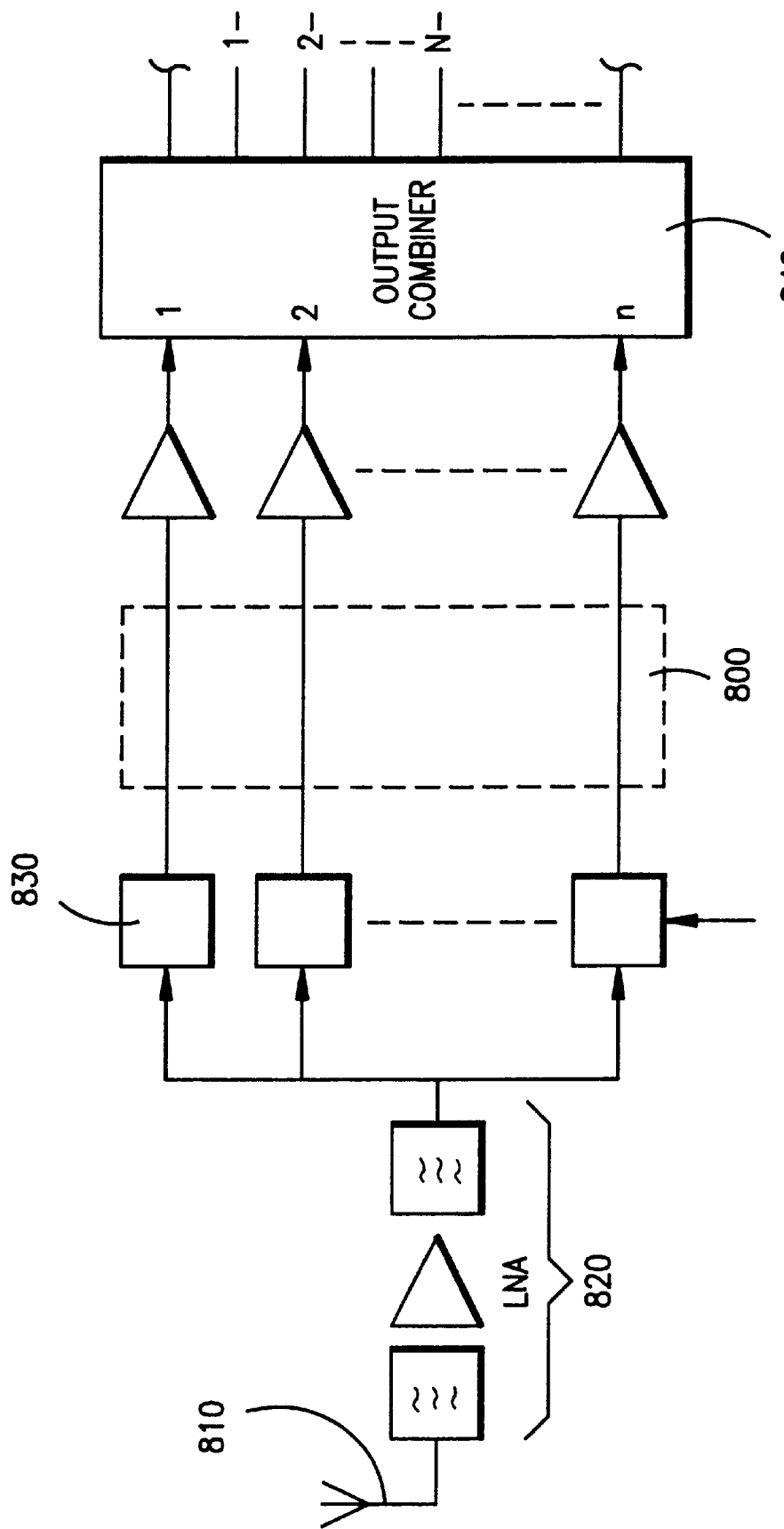
FIG. 8(b) illustrates a combining network for a power amplifier matrix according to another exemplary embodiment of the present invention.

The resulting satellite circuitry is shown in FIG. 8(*a*). Note that the input combiner which is normally present has been omitted since this function is now performed at the ground station, as illustrated by the dashed rectangular outline 800. The antenna 810, signal processing including linear amplifier 820, feeder link receivers and downconverters 830 and output combiner 840 can be implemented in the conventional manner and thus are not further described herein.

This embodiment may be advantageous for certain situations, for example, dynamic reallocation of power between antenna beams and timeslots may be accomplished without large variations in the corresponding forward feeder link signals, because each feeder link carries part of every beamsignal instead of all of one beam signal. Additionally, pre-distortion of signals sent on the forward feeder links may be applied to further compensate for distortion in the associated transponder channel power amplifiers. Moreover, in the case of the over-dimensioned matrix power amplifier described in the above-incorporated "Waste Energy Control and Management in Power Amplifiers" application, the number of feeder links is greater than the number of independent beam signals to be created, thus affording a measure of redundancy against failure.

Figure 9:
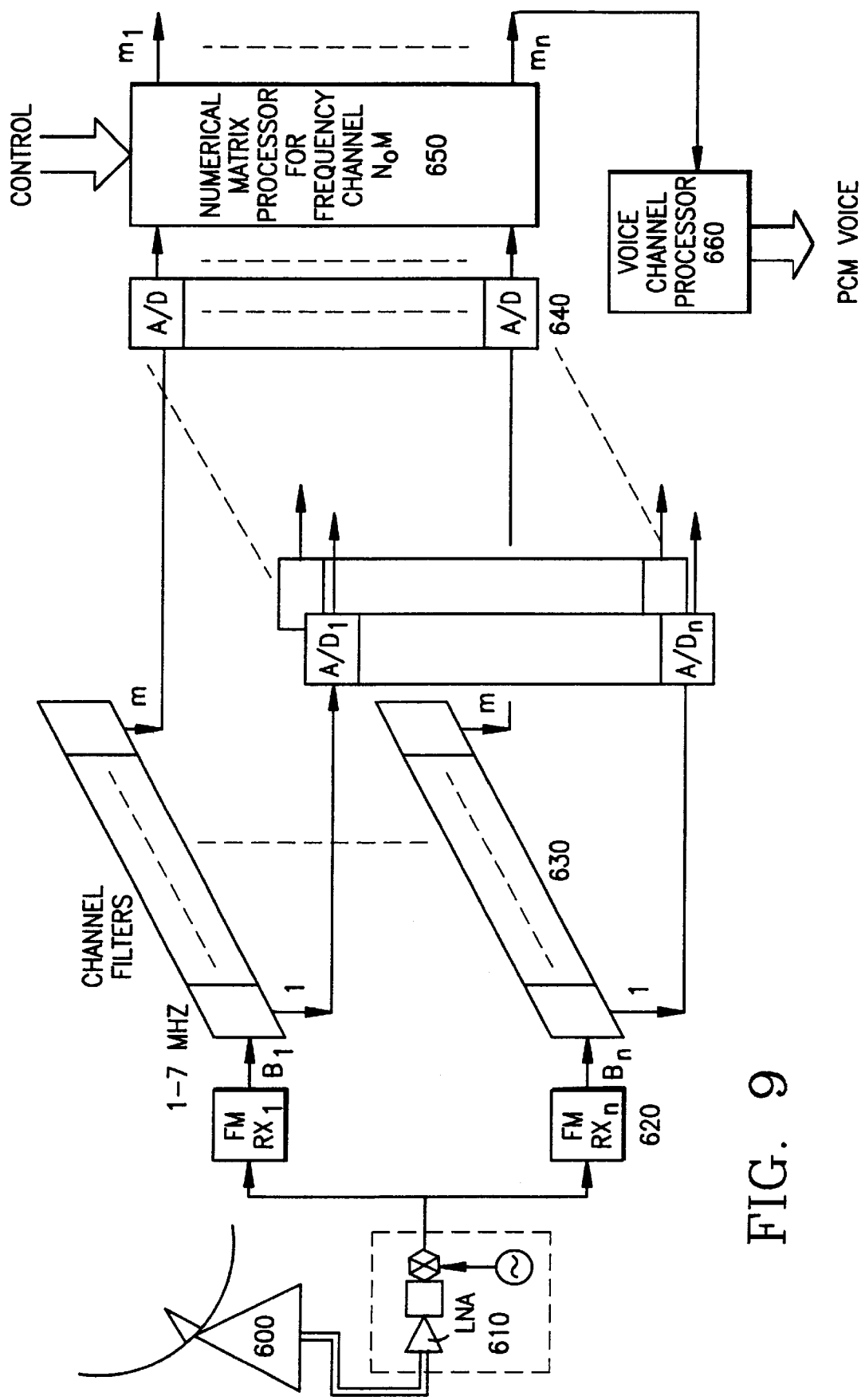
FIG. 9 shows a hubstation according to an exemplary FDMA embodiment of the present invention.

FIG. 9 shows a block diagram of a hubstation according to an exemplary embodiment of the invention. The hub antenna 600 receives Ka band carriers from the satellite and, after common low-noise amplification and optional downconversion in block 610, the signal is divided between a number of receivers for respective Ka-band carriers to obtain the beam signals $B_1 \ldots B_n$. Each beam signal is composed of a multiplicity of voice-modulated channel frequencies which are separated in channel separation filters 630.

The channel separation filters 630 can be analog components such as crystal filters, and may involve frequency conversion of a selected channel frequency to a common lower frequency (e.g., 12.5–25 KHz, or 455 KHz) for A/D conversion. The selected channel signal having been converted to a suitable frequency is A/D converted in A/D convertors 640. An exemplary A/D convertor technique suitable for use at low intermediate frequencies such as 455 KHz is the technique described in U.S. Pat. No. 5,048,059 to Paul W. Dent entitled "Log-Polar Signal Processing", which is incorporated here by reference, which preserves the full complex nature of the signal by simultaneously digitizing its phase and its amplitude. Instantaneous phase can be digitized for example, using the technique described in U.S. Pat. No. 5,084,669 to Paul W. Dent entitled "Direct Phase Frequency Digitization", which is also incorporated here by reference. Phase digitization of all n beam signals corresponding to one channel frequency can be carried out using the technique described therein by repeating certain elements (i.e., the trigger circuits and holding registers) n times and sharing others (i.e., the reference frequency counter) as necessary to preserve relative phase coherency. Alternately, digital filters can be used instead of analog filters if the composite beam signals are first digitized, in which case the A/D converters 640 in FIG. 9 would not be needed.

The numerical results of A/D conversion are fed sample by sample to numerical matrix processor 650. There is one such processor per channel frequency, but only the processor for channel frequency (m) is shown for clarity. The matrix processor processes the digitized beam signals to separate out up to n separate mobile phone transmissions $M_1 \ldots M_n$ and transfer a sample stream corresponding to each mobile phone transmission to voice channel processor 660. The voice channel processor numerically performs demodulation of the signal and error correction decoding and transcoding of digitized voice from the bit rate and format used over the satellite to standard PCM telephone system format for connection via a digital exchange (not shown) to the PSTN. Thus the exemplary structure shown in FIG. 9 accomplishes decoding of n×m voice channels, where n is the number of beams and m is the number of frequencies per beam. For example, with n=37 and m=400, the system has a 14800 voice channel capacity potential.

The explanation of FIG. 9 relates to a system wherein one voice channel is carried per frequency (i.e., a Frequency Division Multiple Access (FDMA) system). However, the present invention can also be applied to Time Division Multiple Access (TDMA) systems. In TDMA systems, several mobile phone signals are carried on the same channel frequency by dividing a repetitive frame period into time slots, and allocating one time slot in each frame to one mobile phone signal. The exemplary block diagram of FIG. 9 can be applied even when the sample streams from A/D convertors 640 represent TDMA signals. However, the matrix processor 650 will now separate a different set of mobile signals in each timeslot, so that the matrix coefficients are now multiplexed between several sets, each of which correspond to a time slot. This can be an economic arrangement because, for a given number of voice channels complexity, the channel filters 630 will be fewer in number by a factor equal to the number of timeslots per carrier, the A/D convertors are correspondingly fewer, the number of matrix processors is reduced correspondingly although each has to operate at a higher input sample rate, and each voice channel processor can sequentially process the signals in consecutive timeslots and thus achieve the same total number of voice channels capacity while economically time-sharing components.

Each numerical matrix processor 650 is shown receiving a control signal. This control signal can be generated by a separate computer (not shown) which controls the connecting and disconnecting of calls to mobile phones, requiring changes to the matrix of coefficients used by the processor for separating out mobile signals from the beams. It was mentioned earlier that this separation can be achieved if the inverse of the C matrix was not numerically ill-conditioned. If two mobiles are located exactly at the same point on the earth, their two corresponding columns of the C matrix will be identical, which causes the determinant to be zero and the inverse not to exist. Thus, for the C-matrix to be invertible the mobiles shall be spaced far enough apart on the ground. If they approach each other too closely, the C-matrix becomes ill-conditioned.

According to an aspect of the present invention, however, when this situation threatens, one of the two (or more) approaching mobiles changes frequency to a channel where the other mobiles using the same frequency are adequately separated. It is the function of the control computer to determine, at least at call set-up and optionally at intervals thereafter, which of the available channel frequencies is most suitable for allocating to a new mobile, or for handing over an ongoing conversation. If there is no free capacity in a system the system is said to be blocked and subscribers cannot place calls, much to their annoyance. When the system is underloaded there are, at least on some frequencies, fewer mobile signals than beams, thus the matrix C is not square. It will be shown later how the excess degrees of freedom provided in underloaded systems can then be used, not only to separate mobile signals from each other thus avoiding mutual interference, but also to maximize the signal quality received from the worsts mobile. This solution changes when an extra mobile signal has to be accommodated and the control computer can evaluate in advance the potential impact on signal qualities. Thus a strategy for allocating a channel according to an exemplary embodiment of the present invention is to evaluate the impact on the signal quality corresponding to the worst case mobile on each channel through the inclusion of the new signal in the computations. The channel which suffers the least degradation, or meets the highest quality for the worst-case mobile, is then logically selected as the one to use for the new signal. This results in the group of mobiles assigned to the same frequency being as widely spatially separated as possible.

Figure 10:
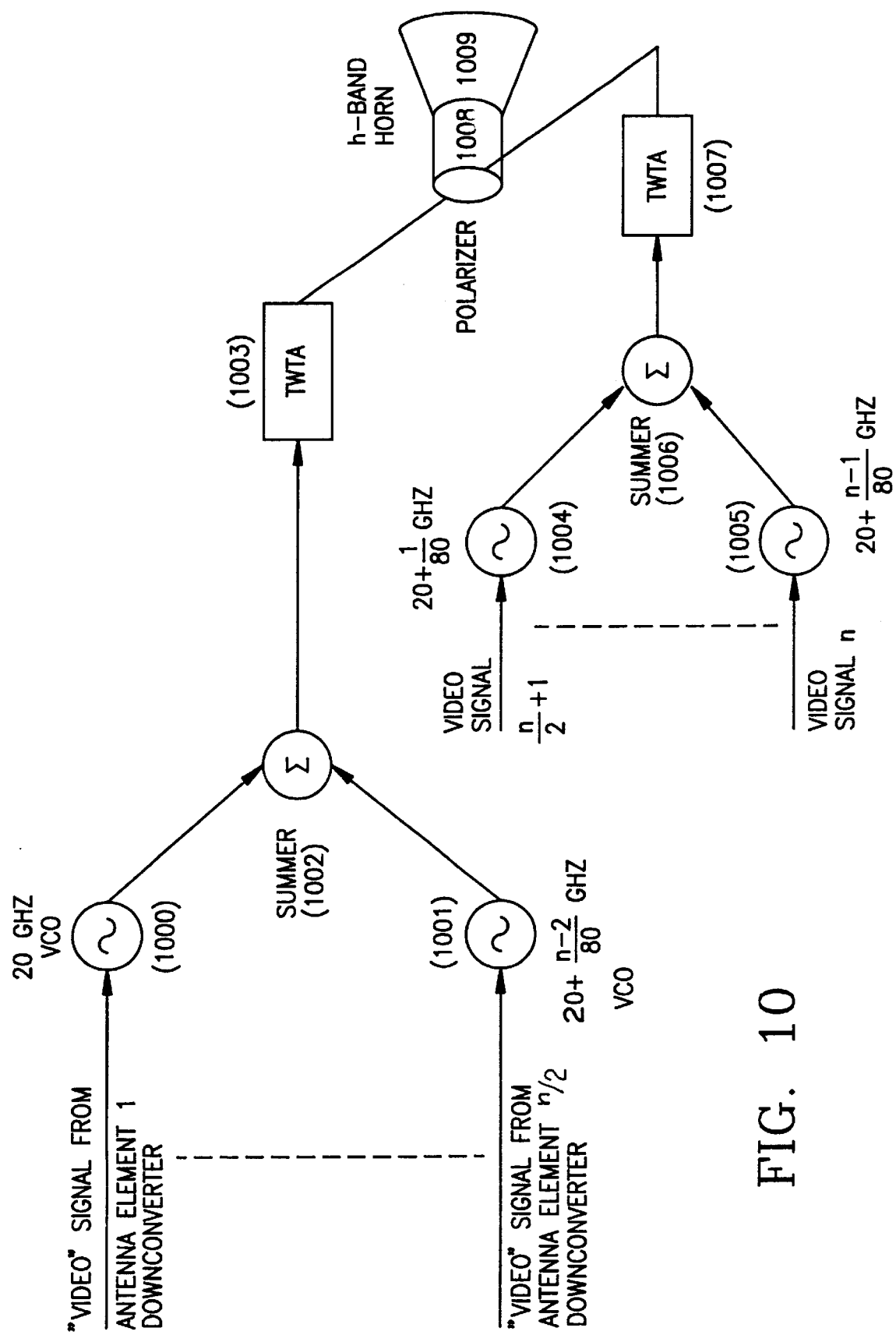
FIG. 10 illustrates coherent beam signal transmission according to an exemplary embodiment of the present invention.

FIG. 10 shows an exemplary arrangement for coherent transmission of "video" signals from each beam. The video signal from the first antenna feed element's (beam) down-convertor (not shown) is fed to the voltage control input of a 20 GHz voltage controlled oscillator (VCO) 1000. The video signal frequency modulates the VCO. Successive VCO's with their center frequencies offset by the desired channel spacing (e.g., 25 MHz) are used for the signals from antenna feed elements 2,3 . . . to n/2. The VCO center frequency for signal 2 according to this exemplary embodiment is 25 MHz (i.e., 1 GHz/40) higher than that for signal 1, and the VCO 1001 frequency for signal n/2 is thus $(n/2-1)\times 1$ GHz/40=$(n-2)/80$ GHz higher than that for signal 1. The signals from the VCOs are summed in summer 1002 which can be, for example, a waveguide or stripline directional coupler network, and the sum is amplified in a common amplifier 1003 which can, for example, be a travelling wave tube amplifier (TWTA).

A parallel arrangement is used to deal with the other half of the video signals numbered n/2+1 to n. The VCO 1004 for signal n/2+1 is offset by half a channel spacing (i.e., by 12.5 MHz in the above example where channel spacing is 25 MHz) from that of VCO 1000 and this offset is maintained up to VCO 1005 such that the set of frequencies used in the parallel arrangement are all offset half of a channel from those of the first arrangement. This minimizes any interference which may be caused by imperfect polarization isolation in the dual polarization transmission system. The outputs of the two TWTAs are connected to, for example, dual-circular-polarized horn antenna 1009 via a polarizer 1008. The function of the polarizer 1008 is to launch a Right Hand circularly polarized signal into horn antenna 1009 corresponding to the signal from TWTA 1003 and simultaneously a Left Hand Circularly polarized signal corresponding to the signal from TWTA 1007.

Figure 11:
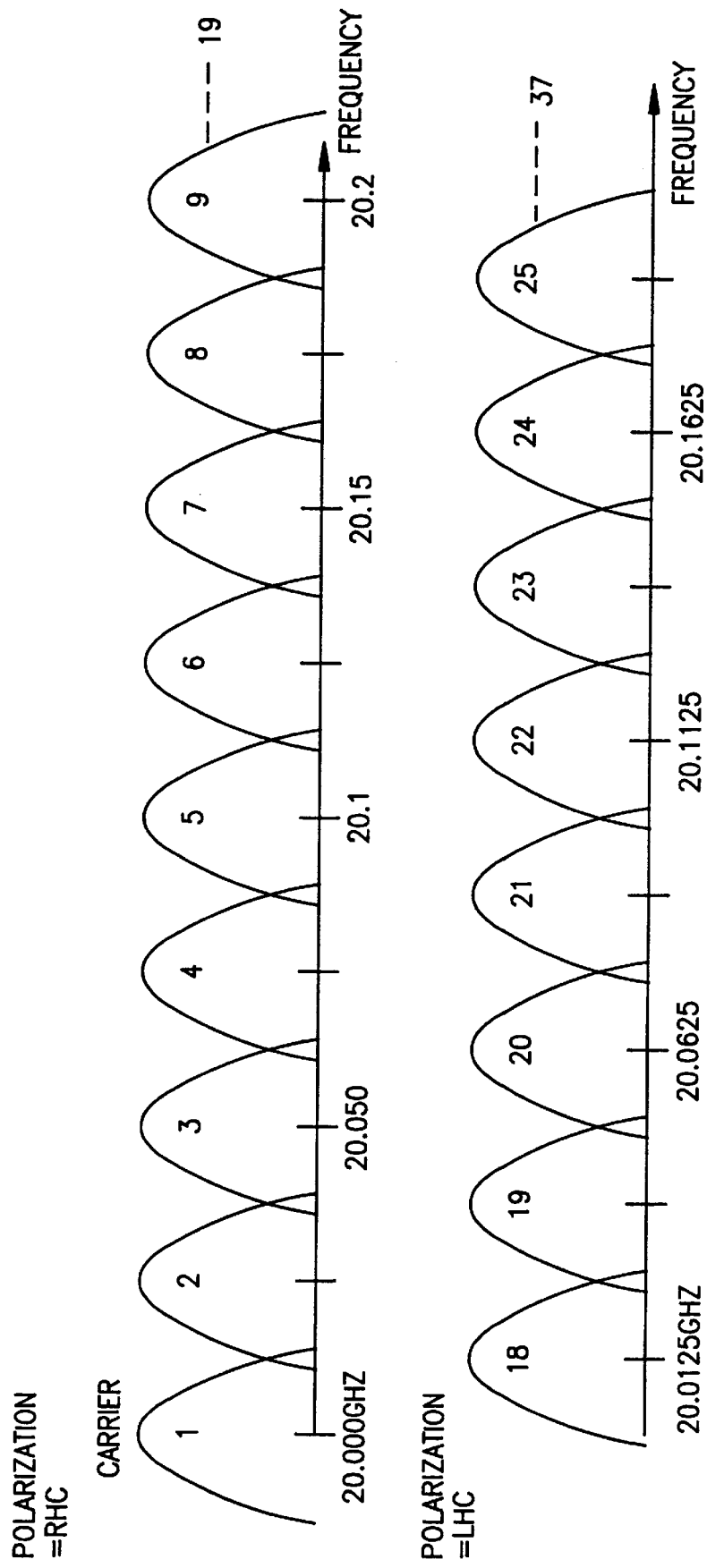
FIG. 11 shows spectral characteristics using dual polarizations on k-bank hublinks according to an exemplary embodiment.

At the hubstation, the composite signal is received by a dual circularly polarized antenna and the two polarizations are split into two respective banks of FM receivers. The center frequencies of the FM receivers correspond to the center frequencies of the VCOs of FIG. 10. The demodulated outputs from the FM receivers reproduce the signals received at the satellite L-band antenna elements preserving their phase and amplitude relationships. FIG. 11 shows an exemplary relationship between the K-band transmission spectra for the two polarizations, showing how the half-channel offset between the RHC and LHC center frequencies minimizes interaction.

Those skilled in the art will readily appreciate that the block diagrams of FIG. 10 is merely illustrative of an exemplary arrangement of coherent signal transmission according to the present invention and that many functional equivalents flow therefrom. For example, it might be advantageous first to generate the frequency modulated signals at a lower frequency than 20 GHz, for example 2–3 GHz and, after summing, to convert the composite signal to 20 GHz by mixing the summed signal with a common 18 GHz local oscillator and selecting the upper sideband with a bandpass filter.

The above discussion has centered on the coherent transportation of signals received by the satellite L-band antenna elements to the hubstation. The same function, namely the transportation of signals generated at the hubstation, is used in reverse for radiation by respective satellite antenna elements, e.g., by the transponder of FIG. 8. The hubstation can use a similar arrangement to FIG. 10, but with a set of K-band frequencies different from those used in the satellite-to-hub direction, and with a larger antenna at the ground end. The satellite can employ a second, dual-polarized horn antenna for reception, or alternately use the same horn antenna and polarizer 1008 and 1009 as in FIG. 10 with the addition of a transmit/receive diplexing filter for each polarization to separate the transmit and receive signals. Linear amplifier 350 can be duplicated for each polarization and used to feed respective halves of FM receiver bank 340. The same half-channel frequency offset between the carriers of the two polarizations is also advantageous in the hub-to-satellite direction.

Figure 12:
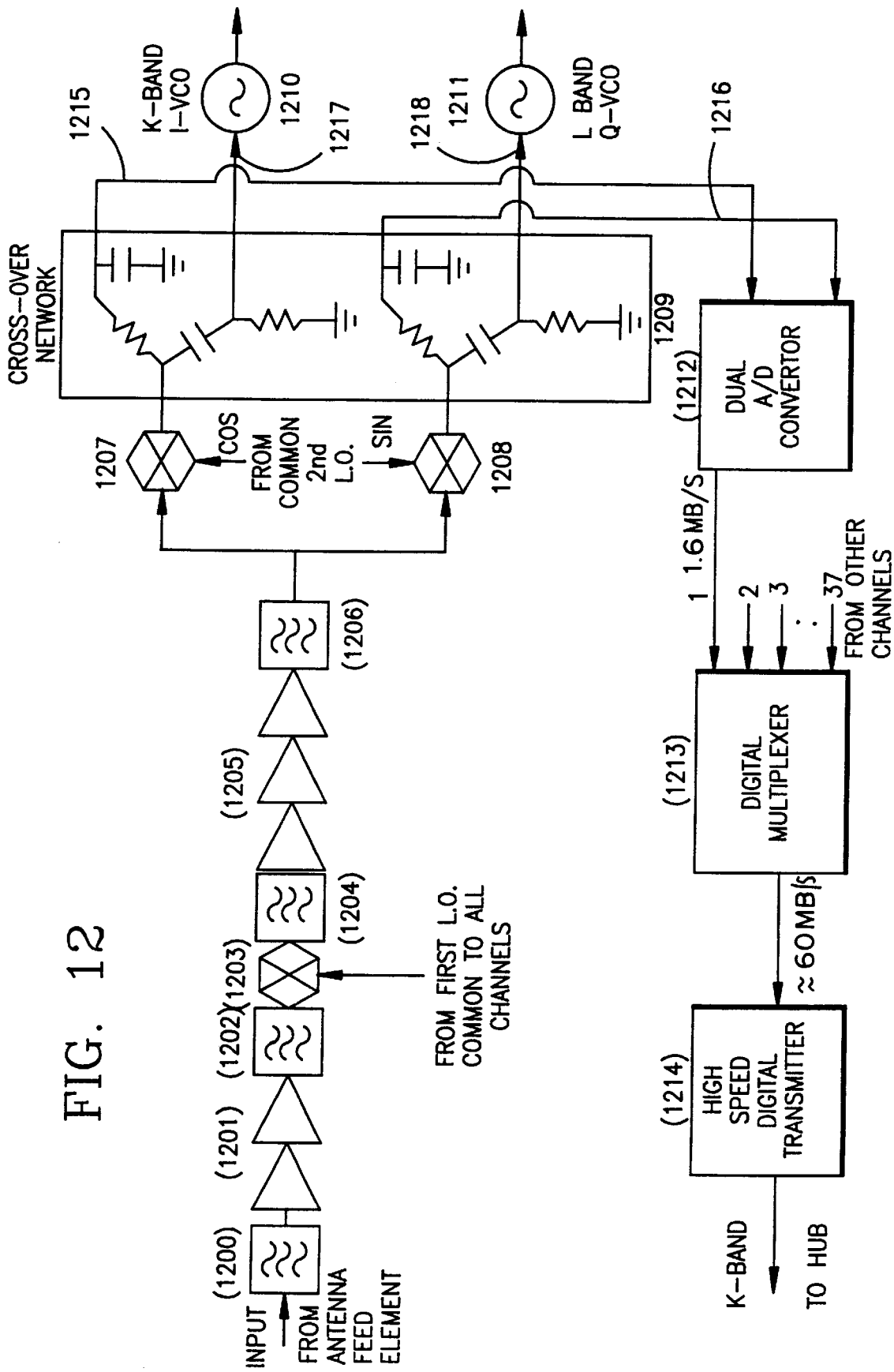
FIG. 12 is a block diagram illustrating phase coherent transportation of the beam signals according to an exemplary embodiment.

FIG. 12 shows an alternative arrangement according to another exemplary embodiment of the present invention for coherently transporting multiple signals between the hub and the satellite. In this figure, each satellite transponder channel corresponding to one antenna feed element is shown as a double downconversion process comprising an antenna filter 1200, a low-noise amplifier 1201, image rejection filter 1202, first downconvertor 1203, IF filters 1204, 1206, IF amplifier 1205 and quadrature downconvertors 1207, 1208. The first downconvertors 1203 can use the same local oscillator signal for all channels to preserve relative coherency. The quadrature downconvertors 1207 and 1208 can use the same second local oscillator cosine and sine reference signals for all channels, again to preserve relative coherency. The quadrature downconvertor outputs, for example in the 0–3 MHz range, are split in crossover network 1209 into 0–50 KHz components on lines 1215 and 1216 and 50 KHz–3 MHz components on lines 1217 and 1218. The 50 KHz to 3 MHz components correspond to uplink traffic channels using, for example, FDMA, an FDMA-plus-narrowband-CDMA hybrid or narrowband FDMA/TDMA, and are used to modulate separate I and Q K-band transmitters for relaying these signals coherently to the hubstation. These components modulate the I and Q voltage controlled oscillators 1210 and 1211. The outputs of these oscillators are summed in a K-band summing network and the sum fed to a common TWTA for amplification to the desired downlink transmit power level. It is also advantageous to combine half the VCOS, e.g., the I VCOs into a first TWTA to form a signal for transmitting using RHC polarization, the other half being transmitted with LHC. A similar arrangement can be employed at the hubstation for coherently conveying the composite signal for each beam to the satellite.

The corresponding K-band receivers would comprise an FM receiver for each of the I signals and an FM receiver for each of the Q signals. These FM receivers would preferably have automatic frequency control (AFC) which removes DC and low frequency components of the I and Q signals, equivalent to having a notch in the frequency response in the center of the channel. This is of little consequence for wideband TDMA signals and for FDMA simply means not using the channel in the center of the band for traffic.

In the satellite, the outputs of the K-band receivers are reconstituted I and Q signals that are used to modulate COS and SIN L-band carriers using a quadrature modulator to produce coherent beam signals. These are applied to L-band power amplifiers for each beam or to the PA of the aforementioned matrix type.

The frequency arrangements used can be similar to those depicted in FIG. 11, with RHC polarization being used, for example, for I components and LHC polarization for Q components, and the carrier spacings being reduced such that they are commensurate with a 3 MHz modulating signal instead of 7 MHz. A half-channel offset between the RHC- and LHC-polarized carriers is also advantageous in this I,Q method.

The I and Q signals represent, respectively, the projections of the complex received signal vectors on the real and imaginary axes, and preserving the correct amplitude relationships between the I and Q signals will then preserve the vector relationships including relative phase. The 2n I and Q video signals can be used to frequency modulate 2n K-band carriers having less than half the channel spacing previously used in FIG. 10, for example 10 MHz. While it may appear more spectrally efficient at K-band to use this method, it is difficult in practice to handle I,Q signal components down to true zero frequency due to DC offsets and frequency errors.

Consequently it is desirable to employ AC coupling and thus exclude a portion, for example 0–50 KHz, of the 0–3 MHz video signals from transmission. This places a notch in the center of the 6 MHz wide L-band bandwidth that is transponded by this exemplary method. Depending on the nature of the signals, this notch may be of no consequence. For example, in copending, commonly assigned U.S. Patent application Ser. No. 5,539,930/08/179,954, entitled "TDMA/FDMA/CDMA Hybrid Radio Access Methods" and filed on Jan. 11, 1994, which is incorporated here by reference, there is disclosed a hybrid access method suitable for satellite-cellular applications in which signals are conveyed on the downlink (satellite-mobile) by wideband TDMA in which each mobile signal occupies an assigned timeslot in a repetitive frame structure, and on the uplink (mobile-to-satellite) by Frequency Division Multiple Access (FDMA) or a combination of FDMA and Code Division multiple Access (CDMA). For example, a 6.5536 megabit per second TDMA signal comprising 512 timeslots can be transmitted from the hubstation for transponding through the 6 MHz bandwidth of each satellite antenna feed element to a corresponding number of mobile phones in each cell. The omission of a small fraction of the bandwidth in the center of the channel will not disturb the character of such a signal significantly, and such disturbance as may occur can be compensated at the receiving radio using the technique for DC offset compensation disclosed in commonly assigned U.S. Pat. No. 5,241,702 to Paul W. Dent entitled "D.C. Offset Compensation in a Radio Receiver" which is incorporated here by reference.

When such 512-timeslot TDMA formats are used on the downlink, one or more timeslots can be dedicated for use as a common signalling channel, also known as a calling channel, forward control channel, or paging channel. The calling channel is used by the system to broadcast calls to mobile phones originating from the network (e.g., from a PSTN subscriber or from another mobile phone). When a mobile detects its own phone number or ID in such a broadcast message, it replies using a corresponding uplink channel commonly called the "random access channel". The random access channel is so called because it is also used by mobile phones to place mobile-originated calls, that is to request service from the network. With a large population of roaming mobile phones, these requesting events seem to the system to arise more or less at random.

According to the aforementioned "TDMA/FDMA/CDMA Hybrid Access Methods" patent application, there is associated with each downlink timeslot a corresponding uplink carrier frequency. Thus to employ the aforementioned disclosure in conjunction with the I, Q version of the present invention, the uplink carrier frequency associated with the downlink calling channel timeslots can be chosen to correspond to the ±50 KHz in the center of the 6 MHz bandwidth and is used as the random access channel.

Accordingly, the 0–50 KHz signals from the crossover network 1209 represent random access signals and because of their relatively low bandwidth the option of digitizing on-board and transmission by digital means to the hubstation exists. This is carried out by A/D convertors 1212, the outputs from each channel of which are multiplexed in multiplexer 1213 to form a composite bitstream on the order of 60 MB/s which modulates a digital transmitter 1214 for transmission to the hubstation.

Figure 13:
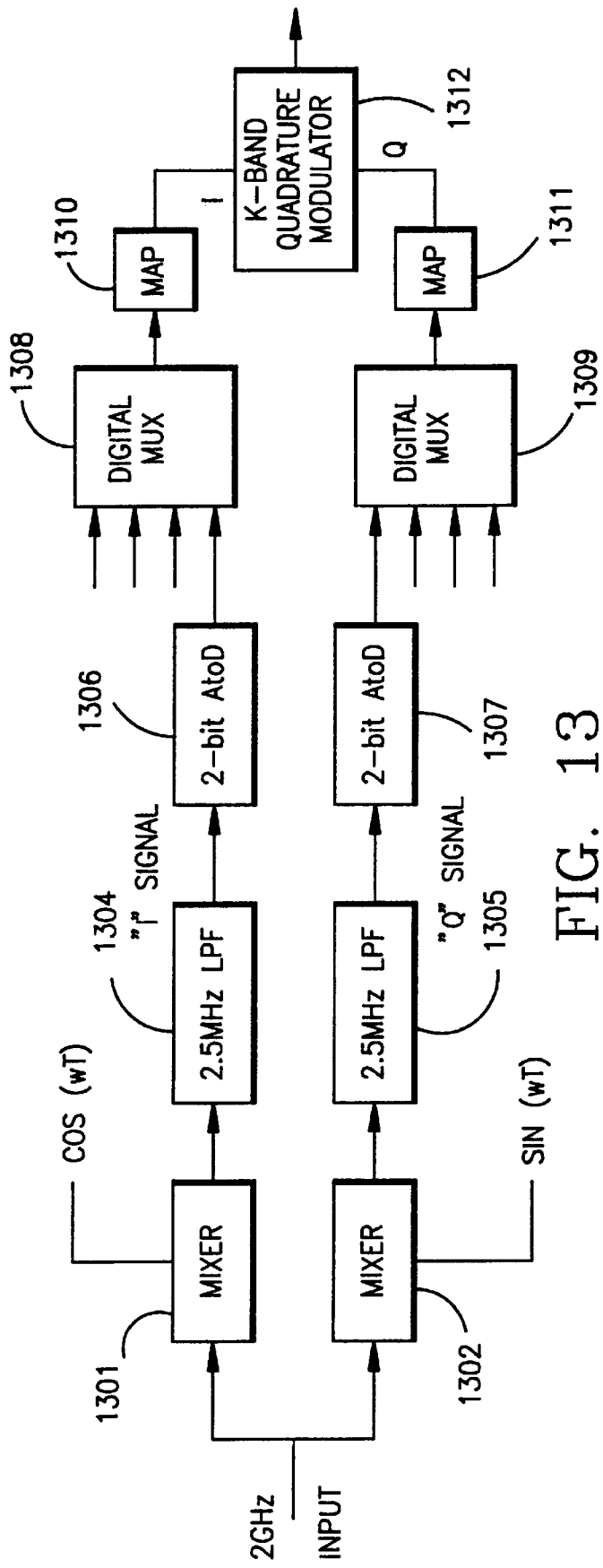
FIG. 13 is a block diagram illustrating phase coherent transportation of beam signals according to another exemplary embodiment of the present invention.
Figure 14:
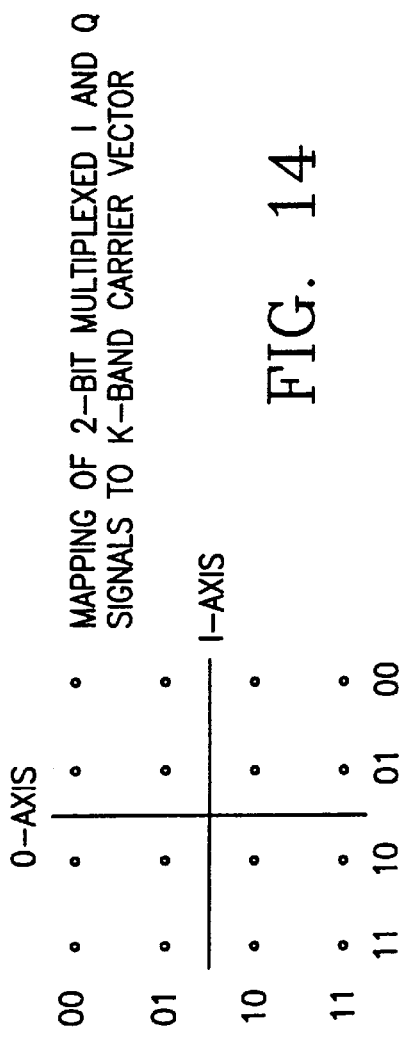
FIG. 14 illustrates mapping of 2-bit multiplexed I and Q signals to a K-band carrier vector.
Figure 15:
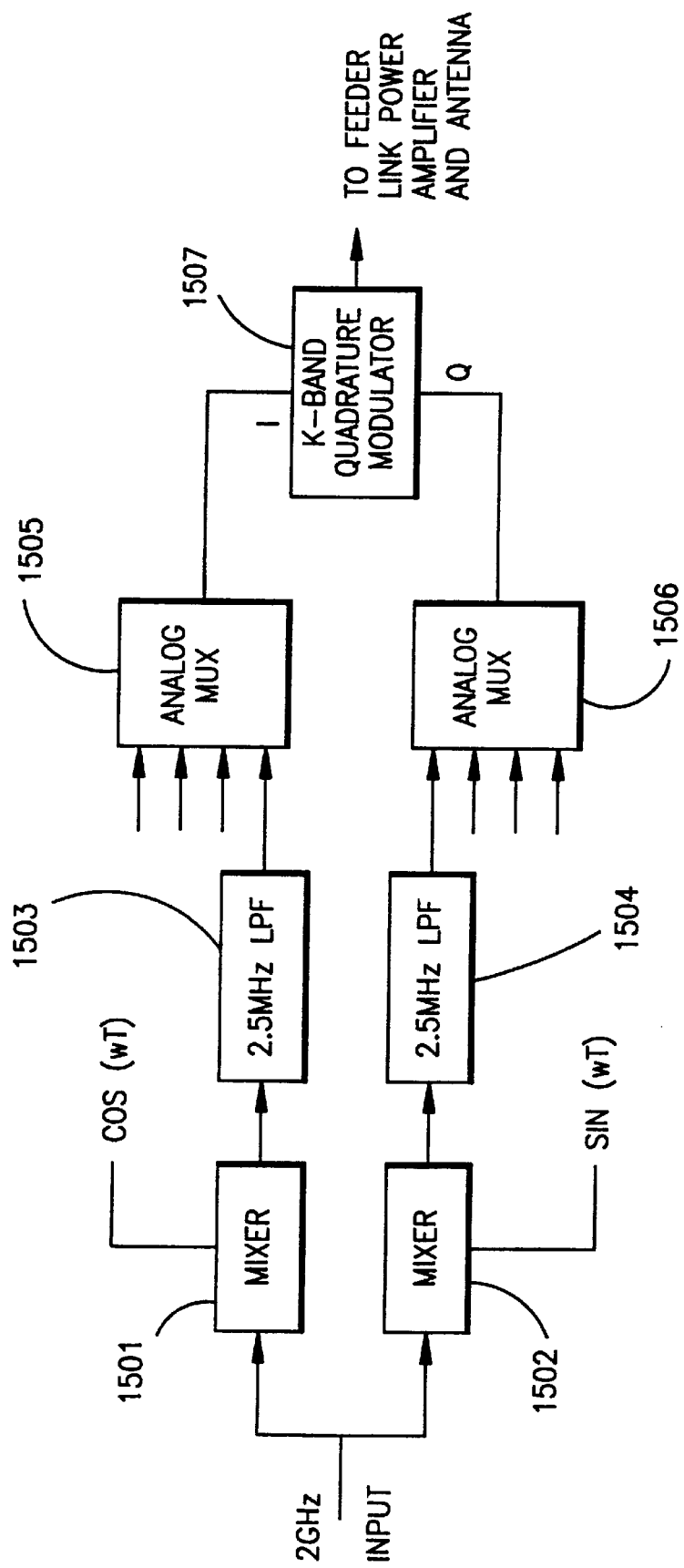
FIG. 15 is a block diagram illustrating yet another exemplary embodiment of phase coherent beam signal transportation.

According to yet another exemplary embodiment, antenna element signals can be transported coherently between the ground station and the satellite without bandwidth expansion. FIGS. 13 and 14 illustrate an exemplary coherent transmission method and apparatus which is based on analog to digital conversion of each of the antenna signals followed by digital multiplexing and then modulation of the multiplexed stream on to the K-band feeder link carrier by means of Quadrature Amplitude modulation. FIG. 15 illustrates an alternative apparatus derived from FIG. 13 which equates to infinite AtoD and DtoA precision, thus permitting the AtoD's and DtoA's of the exemplary embodiment of FIG. 13 to be replaced by analog multiplexing.

With reference to FIG. 13, operation of this coherent transmission system is as follows. A 2 GHz signal received from one of a plurality of satellite-borne antenna elements is low-noise amplified and downconverted against cosine and sine local oscillator signals using mixers 1301 and 1302. If the bandwidth at 2 GHz that is downconverted is 5 MHz, then the resulting I and Q signals are of bandwidth 2.5 MHz each. Thus the desired bandwidth of 5 MHz may be imposed by the use of 2.5 MHz cut-off low pass filters 1304, 1305 operating on the I and Q signals. These mixers, filters and AtoD convertors 1306, 1307 are repeated for each separate antenna element signal so treated. The mixers can receive the same local oscillator signals cos(wT) and sin(wT) so as not to introduce any relative phase shift between channels.

The baseband I and Q signals after filtering are converted using AtoD convertors 1306 and 1307. These are arranged to sample and convert the I and Q signals at least at the Nyquist rate, which is twice the bandwidth or, in this example, 5 MS/S. Sampling at least at the Nyquist rate allows the signals to be faithfully reconstructed from the samples. By way of example, the AtoD convertors are illustrated as having only two bits resolution, that is each I or Q signals is classified as lying nearest to one of the four values −3, −1, +1 or +3 arbitrary units, as indicated by a digital code 11, 10, 01 or 00.

In certain applications, two bits quantizing may indeed be sufficient. Such applications are characterized by the total signal-to-noise ratio in the 5 MHz bandwidth at 2 GHz being very low or even negative. This can arise, for example, when the signal bandwidth has artificially been widened by the use of coding or spread-spectrum techniques. If the signal-to-noise ratio is low or negative, a few bits resolution suffice to make the digital quantizing noise lower than the radio noise to avoid degradation. Those skilled in the art will appreciate that for applications having higher signal-to-noise ratios, more bits can be used to provide greater precision.

With the two-bit example, bit-pairs representing instantaneous I samples and Q samples are collected from all antenna elements and multiplexed using digital multiplexers 1308 and 1309. The output of digital multiplexers 1308 and 1309 is a two-bit I and two-bit Q signal, respectively, for antenna number 1, followed by the same for antenna number 2, then 3, 4, etc., until antenna 1 is again sampled. The succession of two-bit values of I and Q is then to be transmitted by modulation onto the K-band feeder link carrier frequency.

Since the number of bits per second is 4N×5 MS/S=20N Mbits/S, a bandwidth-efficient digital modulation scheme is required to avoid the signal occupying more than the 5N MHz of the original N signals. A suitable modulation scheme can, for example, be 16 QAM. In 16 QAM, four bits of data are conveyed per transmitted symbol, by mapping two bits to one of four K-band carrier real vector values (i.e., the amplitude of a cosine carrier component) and two bits to one of four imaginary vector values (i.e., the amplitude of the sine component). The 4×4 grid of possible points that result is shown in FIG. 14. Using 16 QAM, I bitpairs are mapped to the K-band I axis and Q bitpairs to the K-band Q axis using DtoA convertors 1310 and 1311. Finally, the desired K-band vector components are formed by applying the outputs of two-bit DtoA convertors 1310 and 1311 to a K-band Quadrature Modulator 1312 which is driven by K-band cosine and sine carrier waves (not shown) to form a modulated output signal for transmission via the K-band feeder link antenna (also not shown).

The multiplexer can preferably have more inputs than signals from antenna channels. For example, a typical antenna arrangement can be a hexagonal array of 61 antenna elements. A 64-input multiplexer can then be suitable, as a power of two arises naturally in multiplexer construction. The 3 spare inputs can then be connected to reference I,Q signals equal respectively to (0,0), (1,0) and (0,1). The ground station receiver can use these reference signals to synchronize its demultiplexing and to determine quadrature modulator carrier leakage (offset) from the (0,0) case, and to provide phase references from the (1,0) and (0,1) cases for discriminating the I-axis bits from the Q-axis bits.

In case two-bit quantization is inadequate, AtoD convertors 1306 and 1308 can be of a higher resolution, for example four bits. Then each 4-bit I and 4-bit Q sample will represent one of 256 possibilities, and this can be transmitted using 256 QAM in the same way as described above for 16 QAM. However, a simplification is possible by noting that the complementary operations of AtoD conversion performed in blocks 1306, 1308 and mapping to a symbol performed by DtoA convertors 1310 and 1311 simply cancel each other out and can be omitted in this alternate exemplary embodiment. Then, the full unquantized accuracy of the analog I and Q signals from the low pass filters is preserved through the multiplexers and the digital multiplexers are replaced with analog muitiplexers as shown in FIG. 15.

In FIG. 15, baseband signals are produced by downconvertors 1501, 1502 and low pass filters 1503, 1504 as described above with respect to FIG. 13. The I,Q signals are however no longer digitized and instead are applied directly to the inputs of analog multiplexers 1505, 1506 along with corresponding signals from other antenna channels (not shown). The multiplexed I samples then modulate a K-band cosine carrier and the multiplexed Q samples modulate a K-band sine carrier, by use of quadrature modulator 1507. Spare inputs of the analog multiplexers, as previously indicated, can be used to multiplex and transmit reference values such as (0,0), (1,0) and (0,1) which can be helpful in assisting the ground station receiver to acquire demultiplexor synchronization and in correcting certain errors in the quadrature modulator such as carrier imbalance (carrier leakage, offset) and imperfect quadrature (i.e., the cosine and sine carriers are not exactly 90 degrees apart).

The configuration illustrated in FIG. 15 has an advantage that substantially no bandwidth expansion of the signal takes place from 2 GHz to K-band. The N, 5 MHz wide antenna signals received at 2 GHz are retransmitted at K-band using substantially the same 5N MHz bandwidth. Furthermore, no quantization noise is introduced.

A suitable analog multiplexer for the exemplary embodiment of FIG. 15 can be constructed as a binary tree, in which pairs of 5 MS/S signals are first multiplexed in relatively low-speed, 2-input multiplexers to form 10 MS/S signals.

Then pairs of these are multiplexed in higher speed 2-input multiplexers to form 20 MS/S signals and so on. The multiplexers can be constructed in a bipolar, CMOS or BiCMOS integrated circuit using current steering in which a signal is applied to the junction of two transistor inputs (e.g., emitters) that are alternately enabled or disabled by a control signal (applied, e.g., to bases) to either pass the signal current through one of the devices or to shunt it away through the other. Gallium arsenide technologies, such as HBT, are also very suitable for constructing high speed multiplexers.

The ground station processing system receives the time-multiplexed antenna signals on K-band, converts those signals down to I,Q baseband signals of 2.5N MHz bandwidth each, and then demultiplexes them into N, separate 2.5 MHz bandwidth signals of 5MS/S each (the Nyquist rate or higher). These signals can then be digitized on the ground to whatever accuracy is required for further processing such as using an equalizer for removing inter-sample interference on a sample caused by smearing from adjacent samples due to deliberate or accidental bandwidth restrictions in the K-band transmitter, receiver or propagation path. Such an equalizer operates by subtracting a defined amount of a previous and subsequent complex (I,Q) sample value from a current value, the defined amounts being given by complex coefficients that are chosen to cancel inter-sample interference. This process can also be applied in reverse for conveying to the satellite using K-band complex signal vector samples for transmission by respective antennas at, for example, S-band.

The N separate, complex (I,Q) sample streams are first preferably subjected to pre-equalizing at the ground station such that they will be received with zero intersample interference at the satellite. Then the time-multiplex modulated K-band signal is downconverted in the satellite against a K-band local oscillator to give multiplexed I and Q streams. If desired, two or more stages of downconversion can be employed so that amplification takes place at convenient intermediate frequencies. This may also apply to the 2 GHz downconverters of FIG. 13, but note that the same local oscillator signals should then be employed in all corresponding stages of downconversion for each antenna element so as not to introduce relative phase shifts.

The multiplexed I,Q streams received by the satellite can be demultiplexed using the same multiplex clock (not shown) used for multiplexers 1505 and 1506. The onus is thus on the ground station to transmit a signal taking into account propagation time such that the signal will arrive in the correct timing relationship to ensure proper demultiplexing on board the satellite. In this way, the satellite function is kept simple and reliable and complexity is restricted to the ground, where equipment can be repaired should it fail.

The above description has been simplified for purposes of illustration to the case where all antenna element signals are time-multiplexed to a single TDM complex sample stream. Those skilled in the art will readily appreciate, however, that a hybrid TDM/FDM scheme could be used in which groups of time-multiplexed signals are formed and used to modulate separate FDM carriers. This modification could be used if, for example, a single multiplex stream would result in an impractically high sample rate.

It is also for the purposes of illustration that the above description has concentrated on the Cartesian (I,Q) representation of complex signals. It is equally possible to form polar or logpolar representations of complex signals, to multiplex these signals using analog multiplexers prior to modulating a K-band feeder link or to digitize them using the method of U.S. Pat. No. 5,048,059, which was earlier incorporated by reference, prior to multiplexing.

Figure 16:
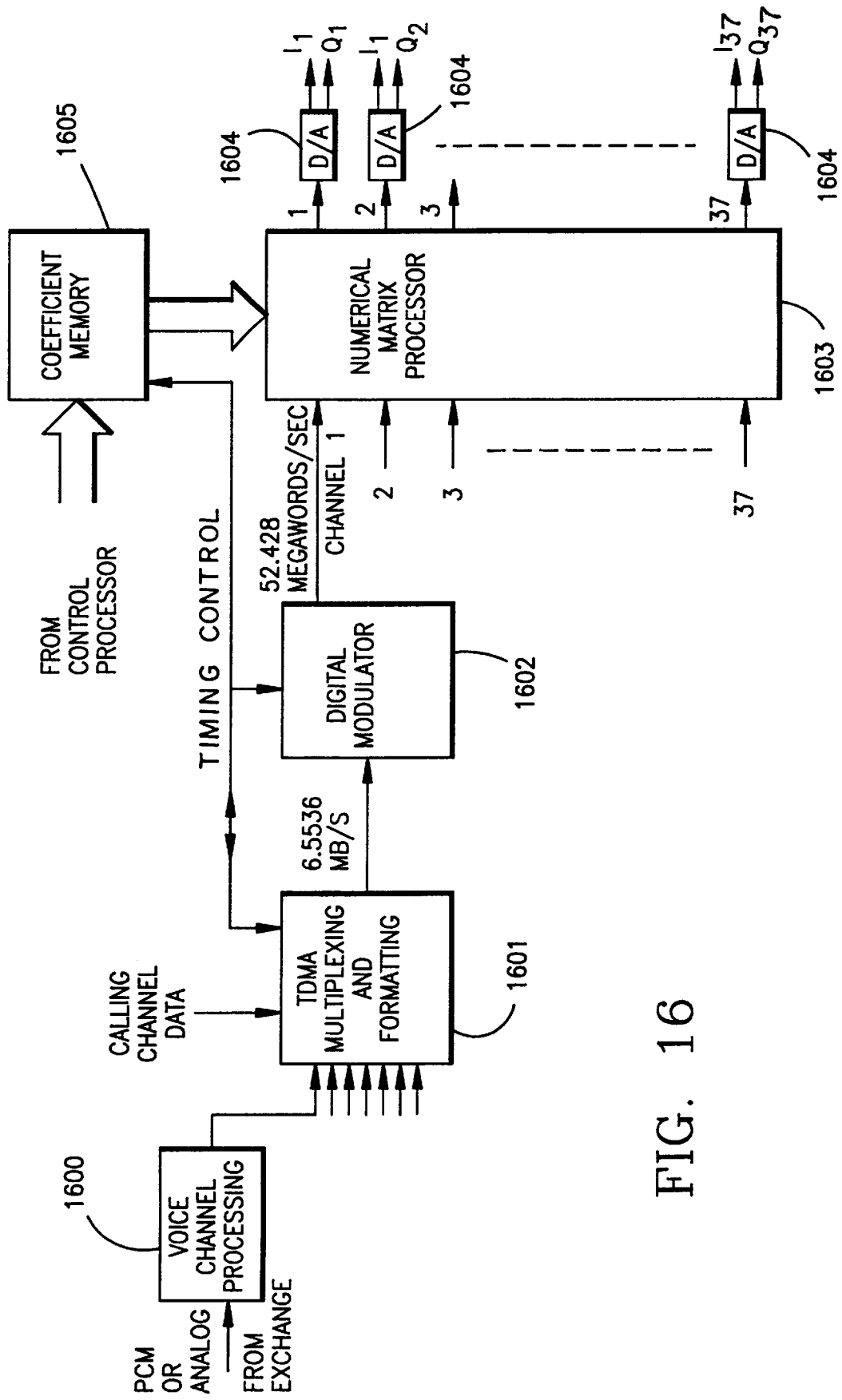
FIG. 16 is a block diagram illustrating hubstation transmit signal processing according to an exemplary TDMA embodiment of the present invention.

FIG. 16 shows transmit signal processing in the hubstation for this exemplary embodiment of the present invention. Each voice channel to be transmitted to a mobile phone can be received either as a standard 64 KB/s PCM signal or as an analog signal which is converted to PCM. The PCM signal is then transcoded to a lower bit rate, such as 4.8 KB/s, using a conventional voice compression algorithm such as CELP (codebook excited linear prediction), RELP, VSELP or sub-band coding. The transcoded voice signal is then subject to error correction coding and supplementary bits can be added such as the Cyclic Redundancy Check bits (CRC), Slow Associated Control Channel signalling information (SACCH), per-slot syncwords and inter-slot guard symbols. This per-channel processing takes place in voice processing channel cards 1600. The output bitstreams from, for example, 500 such channel cards, are then multiplexed with a control channel data stream from a control processor (not shown) in multiplexer 1601 to form the TDMA bitstream, for example, of 6.5536 megabits per second. This is submitted to a digital modulator 1602 that numerically converts the information stream to a stream of complex numbers at a sample rate of, for example, eight samples per bit representing the I, Q components of a modulation waveform.

The TDMA signal produced as described above is targeted for transmission to a first set of, for example, 500 mobile phones in a particular cell or area. A number of other such TDMA signals formed by similar circuitry 1600, 1601, 1602 are produced for transmission to other sets of 500 mobile phones in 36 other cells. The total number of cells (e.g., 37 in this exemplary embodiment) times the number of traffic channels per cell (e.g., 500) gives the total system capacity as 18500 voice channels. The signals in timeslots 1 of each cell are transmitted simultaneously on the same frequency to their respective cells. To avoid spillover interference from adjacent cells using the same frequency at the same time, this exemplary embodiment of the present invention includes matrix processor 1603 to process the signals from modulators 1602 by weighted addition using a matrix of 37×37 complex coefficients for each timeslot. The 37×37 coefficients for each timeslot are contained in coefficient memory 1605 which can be distributed within the components of the numerical signal processor but which is collectively identified as a separate block 1605 in FIG. 16 to better illustrate the principle. During the first timeslot, a first set of coefficients C is selected from the memory and used to matrix-multiply the modulation signals from modulator 1602 to obtain signals for D/A convertors 1604. Each D/A convertor can be a dual-channel unit capable of operating with complex numbers. For example, the output signals from the matrix processor can consist each of a 12-bit real (I) and 12-bit imaginary (Q) part which are D/A converted to produce analog I, Q signals. The I, Q signals are fed to FM K-band FM transmitters for transmission from the hubstation to the satellite.

When transponded by the satellite to the ground on S-band, the result of the matrix processing will be that each mobile phone receives only its own signal, the inter-cell interference from other cells having been cancelled by the addition in the matrix processor of compensating amounts of opposite sign as determined by the coefficients retrieved from memory 1605. This is possible if the 37 mobiles using timeslot 1 in their respective cells are spatially separated, i.e., not both at the same location on the edge of their respective cells. This condition can be maintained by the exemplary timeslot assignment algorithm feature of the present invention, which also provides a general channel assignment algorithm, and is based on maximizing the signal quality provided to the worst case mobile.

A timeslot duration is typically about 40 $\mu$S if a 20 mS TDMA frame period is used. One timeslot corresponds to 256 bit periods at 6.5536 MB/s and 2048 complex numbers are produced by modulator 1602 for every timeslot. After matrix processor 1603 has processed 2048 sets of 37 complex number inputs using the set of coefficients for the first timeslot, the coefficients are changed for the second and for subsequent timeslots to effect correct interference cancellation between corresponding sets of 37 mobiles using timeslots 2, 3 etc.

If two mobiles receiving the same timeslot in different cells approach each other too closely during the progress of a conversation, the control processor (not shown) will note a difficulty in arriving at a suitable set of coefficients for interference cancellation. This is highly unlikely given the limited speed of landmobile phones in relation to typical cell size, but if it occurs, the control processor evaluates whether a timeslot change would be appropriate for one of the mobiles. The aim is to connect the mobile using a timeslot that no other mobile in close proximity is using. If necessary, a mobile even occupying an ideal (e.g., low interference) timeslot could be shifted to a just adequate (e.g., barely tolerable interference) timeslot to release its original timeslot to solve a proximity problem at hand. It is probably not necessary in practice to consider such a situation because with, for example, 500 timeslots to choose from, it would usually be possible to find a better timeslot than the timeslot currently threatening to cause bad signal quality. Allowing one timeslot change per cell per 10 seconds, for example, would be expected to achieve adequately rapid optimization of timeslot assignments and adequate adaptation to mobile movement.

In fact a more rapid rate of adaptation is provided to handle the rate at which new calls are placed and old calls cleared down. With a capacity of 37 mobiles per timeslot and an average call duration of 3 minutes, a particular timeslot is vacated in some cell approximately every 5 seconds and a new call is then assigned to that timeslot. Overall, given, in this example, 500 timeslots and 37 cells, 100 timeslots spread over all the cells are vacated every second and reassigned.

Such a communications system should be designed to not be loaded up to 100% of system capacity or the next call attempt will be blocked. With 500 timeslots per cell available, an average loading of 474 timeslots can be reached for a blocking probability of 1%. Thus, on average, 26 out of 500 timeslots are unused on each of the 37 multiplexers 1302 in this exemplary embodiment. It should be noted that it is immaterial which multiplexer is used to transmit a particular timeslot to a mobile. Whichever timeslot is selected, it is the choice of an associated column of matrix coefficients that determines that mobiles using the same timeslot are non-interfering. Thus if the same timeslot, for example number 371, is vacant on two or more multiplexers 1601, it is immaterial which one is used to connect a new call.

Thus the assignment algorithm executed in the control processor first determines which timeslot is vacant on the greatest number of multiplexers. This is the timeslot on which there are currently the least number of mobile conversations. Using information from the random access receiver on the relationships between signals received from the new mobile (i.e., the C-matrix coefficients determined by correlation of the new mobile's random access signal with all antenna element signals), the control processor evaluates the change needed to the set of coefficients in coefficient memory 1605 associated with the vacant timeslot to maintain non-interference if that timeslot were to be used for the new signal.

The general principles that explain how the choice of coefficients in coefficient memory 1605 is arrived at for an exemplary embodiment will now be outlined.

As discussed earlier, for receiving signals from mobiles, antenna element 1 received an amount C11 of mobile signal M1 plus an amount C12 of mobile signal M2 and so on. To state this more generally, antenna element k received an amount Cki of mobile i's signal. Assuming reciprocity, a signal Tk transmitted from antenna element k would be received in an amount Cki.Tk at mobile i, because the path from element k to mobile i is assumed to have the same attenuation and phase shift in each direction, given by the complex number Cki.

Therefore the signals $\underline{R}$ received at the mobiles are related to the signals transmitted by the antenna elements by the matrix equations:

$$\underline{R}=C^{t}.\underline{T};$$

where the superscript t indicates a transpose matrix.

The transpose of C is used because the first index k of Cki multiplies the corresponding index of the T-element, while, in the mobile-to-satellite direction where the signals received at element k from mobile i are given by Cki.Mi, it is the second index i of C which corresponds to the index i of the mobile signal Mi that it multiplies. Thus the indices of the matrix coefficients are transposed in the satellite-to-mobile direction as compared to the mobile-to-satellite.

In order to achieve non-interference, the set of signals transmitted from the satellite antenna elements should be given by:

$$\underline{T}=C^{t-1}.\underline{R}$$

The inverse of the transpose is just the transpose of the inverse, therefore the set of coefficients contained in coefficient memory 1605 for downlink timeslot(j) are just the transpose of the set of coefficients associated with uplink frequency(j) in numerical processor 650 of FIG. 9, at least under the assumption of reciprocity.

Reciprocity applies when the uplink and downlink frequencies are the same. Relative amplitude reciprocity applies if the antenna element patterns are the same on both uplink and downlink frequencies. Phase reciprocity does not apply, because relative phase depends on the small differences in relative distance travelled by the signals to/from each element, divided by the wavelength and multiplied by 360 degrees. If the wavelength is different on the uplinks and downlinks, then the phase relationships will be different. However, relative time delay differences are frequency independent and therefore reciprocal. Accordingly, a set of relative phase differences at one frequency can be translated to a set of time differences using a first wavelength, and then reconverted to a set of phase differences using another wavelength in order to derive a set of coefficients valid at a second frequency from a set known at a first frequency.

Based on the foregoing discussion, the coefficients for transmit contained in memory 1605 according to an exemplary embodiment of the present invention can be determined by the following steps:

(1) correlating the signal received from a new mobile during its random access transmission with the individual antenna beam element signals to determine a new column of coefficients for the receive C-matrix;

(2) determining a new inverse C-matrix for receiving traffic from the new mobile based on the old inverse C-matrix and the new column;

(3) transforming the new receive C-matrix column to a new transmit C-matrix row by scaling relative coefficient phase angles using the ratio of up- to down-link frequencies; and (4) determining a new transmit inverse C-matrix based on the old transmit inverse C-matrix and the new row.

An exemplary detailed mathematical procedure which can be used to carry out the above exemplary embodiment is now developed for the underloaded case, i.e., the case when there are fewer currently active mobile signals than the number of antenna feed elements available on the satellite to communicate with them. Such spare capacity is typically designed for in radio telecommunications to provide a 98% probability of having a free channel to serve a new call so that customers are not overly irritated at call blockages.

The active mobiles are designated 1 . . . m and the signals intended to be received by these mobiles are designated R1 . . . Rm for this example. The antenna element/transponder channels available for communications therebetween are designated 1 . . . n and the signals fed to the antenna elements for transmission by each respective element are designated T1 . . . Tn. As before, the matrix C, this time an m×n non-square matrix, determines how much of each transmitted signal Tk reaches each mobile as Ri, the matrix is given by the equations:

$$R1 = C11.T1 + C12.T2 \ldots + C1n.Tn$$

$$R2 = C21.T1 + C22.T2 \ldots + C2n.Tn$$

$$\underline{Rm} = Cm1.T1 + Cm2.T2 \ldots + Cmn.Tn$$

or simply $\underline{R} = C.\underline{T}$ in matrix/vector notation.

Because C is no longer square, it has no direct inverse, so there is no unique solution for T given by:

$$T = C^{-1}.R$$

Instead there are a continuum of solutions, as we have more degrees of freedom to choose T values than conditions to satisfy (i.e., n>m).

However by imposing the condition that the mean square power fed to the antenna elements in order to create the desired mobile received signals R shall be minimized, the unique solution below is obtained:

$$T = C'.(CC')^{-1}$$

This equation can be derived as follows. Let $R_{desired}$ be the M-element vector of signals we wish to be received at the receiving stations, and T be the N-element vector of signals applied to the transmitting antennas, where N>M. C is an M by N matrix of coefficients Cik that describes how the signal from transmitter antenna j propagates to receiving station i. Denoting by $R_{achieved}$ the M-element vector of signals actually received, we thus have $$R_{achieved} = C.T \quad (1)$$

We wish to find what T should be as a linear function of the signals desired to be received, so that the minimum total transmit power is consumed in the process. The linear combinations formed by the coefficients of an M by N matrix A to be found are:

$$T = A.R_{desired} \quad (2)$$

Substituting for T from (2) into (1) we get:

$$R_{achieved} = C.A.R_{desired}$$

showing that $R_{achieved} = R_{desired}$ only if C.A is the M×M unit matrix I $$\text{Thus } C.A = I \quad (3)$$

is a necessary condition. Since C is not square, we cannot simply invert it and write:

$$A = C^{-1}$$

Moreover, C.A.=I is a set of M×M equations that the N×M unknowns A must fulfill so that the M×M terms of the product indeed give the M×M unit matrix I.

Since N>M, the number of unknowns is greater than the number of equations, so there is no unique solution to equation (3), but a continuum of solutions. Other conditions must be imposed to define a particular solution of interest. The condition imposed here is that the total power inherent in transmitting the vector of signals T is minimized.

It can be verified that a particular solution of equation (3) is $A = C'(CC')^{-1} = U$, where ' signifies conjugate transpose. This can be verified by substituting the particular solution U for A in equation (3), obtaining:

$$C.U = C.C'(CC')^{-1} = (CC') \cdot (CC')^{-1},$$

which is clearly equal to I as required.

A general solution can be formed by adding an arbitrary matrix V to the particular solution found above, obtaining:

$A = C'(CC')^{-1} + V$, but this must still fulfill equation (3). Substituting this value of A into equation (3) we get:

$$C(C'(CC')^{-1} + V) = I$$

i.e., $$CC'(CC')^{-1} + CV = I$$

i.e., $$I + CV = I$$

i.e., $$CV = 0 \quad (4)$$

Thus, V may be arbitrary only so long as it fulfills equation (4). It is possible for a non-zero V matrix to give identically zero when premultiplied by C as long as all V's columns are orthogonal to all C's rows. The rows of C are N-element vectors, but there are only M of them, therefore they do not totally span their N-dimensional space. There are N-M other dimensions in that space that the rows of C do not project into, and the columns of V may thus consist of any vectors that are confined to that N-M dimensional sub-space that do not project into C's M-dimensional sub-space.

Thus, the general solution of equation (3) is $$A = U + V;$$

where U is the particular solution identified above and V must satisfy C.V=0

The transmitted signals T are given by $$T1 = A11.R1 + A12.R2 + \ldots A1m.Rm$$

$$T2 = A21.R1 + A22.R2 + \ldots A2m.Rm$$

$$\ldots$$

$$\ldots$$

$$Tn = An1.R1 + An2.R2 + \ldots Anm.Rm$$

where R1, R2, etc. are the elements of $R_{desired}$. If R1, R2, etc. are all independent signals intended for different receiving stations, there is no correlation between them so they add rms-wise in the linear summing process that forms the T-elements.

Thus, the mean square value of T1 is just $|A11.R1|^2 + |A12.R2|^2 \ldots + |A1m.Rm|^2$ Likewise, the mean square value of T2 is $|A21.R1|^2 + |A22.R2|^2 \ldots + |A2m.Rm|^2$ Adding these expressions down columns that contain the same Ri, we get:

$$POWER = SIGMA_j \, [|Ri|^2 \cdot SIGMA_i |Aij|^2]$$

Now $SIGMA^i |Aij|^2 = SIGMA_i(Aij.Aij) = SIGMA_i \, (A'ji.Aij)$, where A'ji refers to element ji in the conjugate transpose of A. But this value SIGMA is simply the jj diagonal term of the whole matrix product $Xjk = SIGMA_i \, (A'ji.Aik)$, which is the equation for matrix multiplying A' and A, i.e., X=A'A.

Now substitute A=U+V; then:

$$X = (U'+V').(U+V) = U'U + V'V + U'V + V'U$$

and $$U'V + V'U = 2 \, Re \, (U'V).$$

Substituting $U = C'(CC')^{-1}$, i.e., $U' = (CC')^{-1}C$, into the foregoing equation, we get $U'V = (CC')^{-1}.CV = 0$ because CV=0. Therefore $2Re(U'V) = 0$ and $U'V + V'U = 0$.

Hence $SIGMA_i |Aij|^2 = SIGMA_i \, (|Uij|^2 + |Vij|^2)$, leading to:

$$POWER = SIGMA_j \, [|Ri|^2.SIGMA_i|Uij|^2] + SIGMA_j \, [|Ri|^2. SIGMA_i|Vij|^2]$$

Since the two terms involving respectively U and V can only be positive, the power is minimized when the choice of the arbitrary matrix V in the second term is zero. Hence, the solution for the transmit signals that create the desired received signals is:

$$T = A.R_{desired} \text{ where } A = C'(CC')^{-1}$$

This solution also holds for the case where N=M, for then C is square and the above reduces to:

$$A = C^{-1}$$

Applying the foregoing principles, the spare degrees of freedom are used not just to create co-channel interference free signals at every mobile, but also to maximize the wanted signal values for a given total radiated power. The total mean square radiated power is in fact the sum of the square magnitudes of the coefficients of the matrix A defined by:

$$A = C'^t \, (C.C)^{-1}$$

The sum of the squares down a column of A gives the radiated power used in communicating with a corresponding mobile. The worst case mobile, i.e., that using the most satellite power, can thus be identified. According to an aspect of the present invention, the control processor at the hubstation periodically examines whether total satellite power can be minimized (or utilization of power optimized) by removing the worst case mobile from the current group the mobile is associated with and associating that mobile with a different group. This is done by recomputing the above expressions with C diminished by the row corresponding to the worst case mobile, thus determining the satellite power saving that would be saved in supporting only the remainder in the most efficient manner. Then the removed row of C is used to augment in turn each of the C matrices associated with other groups of mobiles using different frequency channels (FDMA) or multi-carrier (CDMA) or timeslots (TDMA) and the above expressions computed to determine the increase in power that would be necessary to support that mobile as a member of each of the other groups in turn. If the increase in power in one of these cases is less than the power saved by removing the mobile from its original group, then a frequency or timeslot handover to the new group can be performed in order to improve satellite power utilization. This procedure can likewise be used for determining which of a number of existing groups a new mobile call should be associated with, i.e., to find the group that would result in minimum increase of satellite power used when a new call is connected.

Figure 17:
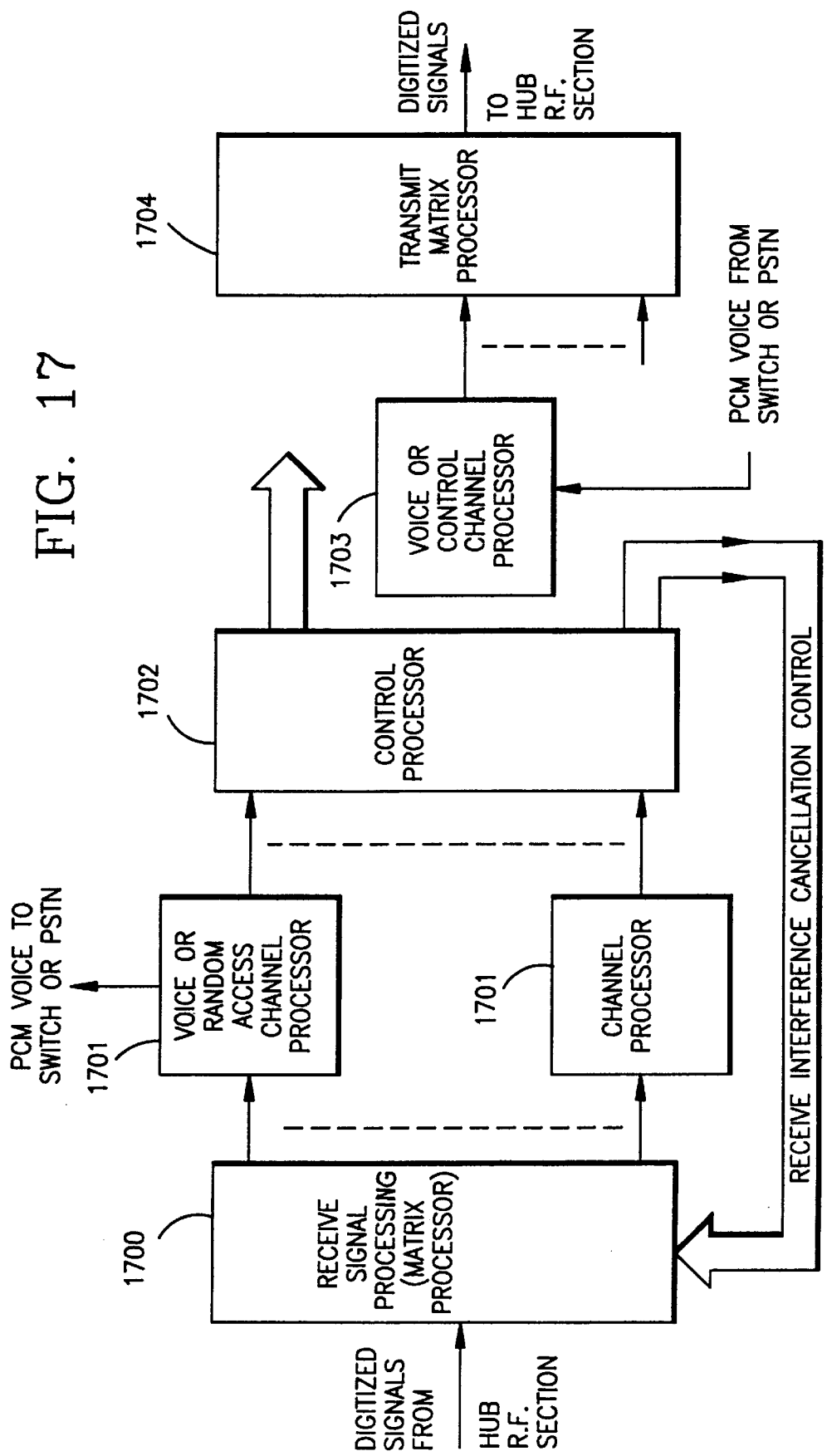
FIG. 17 illustrates connections between a receive control processor and a transmit control processor according to an exemplary embodiment of the present invention.

FIG. 17 shows an exemplary embodiment illustrating the interconnections between the transmit and receive matrix processors and the control processor at the ground station to effect the above-described interference cancelling and optimum channel allocation behavior.

The receive matrix processor 1700 receives digitized signal samples from the ground station RF section. The receive processing can be structured, for example, according to the exemplary FDMA embodiment of the invention of FIG. 9, or according to the exemplary TDMA embodiment of FIG. 16. Moreover, an exemplary CDMA embodiment can be constructed by, for example, increasing the bandwidth of the channel splitting filters and including a CDMA version of the per-channel processing in the circuitry of FIG. 9. Further, exemplary embodiments of the present invention may be constructed using the novel subtractive CDMA system described in U.S. Pat. No. 5,151,919 to Paul W. Dent entitled "CDMA Subtractive Demodulation", which is incorporated here by reference. These features of the present invention also lend themselves to implementation in land-based cellular systems.

The receive matrix processor 1700 separates the individual channel signals by applying inverse C-matrix coefficients supplied by control processor 1702 as described above, to eliminate or suppress co-channel interference. These coefficients can, for example, be determined as follows.

When M spatially separated antenna/receiver channels receive different combinations Ri of M signals Si, given by $$Ri = SIGMA_j \, (Cij.Sj) \tag{5}$$

or in matrix notation, R=C.S, then the separation of the M signals has a straightforward solution $$R = C.S^{-1} \tag{6}$$

When the number of antenna/receiver channels N is greater than the number of signals M they receive, the matrix C is not square and cannot be inverted. There are a continuum of solutions possible using any subset M of the N channels, but there can also be a desired unique solution.

The reciprocal problem for transmitting M signals using N transmitter channels was solved above by imposing the additional desire to minimize total transmit power. In the receiving case, we can find the desired unique solution by imposing the condition of maximizing the signal to noise ratio. To do this, a finite amount of noise must be assumed to exist in the receivers.

Before this solution is described, another solution will be described for solving the equations:

$$C11.S1+C12.S2 \ldots +C1M.SM=R1$$
$$C21.S1+C22.S2 \ldots +C2M.SM=R2 \quad (7)$$
$$CN1.S1+CN2.S2 \ldots +CNM.SM=RN$$

When $N>M$ there is an excess of equations over unknowns. They should all be consistent and solving any subset M of N should yield the same answer. Due to receiver noise, however, which causes uncorrelated errors in the received values R, the equations will not all be exactly consistent.

A known solution to this is the so-called least-squares solution. The least squares method seeks the solution which minimizes the RMS sum of the noise errors needed to be added to the R-values to make the equations consistent.

An error vector E may be defined as $$E = C.S - R \quad (8)$$

The sum square error is then $$E'E = (C.S-R)'\cdot(C.S-R) = S'.C'.C.S - R'.C.S - S'.C'.R + R'.R \quad (9)$$

Differentiating this expression with respect to each R value to obtain the gradient yields:

$$\text{grad}(E'E) = 2C'.C.S - 2C'.R \quad (10)$$

E'E is a global maximum where grad(E'E)=0, i.e, $$C'C.S = C'R, \text{ or } S = (C'C)^{-1}.C'.R \quad (11)$$

The least squares solution for the M signals is thus $S = A.R$ where $$A = (C'C)^{-1}.C' \quad (12)$$

This may be compared with the least-power transmit solution where $$A = C'(CC')^{-1}$$

The least squares solution for reception given above is not necessarily that which maximizes the quality of each signal. To find the solution that maximizes each signal quality we in turn find the best A matrix row that yields that signal.

Separated signal $\underline{Si}$ is given by row i of A, henceforth written Ai, multiplied by the vector of receive channel outputs R, i.e., $\underline{Si} = Ai.R$. R is given by C.S+Noise where "Noise" is a vector of uncorrelated noise having components N1,N2 ... in the receiver channels.

Thus $$\underline{Si} = Ai.C.S + Ai.\text{Noise} \quad (13)$$

The amount of wanted component Si that appears in $\underline{Si}$ is given by $$(Ai1.C1i+Ai2.C2i+Ai3.C3i \ldots +AiN.CNi).Si = Ai.Ci$$

where

Ci means the ith column of C.

Assuming all Si are transmitted with unit power, the power in the extracted wanted component is $$P = |Ai.Ci|^2 = Ai.Ci.Ci'.Ai' \quad (14)$$

There are also, however, unwanted components in the extracted signal due to the other signals Sk. The sum of the unwanted powers for all k not equal to i is given by $$I = Ai.Cdim.C'dim.Ai' \quad (15)$$

where Cdim means the matrix C with column i removed. In addition, there is a noise power given by $$|Ai1.N1|^2 + |Ai2.N2|^2 \ldots = AiAi'.nI \quad (16)$$

where n is the mean square value of each of the noise signals N1,N2, etc. The signal-to-noise-plus interference ratio is then given by $$\frac{P}{I+N} = \frac{A(Ci \cdot Ci')A'}{A(nI + Cdim \cdot C'dim)A'} \quad (17)$$

Mathematicians will recognize his expression as the ratio of Hermitian forms. The maxima and minima of such expressions as $$\frac{X'UX}{X'VX}$$

are given by the eigenvalues q of $V^{-1}U$, i.e., by the solution of $\det(V^{-1}.U - qI) = 0$. The values of X which give these extrema are the corresponding eigenvectors. $V^{-1}U$ in our case is $(Cdim.C'dim+nI)^{-1}.Ci.Ci'$ and X is A'.

We now use the theorem that the eigenvalues of the product of an n by m matrix with an m by n matrix where n>m are equal to the eigenvalues of the product taken in reverse order, plus n-m zero eigenvalues.

Using as the two matrices in question the N by 1 matrix $(Cdim.Cdim'+nI)^{-1}.Ci$ on the one hand and the 1 by N matrix Ci' on the other hand, the eigenvalues we need must be those of the inverse product $$Ci'.(Cdim.C'dim+nI)^{-1}.Ci \quad (18)$$

$$1 \times N \quad N \times N \quad N \times 1$$

This, however, has dimension 1×1, i.e., it is a scalar, so it has only one non-zero eigenvalue.
Hence $$q = Ci'.(Cdim.C'dim+nI)^{-1}.Ci \quad (19)$$

The associated eigenvector Ai' is the solution V of an equation of the form $$\text{Matrix}.V = V.\text{Eigenvalue}$$

$$(Cdim.C'dim+nI)^{-1}.Ci.Ci'.V = Vq \quad (20)$$

Substituting for q from equation (19), $$(Cdim.C'dim+nI)^{-1}.Ci.Ci'.V = V.Ci'.(Cdim.C'dim+nI).Ci \quad (21)$$

It may be verified that letting $V = (Cdim.C'dim+nI)^{-1}.Ci$ makes the right hand and left hand sides of equation (21) identical. Thus, this eigenvector is the optimum solution for the row of coefficients Ai that extract Si from R with best signal-to-noise+interference ratio.

If instead we set out to maximize signal to (signal+noise+interference) ratio we would get $$Ai' = (C.C' + nI)^{-1}.Ci \text{ or } Ai = Ci'.(C.C' + nI)^{-1} \quad (22)$$

i.e., the whole C-matrix is used in the inversion and not Cdim with one column removed. The value that maximizes S(S+N+I) should, however, be the same as that which maximizes (S/(N+I) as their reciprocals differ by the constant 1 only.

It can be shown that this solution only differs by a scalar factor 1/(1+q) from the solution which maximizes S/(N+I), and since a fixed scaling does not change signal to noise ratios, it is effectively the same solution. If such Ai's are now derived for all i and laid one under one another to form an M by N matrix A, the rows Ci', being the original columns Ci, also lie under one another to form the matrix C'.

Thus $$A = C'(CC' + nI)^{-1}$$

This is similar to the solution for minimum transmit power derived above, except that the "C" matrix here is the transpose of the transmit matrix and is M by N instead of N by M. That means that N×N matrix CC' has rank of only M<N and it has no direct inverse, being singular. However, the addition of the noise down the diagonal through the term nI is the catalyst that makes the matrix to be inverted non-singular and the above solution computable.

The solution in the transmit case provided a way to test how much the total transmit power, having been reoptimized, would have to increase to support one extra signal. Reciprocally, in the receive case, it can be tested how the addition of a new signal to those already received would affect the signal to noise ratio after re-optimization of the above coefficients with an extra column added to the C matrix. The extra column of C's in question represents the relative strengths and phases which the new signal is received by the N receiver/antenna channels. This is determined while the new signal is appearing on the random access channel and not in conflict with other signals. Furthermore, random access can be made with higher power or more coding than for normal traffic so as to facilitate detection and decoding.

The signal is decoded and retrospectively the decoded signal can be correlated with signal samples recorded from each of the N channels to determine the new C-matrix coefficients. A test is then made by appending the new C column to each of a number of candidate C matrices in turn associated with different groups of ongoing signals in order to determine the group that would have its worst case SNR degraded the least by inclusion of the new signal. This then determines the allocation of a channel to the new signal for traffic, and explains how the C matrix coefficients are arrived at a row-at-a-time during the random access and channel allocation process.

The separated channel signals are processed in separate channel processors 1701. The channel processors can either be engaged to process subscriber traffic, after a call has been connected, or can be employed to search for random access signals from a given direction. The latter is done by combining the received signals from the satellite to form beams covering fixed regions of the earth from which random access signals may be received. The coefficients used may be chosen by the control processor 1702 to provide cancellation or reduction of interference from other signals on the same frequency from other regions so as to maximize the probability of intercepting a random access message. The random access message can also be provided with an additional degree of error correction coding to maximize reception probability in the absence of a-priori knowledge of the direction from which an access attempt is received. Optionally, the random access channel can be frequency-planned to avoid immediate frequency re-use in adjacent cells, for example by the use of a 3-cell frequency or timeslot re-use plan, since using three frequencies or timeslots for random access does not have such a deleterious effect on total system capacity as if such a frequency usage plan were adopted for every traffic channel.

The channel processors 1701 provide information to the control processor 1702 regarding the amount of each signal in each beam channel or separated channel, which the control processor 1702 uses to control the interference cancellation coefficients used by the receive matrix processor 1700. Depending on, for example, the determination respectively of correlations between each separated signal and each beam signal or the determination of correlations between separated signals, two different control concepts can be applied by control processor 1702.

In a first exemplary control implementation, a separated channel signal decoded by a channel processor 1701 is correlated or partially correlated with each non-separated beam signal in turn. The electrical connections for achieving this correlation are disposed between every channel processor 1701 and every other channel processor 1701, however these connections are omitted from FIG. 17 for clarity. The part of the separated signal that is used for correlation can suitably be a known bit pattern in the channel signals, for example a synchronization word or bit pattern. The correlation results directly represent the C-matrix coefficients and these are processed by the control processor to obtain A-matrix coefficients as defined above.

In a second exemplary control implementation, a separated channel signal decoded by a channel processor 1701 is correlated with at least part of other channel signals to determine the residual amount of non-cancelled interference present due to other channel signals. That part of the other channel signals with which correlation is performed can suitably be a known pattern contained in each signal, such as a synchronization word. Since these patterns are known it is not necessary to cross-couple the channel processors 1701 to each other, thus avoiding a mass of interconnections. Furthermore, since adaptation of the receive matrix coefficients by the control processor 1702 does not have to take place at a rapid rate, as they are relatively static for a given set of transmitting mobile phones, the correlation with different signals can occur at different times at which the transmitters, by prearrangement, insert a special sync word for the purpose of correlation.

For example, suppose a known, 16-bit sync pattern is employed within each segment of transmitted signal, e.g., a TDMA timeslot. There are 16 possible orthogonal 16-bit words, so 16 different signals can be allocated orthogonal sync words. A Fast Walsh Transformer such as the one described in U.S patent application Ser. No. 07/735,805 entitled "Fast Walsh Transform Processor" and filed on Jul. 25, 1991, which is incorporated here by reference, provides an efficient means to correlate a signal simultaneously with all possible orthogonal codewords and thus directly determine the residual, non-cancelled interference amounts. If however the number of signals whose residual interference contributions are to be discriminated is greater than 16, for example 37, then 15 at a time can be arranged to use different orthogonal codewords while the other 22 use the 16th codeword. The 15 which are chosen to use different codewords can be changed between successive TDMA frames such that after slightly over two frames all signals have been uniquely discriminated.

This exemplary procedure can also be applied to FDMA or CDMA uplink modulations. In the CDMA case, for example, orthogonal spreading codes can be allocated to facilitate discrimination. If a hybrid FDMA/CDMA uplink is used with, for example, four overlapping, orthogonal CDMA signals on each frequency channel as described in the aforementioned disclosure, U.S. patent application Ser. No. 5,539,730, entitled "TDMA/FDMA/CDMA Hybrid Radio Access Methods" and filed on Jan. 11, 1994, then the system can readily search simultaneously for known sync patterns employing all four orthogonal codes. By permuting the underlying sync patterns as described above, it is possible to discriminate residual interference contributions from any number of different CDMA transmissions using the same channel frequencies at different locations. This can be accomplished, for example, after separating the signals using the C-matrix, a signal can be correlated with its own known bit pattern and the known patterns of other signals that should have been cancelled; results of the latter correlations yield the amount of residual, uncancelled signal and can be used to update the C-matrix.

In this second exemplary implementation, C-matrix coefficients are not directly determined, but rather the residual interference amounts are related to errors in the A- and C-matrix coefficients. This relationship can be demonstrated as follows.

The satellite or base station broadcasts N combinations of M desired signals from N transmitter/antennas. The N combinations should be chosen such that each of the receiving stations receives only its intended signal, and the other M−1 at that receiver are cancelled. The N linear combinations are preferably those derived as set forth above, which result in each receiving station receiving its intended signal only, and with minimum total transmitter power.

The transmitted signals $$T = \begin{bmatrix} T1 \\ T2 \\ \vdots \\ TN \end{bmatrix}$$

are formed from the signals desired to be received $$R_d = \begin{bmatrix} Rd1 \\ Rd2 \\ \vdots \\ RdM \end{bmatrix}$$

by multiplying the vector Rd by the N by M matrix A, i.e., T=A.Rd.

A is in turn shown above to be preferably equal to $C'(CC')^{-1}$ where Cij is the propagation from transmitter/antenna j to receiver i. Estimates of Cij are made at call set-up time for the receive direction and transformed to estimates for the transmit direction as described above. There will, however, be errors in the estimates of the Cij for the transmit direction that are used to compute the matrix A. Let us assume that the estimated transmit matrix C is equal to the true matrix Co plus an error matrix dC, i.e., $C = Co + dC$ or $Co = C - dC$ The signals Ra actually received by the receiving stations are given by the true C-matrix Co times the transmitted signals, i.e., $Ra = Co.T = Co.A.Rd = (C-dC)C'(CC')^{-1}.Rd = Rd - dcC.C'(CC')^{-1}.Rd = Rd - dC.A.Rd$ The errors dR in the received signals dR=Rd−Ra are thus given by $$dR = dC.A.Rd \tag{23}$$

Each error element i of the error vector dR contains a part $e_{ij}$ of each of the other unintended signals j.

If the M signals contain known signals, patterns or syncwords, by correlating with these at a mobile receiving signal i, it is possible to determine the residual unwanted amount of signal j, and thus determine $e_{ij}$.

The syncwords can be orthogonal so that correlation with all of them can be performed at the same time by means of an orthogonal transform such as the Walsh-Hadamard transform. If the number of orthogonal codewords available is less than the number of signals M, the orthogonal codewords can be assigned to groups of immediately surrounding beams or cells whose signals are most likely to interfere due to imperfect cancellation. A limit set of orthogonal codewords can be permuted between the M signals to allow different subsets to be resolved at a time, and all M to be resolved sequentially. In this way, by correlating the received signals Ra over the portion containing the known signal pattern with all orthogonal codewords the amount of own codeword is obtained as well as the amount of unwanted codewords. The amount of other codewords is scaled by dividing by the complex amount of own codeword correlation to yield the normalized error residuals $e_{ij}$ that may then be complex-value averaged over several measurement intervals before being reported by the receiving stations back to the transmitting stations on a reverse Slow Associated Control Channel. To reduce the volume of reporting, each mobile can at each interval restrict itself to reporting only the largest error its correlator determines. The transmitting station can optionally either assume that the other errors are zero at that station, or that they are as previously reported if no action to correct them has been taken in the meantime.

The matrix $E = e_{ij}$ may thus be equated to the matrix dC.A in (23), so we have dC.A=E or A'.dC'=E'.

This is an insufficient set of equations for the unknowns dC', but a unique solution exists for which the sum of the squares of the dC's is least, that solution being $dC' = A(A'A)^{-1}.E'$ Moreover, if $A = C'(CC')^{-1}$ then $A(A'A)^{-1} = C'$, therefore dC'= C'.E' or $dC = E.C$ Thus, given the original estimate of C and the residual correlation measurements reported by receiving stations, the error dC in the original estimate may be calculated and the estimate of C gradually refined.

As mentioned above, if the reverse SACCH signalling capacity does not allow all errors to be reported every time, it is sufficient to report only the largest. The transmitter can choose only to correct the largest there and then, or to wait until others are reported. In order to ensure that others are reported, the transmitter can request the receiver to make specific measurements via the forward SACCH channel. These refinements are mentioned for the sake of completeness in describing the scope of the invention, but the extra complexity is probably not needed in a satellite-mobile communications system where the relative positions of mobiles in the satellite beams changes only slowly relative to the speed of communications.

The control processor obtains initial estimates of the downlink C and A matrix coefficients, measured on the uplink by syncword correlation as described earlier, to the downlink frequency. The control processor then continually outputs corrected A-matrix coefficients suitably translated to the downlink frequency as described above to transmit matrix processor 1704.

A complication can arise in performing this translation due to phase mismatches between each antenna element channel. It was stated above that the relative amplitude between signals on the uplink and downlink frequencies could reasonably be considered to be the same, and that the relative phase between signals can be scaled by the ratio of up- and downlink wavelengths. However, consider the case where phase mismatches exist between the channels that relay the mobile-satellite uplink signals from each antenna element. The signal phases are then not just antenna element phases, PHI(i), but contain the additive mismatch terms, dPHI(i). If PHI(i)+dPHI(i) is then scaled by the ratio of wavelengths, the PHI(i) part will scale correctly but the mismatch part dPHI(i) will not because there is no correlation between phase mismatches on the up and downlink paths. If the up- and downlink phase mismatches are denoted respectively by uPHI(i) and dPHI(i) then we need to calculate:

$$a.(PHI(i)-uPHI(i))+dPHI(i));$$

where a is the wavelength ratio.

This can be written a.PE(i)+(dPHI(i)−a.uPHI(i)) and the term dPHI(i)−a.uPHI(i), which is at least a single constant, has to be determined in some way to translate the A- or C-matrix coefficients determined from receiving mobile signals to the coefficients that shall be used for transmitting to the mobiles. This can, for example, be done by a fixed system calibration that is carried out with the help of a few monitoring stations or "dummy mobiles" located at different positions throughout the service area. Alternatively, by having the mobiles also measure a limited number of residual correlations with signals other than their own, and report these correlations on the slow associated control channel (SACCH), the system can receive enough information to perform the necessary calibrations for phase mismatch continuously. Such reported information can also facilitate calibrating out amplitude mismatches if required.

The present invention can also be employed to improve the capacity of landbased cellular radiotelephone systems. Such systems generally employ 3-sector antennas to illuminate three adjacent cells from the same site, as described above. Because isolation between sectors is not high (in fact isolation is almost zero for a mobile on the border of two sectors), it is not possible with conventional systems to permit use of the same frequency channel in all three sectors. According to exemplary embodiments of the present invention, however, the same channel can likely be employed as many times as there are antenna elements to form sectors. Thus a three-sector antenna (typically formed by three vertical collinear stacks of dipoles in a corner reflector) provides the opportunity to re-use the same channel three times.

Land-based cellular communication capacity is limited by the parameter of carrier to co-channel interference ratio (C/I). The C/I which would be obtained if signals on the same frequency are radiated around 360 degrees of azimuth is the same as the C/I which would be obtained with centrally illuminated cells. A 3-cell cluster or site then becomes the equivalent of a centrally illuminated cell as regards the re-use pattern needed to achieve a given C/I. It is known that a 21-cell re-use pattern is needed to provide the required C/I in the AMPS system, therefore a 21-site re-use pattern would be needed if all sectors in the same site used the same frequencies over. This compares with the 7-site, 3-sector pattern employed conventionally, showing that what has been gained from using the same frequency in every sector has been lost by the need to increase the re-use pattern size from 7 sites to 21 sites. Thus, according to this exemplary embodiment of the present invention three or more sectors or antenna elements around the 360 degrees of azimuth should be used.

Figure 18:
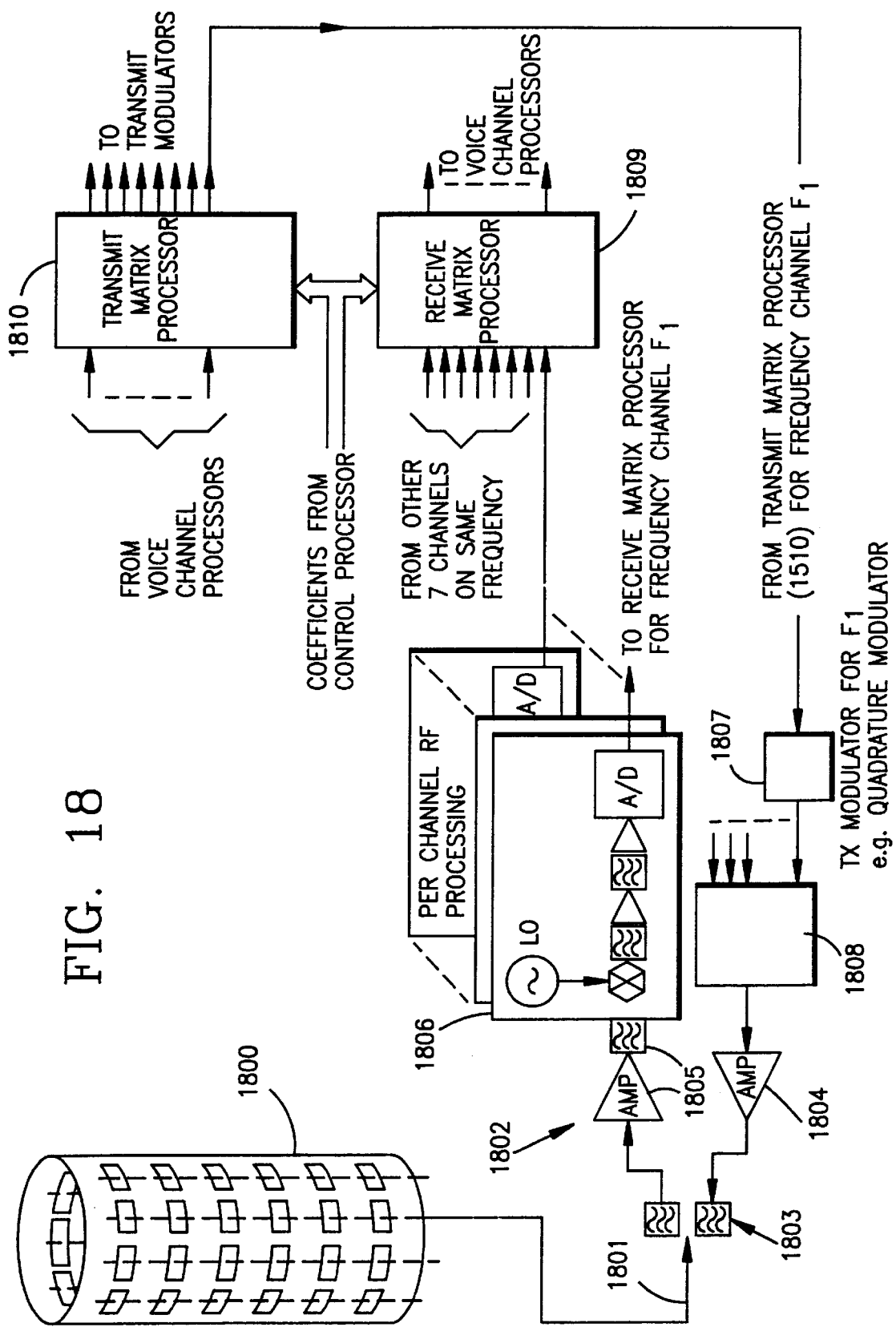
FIG. 18 shows a land-cellular exemplary embodiment of the present invention.

FIG. 18 shows an exemplary cylindrical array of slot antennas 1800 suitable for implementing the present invention in landbased cellular systems. The array consists of rings of eight slots around a metallic cylinder. Horizontal slot antennas give the desired vertical polarization, and the slots are a half wavelength long, e.g., approximately 16 centimeters for the 900 MHz band. It can be desirable to employ alternatively circular polarization at the base station combined with linear polarization at the mobile phone, especially when the mobile is a hand portable of uncertain antenna orientation. Circular polarization can be formed by using crossed slots, crossed dipoles or a hybrid slot-dipole combination for the array elements. It is often convenient when using such structures to form both polarizations simultaneously, and this can be exploited by using opposite circular polarizations for transmitting and receiving to reduce transmit-receive coupling.

Element spacing around the cylinder must be somewhat greater than a half wavelength to avoid the slots from running into each other, although it is possible to stagger alternate slots by a small vertical displacement to reduce their potential mechanical interference or electrical coupling with each other. If, for example, 0.75 wavelength spacing is used, then cylinder circumference is 6 wavelengths, that is a cylinder radius of less than one wavelength or about one foot. Such an antenna is considerably smaller than conventional three sector antennas. A number of rings of such slots are stacked vertically with between, for example, 0.5 and one wavelength vertical spacing to provide the same vertical aperture and, therefore vertical directivity, as conventional cellular base station antennas. Slots that lie in a vertical column can be connected by feedlines 1801 that feed them in phase. The eight feedlines corresponding to the eight columns of slots are then connected to eight RF processing channels 1802. Each RF processing channel comprises a transmit-receive duplexing filter 1803, a linear transmit power amplifier 1804, an RF amplifier 1805, a downconvertor, IF filter, amplifier and A/D convertor 1806 for each frequency channel, and a corresponding transmit modulator 1807 for each frequency channel, the outputs of which are summed in summer 1808 before being amplified in power amplifiers 1804.

The digitized outputs for all eight columns of slots for each frequency channel are fed to a receive matrix processor 1809. The receive matrix processor 1809 is analogous to the matrix processor 650 of FIG. 9. The matrix processor 1809 separates signals arriving on the same frequency but from different angles such that cochannel interference from mobiles in communication with the same site is substantially suppressed. The separated signals are fed to voice or random access channel processors (not shown in FIG. 18) analogous to channel processors 660 of FIG. 9. Correlation measurements performed by the channel processors (not shown) are fed to a control processor (not shown) analogous to control processor 1702 in FIG. 17. The control processor (not shown) produces both receive and transmit matrix coefficients for receive matrix processor 1809 and transmit matrix processor 1810 to produce a transmitted signal to every cochannel mobile in a non-interfering manner.

A difference in propagation conditions can arise in landmobile applications as compared to satellite applications, resulting in some modifications to the matrix processing that will now be described. Satellite propagation paths are substantially line of sight, and even if signal echoes from objects in the vicinity of the mobile occur, the sightlines from these objects to the satellite are substantially the same as the direct ray from the mobile to the satellite when compared with the relatively large cell diameters in satellite-cellular systems.

This is not true for landmobile systems. A substantial echo from a large building or mountain range on the other side of the antenna compared to the mobile can result in an echo that comes in from a direction anywhere between 0 and 180 degrees away from the direct ray. Since such echoes carry signal energy, it is often desirable to exploit them to provide a diversity path in the event that the direct ray fades or is shadowed in order to improve reception. Typically, the signal path from the mobile to the base station antenna consists of a number of rays caused by reflections from objects close to the mobile; these rays are received substantially from the same direction and combine to produce so-called Rayleigh fading. Since the base station antenna in, for example, large-cell applications is deliberately placed high at a good vantage point, there are not expected to be large reflecting objects in close proximity, for example within 1.5 Km, that could result in rays coming from substantially different directions. This means that rays reflected from such objects and coming from an arbitrary direction would be expected to have traversed a larger distance, e.g., 3 Km, and thus suffered a delay of 10 $\mu$S or more.

To take care of both types of the aforementioned phenomena, that is a cluster of rays from substantially the same direction causing the signal to exhibit Rayleigh fading as well as a cluster of rays from a substantially uncorrelated direction representing a delayed signal, another term can be introduced into the receive matrix processing as follows.

A signal sample $Si(t)$ received at the ith antenna element (column of slots) is the sum of non-relatively-delayed transmitted signals $Tk(t)$ from mobiles k and signals relatively delayed by dt given by:

$$Si(t)=Ci1.T1(t)+Ci2.T2(t) \ldots +Cin.Tn(t)+Ci1'.T1(t-dt)+Ci2'.T2(t-dt) \ldots +Cin'.Tn(t-dt)$$

When the equations for all $Si(t)$ are collected into matrix form, they can be written:

$$Sj=C.Tj+C'.T(j-m)$$

Wherein the suffix j of T means values at a current time and the suffix j-m means values m samples ago, corresponding to the delay dt. For example, if the signals are sampled every 5 $\mu$S, then for a delay dt=10 $\mu$S, m would be equal to 2.

The signal fading of the undelayed ray can be considered to be due to varying C coefficients, with the transmitted signals T being constant, or the signals T can be considered to be varying due to Rayleigh fading and the matrix C to be constant. The latter is considered here, because after separating the fading signals T by using constant matrices, the voice channel processors can handle the fading signals as they do in landmobile systems.

If the signals T are considered to be fading, however, note that the fading on the delayed term is not correlate. In order to be able to consider $T(j-m)$ as a delayed replica of the fading signals Tj therefore, the difference in fading must be explained by regarding the coefficients C' as varying to convert the fading on the direct ray to the fading on the delayed ray. However, infinite values of C' would then arise due to the varied coefficients being the ratios of Rayleigh fading values.

It is thus more convenient to regard the C-matrices as constant relative to directions of arrival, and to introduce an explicit set of Rayleigh fading variables to explain the fast fading. Each signal in the vector Tj, the first signal t1(j) for example, thus has an associated complex multiplying factor r1(j) representing the undelayed Rayleigh fading path from mobile 1 to the array. Assembling the factors r1,r2,r3 . . . m down the diagonal of a matrix, with zeros elsewhere and denoting this fading matrix by R0, the set of faded signals are then simply given by:

$$R0.Tj$$

Defining a different fading matrix RI for the first delayed path, the delayed faded signals are given by:

$$R1.T(j-m)$$

Thus the signals out of the array elements are given by:

$$Sj=C.R0.Tj+C'.R1.T(j-m)$$

According to one aspect of the present invention, separation of the fading signals R0.Tj takes place using the separated signals R0.t(j-m) calculated m samples ago, based on the equation:

$$Ro \cdot Tj = C^{-1} \cdot \left[ Sj - C' \cdot \frac{R1}{Ro} \cdot (Ro \cdot T(j-m)) \right]$$

It is seen that the previously separated signals R0.T(j-m) must first have their fading factors removed by division by R0 to replace the fading factors for the direct rays with the fading factors R1 for the delayed rays. This can cause numerical difficulties when a signal fades out completely so that its associated r-factor becomes zero. However, since the separated signal would also become zero, it is possible to assign a meaningful value to R0.T(j-m)/R0, using, for example, knowledge of the nature of the transmitted signal. For example, knowledge that the transmitted signal is a constant amplitude signal, or that it should be continuous between samples, could be used.

Alternate implementations and modifications of the principles set forth herein will be readily appreciated by those skilled in the art. For example, although the signal transmitted in any future cellular system will most likely be a digital signal, the principles of the present invention are also applicable to analog signals. In both cases, the fading spectra (i.e., the Fourier transform of a successive series of r-values) are narrowband compared to the modulation, which is the means by which information in the modulation can be distinguished from modulation caused by fading. In the case of digital signals, the modulators used at the transmitters are well characterized a-priori, so that the waveforms Tj that they will produce for a given information bit pattern can be predicted. If a known bit pattern is contained in a segment of transmission, a corresponding segment of the Tj waveforms can be predicted and correlating this with the received signals will yield an estimate of the corresponding T-value. This process is referred to as "channel estimation". The channel estimates may be updated after decoding each information bit. Due to the channel varying much slower than information bits and even more slowly than the sample rate of Tj, which may be, for example, eight times the information symbol rate, channel estimates are averaged over many successive samples of the T-waveforms, and are thus somewhat less noisy than the information signals themselves.

In the case of analog FM signals, for example, the modulation is known a-priori to be constant amplitude, varying only in phase. The rate of change of phase is known a-priori to be restricted to a value corresponding to the maximum frequency deviation, and the frequency variation is continuous and so the phase and at least its first and second derivatives are continuous. This a-priori knowledge can be used to predict a next Tj value from the previous history. For example, if $Q_{ji}$ was the previous phase estimate and Q its derivative estimate, and $A_j$ was the previous amplitude estimate, then $T_j = A_j$ EXP $(jQ_j)$ and $T_{j+1} = A_j$ EXP $(j(Q_j + Qdt))$. Hence, $T_{j+1}$ is predicted from $T_{j+1} = T_j$ EXP $(jQdt)$.

Channel estimation techniques often use a Kalman filter including derivatives, in which a prediction of the next value of the channel estimate is made using an estimate of the time rate of change (derivative) of the signal, then the predicted channel estimate is used to predict the next signal sample point. The error between the predicted and received signal is then used to correct the estimate of the channel (the fading factor) and its derivative in such a way as to sequentially minimize the sum square error.

The same Kalman filter technique can also be used to estimate the diagonal elements of both R0 and R1. Having estimated these diagonal values, according to another aspect of the present invention, it is ascertained whether any value of R1 is greater than a corresponding value of R0. If a value of R1 is greater than a corresponding value of R0, that would indicate that the delayed ray is currently received at a greater strength than the direct ray. Then the column of C' corresponding to that element of R1 is swapped with the corresponding column of C corresponding to R0 to form new matrices which are denoted by Cmax and Cmin. The greater element from R1 is swapped with the corresponding smaller element from R0 to form new R-matrices Rmax and Rmin, respectively. The elements of T(j−m) corresponding to the swapped R-elements are then swapped with the corresponding elements of Tj to form mixed vectors of delayed and undelayed signals denoted by Uj and Vj, respectively. The vector Uj can contain some elements of Tj and some elements of T(j−m), while the vector Vj then contains the remainder. Thus, the equation for signals out of the array elements becomes:

$$Sj = C\text{max}.R\text{max}.Uj + C\text{min}.R\text{min}.Vj$$

This equation can then be solved to yield:

$$Uj = [C\text{max}.R\text{max}]^{-1}. [Sj - C\text{min}.R\text{min}.Vj]$$

Since each element of Rmax was chosen to be the greater of two, the chances of zero values are reduced. Furthermore, the Vj values that have to be subtracted from Sj are minimized by multiplication by Cmin, so if Vj values are wrong or noisy the error propagation into subsequent values will be attenuated.

The vector Vj, however, contains some as-yet uncalculated values. Assuming that the same elements of R0 and R1 are chosen for Rmax and Rmin next time, the as-yet uncalculated values of Vj belong to a future U-vector U(j+m). The previously calculated values of T contained in Vj come from a previous U-vector, U(j−m).

Cmin and Rmin can be partitioned into two matrices Cmin1, Rmin1 and Cmin2, Rmin2, the columns of which are associated with the Vj values that come from previous or U-vectors, respectively. Thus, the U-vectors can be described as:

$$Uj = [C\text{max}.R\text{max}]^{-1} \cdot [Sj - C\text{min}1.R\text{min}1.U(j-m) - C\text{min}2.R\text{min}2.U(j+m)]$$

The values of U(j−m) are known from a previous calculation, but the values of U(j+m) are not. Therefore, Uj is first calculated on the assumption that all U(j+m) are zero. Then, m samples later when U(j+m) has been calculated on the assumption that U(j+2m) are zero, the calculated values of U(j+m) can be back-substituted into the above equation to give a refined set of values for Uj. These Uj values may be then back-substituted into a previous calculation of U(j−m) to refine that calculation, and/or forward substituted into the calculation of U(j+m), or both, to an iterative extent limited only by available processing power in the receive matrix processor.

Simplifying the above equation by denoting:

$$Ao = [C\text{max}]^{-1}$$

$$A1 = [C\text{max}]^{-1} \cdot [C\text{min}1 \cdot R\text{min}1]$$

$$A2 = [C\text{max}]^{-1} \cdot [C\text{min}2 \cdot R\text{min}2]$$

and substituting yields:

$$R\text{max}.Uj = Ao.Sj - A1.U(j-m) - A2.U(j+m)$$

If A1 has diagonal elements D1 and A2 has diagonal elements D2, then we can also write:

$$D1.U(j-m) + R\text{max}.Uj + D2.U(j+m) = Ao.Sj - (A1-D1).U(j-m) - (A2-D2).U(j+m)$$

The left hand side of the foregoing equation represents separated signals without cancellation of delayed or advanced rays. The separate channel processors can process these signals including delayed echoes to obtain better quality demodulation and decoding than if echoes had been subtracted. The improved decoded signals are useful in better producing the required channel estimates. A device that can, for example, be used for this purpose is a Viterbi equalizer such as described in commonly assigned U.S. patent application Ser. No. 07/965,848, filed on Oct. 22, 1992 and entitled "Bidirectional Demodulation Method and Apparatus", which is hereby incorporated by reference.

Thus, according to this exemplary embodiment of the invention, echoes of each signal are subtracted from estimates of other signals, but not from the estimate of the signal itself, to produce separation of signal+echo signals that are processed by individual channel processors. Echoes of each signal itself are left in additive combination with the signal and are used by a Viterbi equalizer. If echoes are not delayed or advanced by multiples of the modulation symbol period, a so-called fractional-spaced Viterbi equalizer can be used.

Such equalizers continuously estimate and update the amount and phase of additive echoes, as described in commonly assigned U.S. Pat. No. 5,164,961 to Bjorn Gudmundson entitled "A Method and Apparatus for Adapting a Viterbi Algorithm to a Channel Having Varying Transmission Properties", U.S. Pat. No. 5,204,878 to L. Larsson entitled "Method of Effecting Channel Estimation For a Fading Channel When Transmitting Symbol Sequences", and U.S. patent application Ser. No. 07/942,270, filed on Sep. 9, 1992 and entitled "A Method of Forming a Channel Estimate for a Time Varying Radio Channel", each of which are incorporated here by reference. The estimated values correspond to the diagonal elements of the diagonal matrices D1, Rmax, D2. Knowing Cmax and Cmin, Rmin1 and Rmin2 can then be determined, thus the channel adaptive equalizers in the individual channel processors can determine the Rayleigh fading functions R0 and R1.

A purpose for cancelling by subtraction cross-echoes, i.e., echoes of one signal that are additive to a different signal, is to provide separate signal sample streams that each depend only on one signal and its own echoes, as such can be handled by said channel-adaptive, Viterbi equalizers. For completeness however, a further method will now be explained, that can be used when the number of signals to be separated is relatively few, for example, eight signals.

The receive matrix processor can be regarded as undoing the additive signal mixing that takes place in the aether. This is advantageous in simplifying the operation of the channel processors. However, as disclosed above, numerical difficulties can arise in dealing with signals that can periodically fade completely. This can result in certain matrices becoming singular, i.e., difficult to invert accurately. An equivalent problem arises in equalizers that attempt to undo the effect of a corruptive channel, for example a channel that suffers from selective fading that causes a null in the transmission function at some frequency. An inverse channel filter that attempts to undo the effect of such a channel would try to create infinite amplification at the null frequency, with consequent huge amplification of noise and other difficulties.

Therefore it is often proposed, as in the Viterbi equalizers cited, that the channel should not be "undone" by subjecting the received signal to an inverse channel filter to produce an undistorted signal that is then compared to the alphabet of expected symbols, but rather the alphabet of expected symbols is subjected to the same channel distortion as the signal by use of a mathematical model of the channel, and the distorted received signal compared with this predistorted alphabet.

According to a further exemplary embodiment of the present invention, a method is disclosed whereby no attempt is made to separate or "unmix" in the receive matrix processor the plurality of co-channel signals received by the array to produce separated signals that are then compared in separate channel processors with the alphabets of expected symbols. Instead, the alphabets of expected symbols are premixed in every possible way with the aid of a model of the mixing process that takes place in the aether, (i.e., with the aid of the C-matrix coefficients and the channel estimates R) and the mixed alphabet is then compared to the mixed signals received by the array elements.

Such a scheme expands the number of possible mixed symbols in the alphabet exponentially according to a power of the number of signals. For example, suppose each signal is modulated with binary symbols. The expected symbol alphabet has only two symbols, 0 or 1. However, if the array elements receive weighted sums of eight signals, each of which instantaneously may be modulated with a 1 or a 0, the number of possible mixed signals that can be received is $2^8$ or 256, if all the signals are aligned in time. If different signals are not time aligned, then a symbol period of one signal may overlap two symbols of another signal. Thus the waveform over a symbol period of one signal can depend on two symbols of each of the other signals. Nevertheless, each point of the waveform depends only on the one symbol of each signal whose symbol period it lies in. When echoes are taken into account, however, each waveform point can be dependent on two symbols of each signal thereby raising the number of possible values that can be observed to 65536. It will however be described below how, for example, a 256-state Viterbi algorithm can be used to jointly demodulate the signals from the array.

Figure 19:
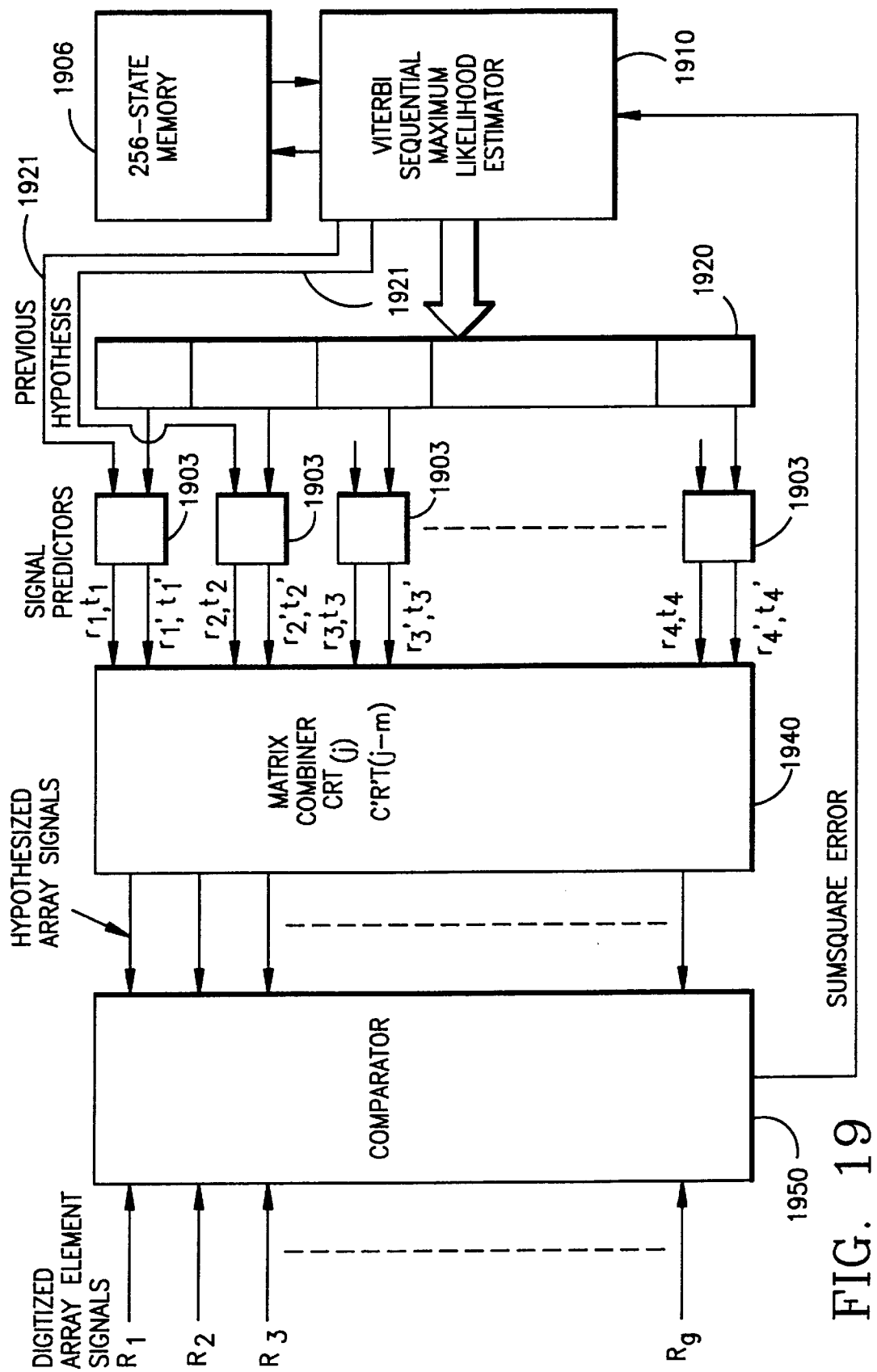
FIG. 19 is a block diagram illustrating the maximum likelihood demodulation of signals from an antenna array according to an exemplary embodiment of the present invention.

According to an exemplary embodiment aspect of the invention, and referring to FIG. 19, a numerical machine has 256 sets of memory banks 1900 each associated with a specific 8-bit postulate for one previous binary bit in each of the eight signals, on which, due to a delayed echo, the received array signals will depend. The SMLSE controller 1910 now makes another 8-bit postulate 1920 for the current binary bit of each signal. How it makes this postulate is immaterial, as all postulates will eventually be tried. In the event that postulates are tried sequentially, they can, for example, be generated by an 8-bit counter. If however all postulates are tried in parallel using replicated hardware, each hardware unit would handle one fixed postulate that could then just be hard-wired in.

Together which each of the previous 8-bit postulates in turn plus the new 8-bit postulate, a set of eight signal predictors 1930 predicts the complex value of each signal incident on the array including one or more reflected rays by using the fading channel coefficients R and R' and a-priori knowledge of the transmitted modulation or coding. The complex signal values are then combined in matrix processor 1940 by calculating the equation:

$$Sj = C.R.Tj + C'.R'.T(j-m)$$

where C and C' are square matrices representing the directions from which the direct and delayed waves are principally received.

The calculated signals Sj are the signals that are expected to be received at the array elements if the hypothetical eight bits are correct. These hypothetical signals are then compared with the corresponding received signals R1,R2 . . . R8 from the array elements using comparator 1950. Comparator 1950 evaluates the net mismatch of the eight predictions from the eight array signals by, for example, computing a sum of squares of the differences. Other means to produce a signal representative of the net mismatch are however known to the art, based on a mathematical expansion of the sum of squares, and can be used if considered advantageous for the particular implementation chosen. For example, note G. Ungerboeck, "Adaptive Maximum Likelihood Receiver For Carrier Modulated Data Transmission Systems", IEEE Trans. Commun. Vol. COM-22 No. 4, pp. 624–636, May 1974, U.S. Pat. No. 5,031,193 to Atkinson et al., and U.S. Pat. No. 5,191,548 to Bäckström et al., each of which is incorporated here by reference. The sum square error signal is fed back to the SMLSE controller 1910 which adds the error to the previous error stored in state memory 1900 against the previous 8-bit signal hypothesis 1921 employed in signal predictors 1930 to produce the signals ri'ti'.

The above procedure is carried out for each new 8-bit hypothesis in turn preceded by each of the stored, previous hypotheses. This results, for each new hypothesis, in 256 candidate cumulative error numbers depending on which preceding hypothesis was used. The lowest of these is selected to become the new cumulative error associated with the state corresponding to the new 8-bit hypothesis. When all possibilities for the new 8-bit hypothesis have been processed in this way, the state memory 1900 will contain 256 new cumulative error numbers associated with each new hypothesis, as well as a record of the best preceding hypothesis to each, i.e., that giving the lowest error, and the preceding hypotheses to those in turn, and so on. Thus each of the 256 states contains a candidate demodulated sequence of 8-bit values. The oldest values in these sequences will tend to agree and when this happens the machine is said to have converged to an unambiguous decision. The decided 8-bits are then extracted to yield one bit decision for each of the eight incident signals. If convergence does not occur and the sequence memory 1900 becomes full, the path history is truncated by believing the oldest byte of the state having the lowest cumulative error. That value is then extracted and the path history memories shortened by one byte.

The above process represents an alternative to attempting to separate signals that have been mixed by means of matrix processing. Instead, signals are hypothesized by models of the transmitters and models of the mixing process, and the hypothesis best corresponding to the observed, mixed signals is determined by the SMLSE machine 1910 in the manner described above. Thus, the need to invert a mixing process to separate mixed signals, which may be mathematically intractable, is avoided by instead applying the mathematically tractable mixing process to the hypothesized signals to predict the mixed signals that should be received by the array elements and picking the hypothesis that best matches the observed signals. This process will not fail when two mobiles using the same channel lie at the same bearing, the process then being equivalent to joint-demodulation as, for example, disclosed in U.S. patent application Ser. No. 08/155,557 filed on Nov. 22, 1993 and entitled "A Method and Apparatus for Joint Demodulation of CDMA signals with Multipath Time Dispersion".

The above-described exemplary embodiments of the present invention are applicable to satellite cellular communications systems to provide greater use of available bandwidth by permitting immediate spectrum re-use in adjacent cells. These techniques have also been described in relation to land cellular systems, where they permit, for example, re-use of the same frequency in adjacent sectors.

In practice, Inn both the satellite and land-based applications of the present invention, benefits are achieved by a combination of adaptive signal processing techniques linked to traffic management techniques. The traffic management techniques relate to continuously operational systems using TDMA or FDMA or a combination thereof in which calls are continually being terminated and new calls established. By selectively establishing new calls on time- or frequency-slots in such a way as to optimize a communications criterion, a natural sorting of traffic into groups using the same timeslot and/or frequency is established. The criterion relates to the ease with which the adaptive signal processing can separate signals on the same frequency and/or timeslot based on the reception of different, linearly independent combinations of them using a plurality of antenna elements.

According to yet another exemplary embodiment of the present invention, the signal processing does not adapt to the movement of mobile phones or to new call set-up and termination, but operates in a deterministic way and instead the traffic is adapted to the deterministic characteristics of the signal processing using a dynamic traffic channel assignment algorithm.

Conventional land-based cellular systems typically employ so-called sectorization, in which a single antenna mast carries three, 120-degree coverage antennas and illuminates three cells from a common site. This saves on real estate costs compared to illuminating the three cells using three separate antenna sites at the cell centers. Six sector systems are also known. Cellular systems have conventionally employed analog FM voice transmission in which each conversation is assigned a separate pair of up- and down-link frequency channels respectively. TDMA systems are now being installed using digital speech transmission, in which each conversation is allocated a unique pair of timeslot-frequency channel combinations. In these conventional systems, however, the three, 120-degree sector antennas have the same radiation patterns for all frequencies and/or timeslots.

According to yet another exemplary embodiment of the present invention, rotationally offset radiation is provided between different frequencies and/or timeslots. For example, on frequency channel 1 the three, 120 degree sectors may be orientated towards 0 degrees (Due North), +120 degrees (South East) and +240 degrees (South West). On frequency channel 2, the three sectors may be orientated to 60 degrees (North East), 180 degrees (Due South) and 300 degrees (North West). In general one might have as many as 120 frequency channels with corresponding antenna sector patterns offset by only one degree from each other. Such a system cannot be implemented using today's fixed-beam cellular base station antennas, but can be arranged with using the exemplary cylindrically symmetric array and associated matrix processing of FIG. 18.

Similarly, the antenna sector patterns can be rotationally staggered as between different timeslots in a TDMA system. In either the FDMA or TDMA or hybrid cases, this exemplary system determines at call set up, and optionally at regular intervals thereafter, the optimum time- and or frequency slot combination to use for communicating with the mobile station. The combination of a frequency and timeslot is abbreviated henceforth to simply "channel". The optimum channel is most likely one which has an associated antenna sector pattern pointing in the direction of that mobile. This channel would be selected if the selection criterion is, for example, maximum signal strength and the channel was free. If the criterion is maximum signal-to-interference ratio, different selections can result. Adaptive channel selection methods can be used to implement the present invention as, for example, disclosed in U.S. Pat. No. 5,230,082 to Ghisler et al. which is incorporated here by reference.

Figure 20:
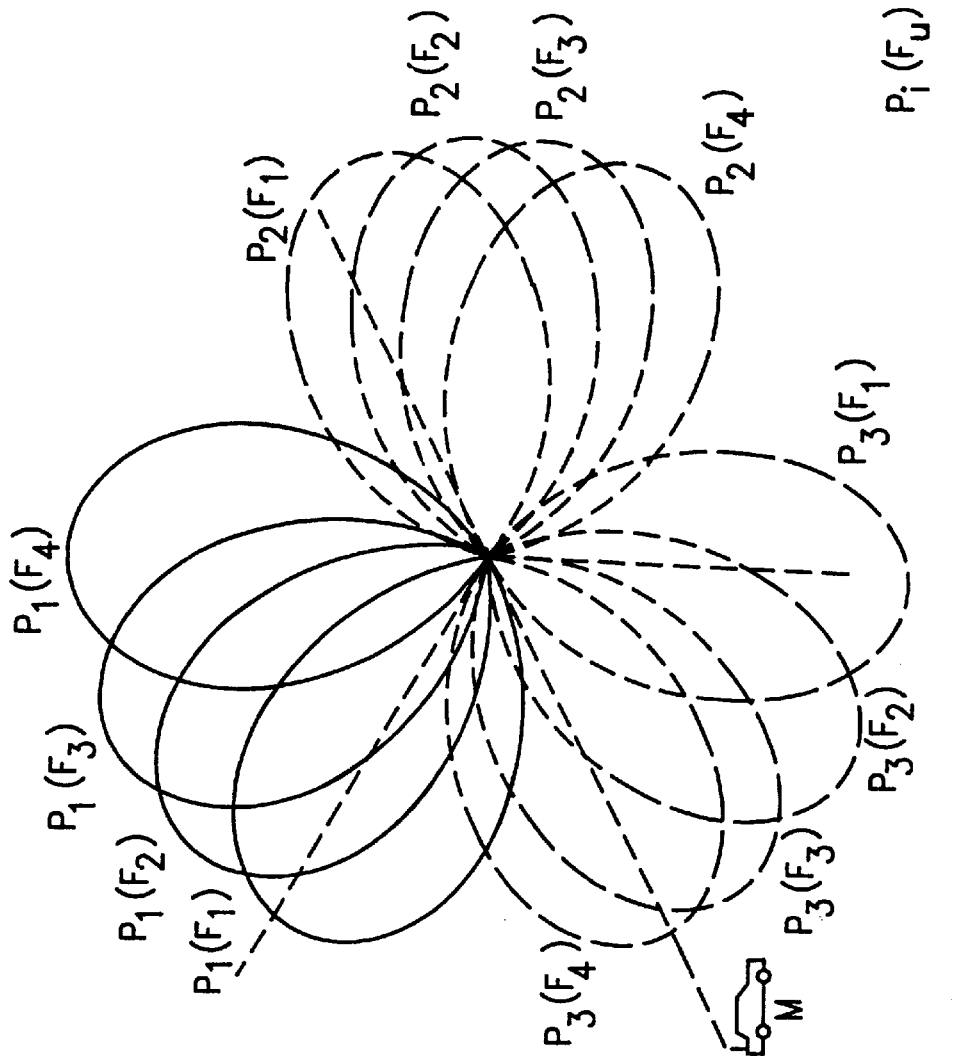
FIG. 20 shows an exemplary arrangement of staggered sector patterns.

FIG. 20 illustrates a set of staggered sector patterns that can be produced by the arrangement of FIG. 18 using fixed matrix coefficients for each frequency channel of an FDMA system. Three lobes are created in this example on every frequency channel. The notation Pi(Fk) indicates the pattern of the $i^{th}$ lobe on the $k^{th}$ frequency channel. The matrix processing coefficients are preferably chosen such that P1(Fk) and P2(Fk) have minima where P3(Fk) has its maximum, and reciprocally. If the minima are zero, the three lobes are said to be orthogonal. That permits a mobile located in the nulls of P1 and P2 to receive maximum signal from P3 with no interference from the other two, which can thus carry separate signals. In general, true zeros will not be perfectly achieved, and the channel selection criterion will thus allocate a mobile to a frequency where the corresponding sector patterns result in maximum ratio of wanted signal to unwanted interference from other lobes and other cells. For example, the mobile M in FIG. 20 would be allocated preferably F4, where the lobe P3(F4) has the maximum strength in the direction of the mobile M. If P3(F4) was not available, the next best allocation P3(F3) would be tried, and so on.

In practice, an FDMA cellular system such as AMPS has 1000 channels available, usually divided between two operators that handle a minimum of 400 each. Using the traditional frequency re-use pattern of 21, this results in around 20 frequencies being available in every cell or 60 per site. The angular difference between lobes on different frequencies would thus, in a three lobe system, be only $\frac{1}{20}$ th of 120 degrees or 6 degrees. In this example, different lobes at the same site all have different frequencies. Assuming uniform distribution of mobiles in angle, the channel allocation algorithm would result in each mobile being within a few degrees of beam center. This results in mobiles receiving better signals on average than in today's fixed sectorization patterns which, when optimized, are around 12 dB down at sector edges. If the wanted signal is improved in this way, the tolerance of interference from surrounding cells is improved such that the re-use pattern can be shrunk from 21 to a tighter re-use pattern such as 12, with a consequent capacity gain of 21/12. This can be achieved using the same number of lobes as sectors in today's cellular systems. If the number of lobes is increased to eight, as illustrated in FIG. 18, a further 8/3 increase in capacity is obtained, to around five times current AMPS capacity. Moreover, allowing every cell to adoptively select any of the 400 frequency channels in attempting to maximize signal to interference ratio gains a factor of two in capacity relative to having a fixed subset of frequencies ($\frac{1}{21}$st or $\frac{1}{12}$th of the total) in each cell. This is achieved when transmit power levels are also adapted to the varying radial distance of each mobile from its cell site. It is also possible to use all 60 site frequencies in each 120 degree sector by making lobes using the same frequency orthogonal, as defined above. Lobe separation is then 2 degrees and the channel allocation algorithm ensures not only that each mobile is within a couple of degrees of beam center, but also within a couple of degrees of the minima of the co-frequency lobes.

If instead of associating staggered sector radiation patterns with different frequency channels F1,F2,F3 . . . they are associated with different timeslots of a TDMA signal using a single frequency, the resulting radiation from the base station antenna will take a certain set of directions for timeslot 1, a set of rotated directions for timeslot 2 and so forth, such that the beams are apparently rotating with time. Thus in the TDMA context this exemplary embodiment of the present invention may be formulated in terms of creating beams which continuously rotate through 360 degrees over a TDMA frame, or more appropriately, rotate by 360/N degrees during a TDMA frame where N is the number of sectors of frequency re-use, and the data modulation for the next frame is shifted back one sector between successive frames such that data for the same mobile continues to be radiated in the same direction. Data destined for a particular mobile is indicated in the US IS54 TDMA system by inclusion of a "Digital Voice Color Code" (DVCC) in TDMA bursts. Thus, for example, this technique can be described more simply in terms of rotating the antenna sector patterns in one direction while rotating the DVCC in the reverse direction at the same rate such that the same DVCC continues to be radiated in the same direction on successive frames.

Both exemplary FDMA and TDMA embodiments of the present invention provide mobile stations with the capability to determine coarse geographic position. In the FDMA version, the mobile measures relative signal strength on different frequencies. The frequency on which the greatest signal strength is received indicates the bearing of the mobile within a sector. The sector is determined by decoding sector ID information contained within the transmission.

In exemplary TDMA embodiments, the mobile does not even have to change frequency. The mobile instead notes the cyclic signal strength variation during a TDMA frame and then determines the peak and trough signal strength positions relative to timeslot 1, which can be identified by the slot ID information carried in each slot.

The cyclic signal strength variation can be processed over several cycles with the aid of a Fourier transform and the phase of the fundamental component relative to timeslot 1 will then indicate the mobile's bearing. Bearings from two base stations of known positions then fix the mobile position. The mobile can report the timing of signal strength peaks and the network can perform the position calculation, rather than the network having to send coordinates of base stations to the mobiles. Upon allocating a traffic channel to a called or calling mobile, the network can then determine the best of all available timeslot/frequency combinations to use.

The above-described can also be adapted to provide advantageous communications between mobile stations and an orbiting satellite. According to this embodiment, the antenna array signal processing is not adapted to various mobile positions, but rather mobiles are allocated to a specific antenna array signal processing channel based on position in such a way as to optimize communications. That is, mobiles are adaptively allocated to communicate using one of a number of fixed, staggered antenna beam positions instead of adaptively steering the antenna beams onto the mobile positions.

The operation for satellite use may be modified slightly. The notion of fixed antenna beams would be applicable to a geostationary satellite, but may not be applicable to, for example, a low-orbit satellite that changes position relative to the earth. Then the position of a beam relative to a given mobile would move due to satellite motion if not due to mobile movement. If the satellite beams move over the earth relatively slowly in comparison with the average 3-minute call duration, it may be sufficient to allocate a mobile to a beam at call set up, as one would in the Geostationary case. However, according to this examplary embodiment of the present invention, beam directions can be adapted to remove the systematic motion of the satellite over the earth so that the area illuminated by each beam is static from satellite rise to satellite set. In this way, a mobile may remain allocated to the same beam irrespective of satellite movement during this period.

Furthermore, such a system of low-orbiting satellites would generally be arranged to provide continuous coverage whereby as one satellite sets, another rises. For example, it can be arranged that a satellite rising in the west takes over the illumination of the same area just being vacated by a satellite setting in the east. Then, as the adjacent area to the east of this experiences loss of the setting satellite, the rising satellite creates a new beam to dovetail in while having maintained the first beam over the original area, and so on until the new satellite has taken over illumination of all areas originally served by the setting satellite.

Thus, the application of this exemplary embodiment of the present invention in the case of moving satellites allows the illumination patterns from the satellite antenna to be compensated for satellite motion so as to illuminate fixed areas of the earth while adaptively allocating mobiles to illumination patterns using a channel assignment algorithm that optimizes a communications quality criterion. This contrasts with mechanical methods of compensating for satellite motion by tilting the satellite or antenna so as to maintain the center point of at least one area constant. This mechanical method, however, cannot maintain the center points of cell illumination areas constant due to these areas changing shape from circular as the satellite moves overhead to elliptic and finally to parabolic at earth-edge illumination. Alternatively, this exemplary embodiment of the present invention can employ both a mechanical method for coarse compensation plus the method of adaptive antenna array signal processing to correct the illumination patterns for shape change as the satellite moves. Alternatively, signal processing can be used to hold the areas served by a particular frequency and/or timeslot constant while progressively creating new areas forward of the satellite's ground track that are being vacated by a setting satellite and while terminating illumination of areas to the rear of its ground track that are being taken over by a rising satellite.

Figure 21A:
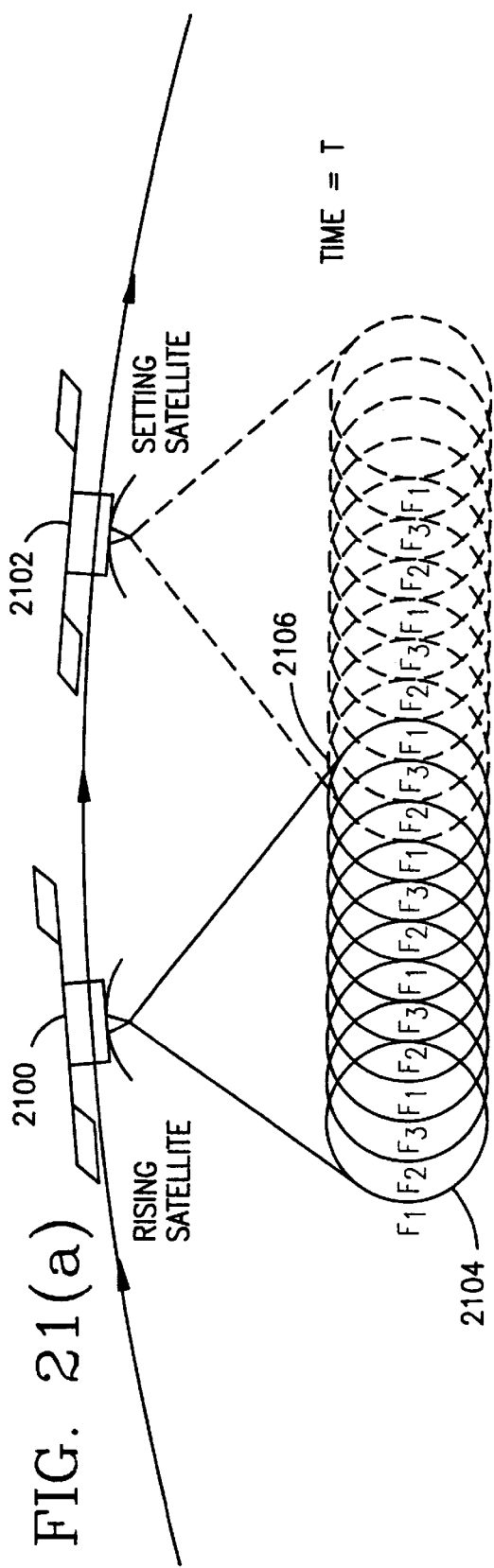
FIGS. 21(*a*) and 21(*b*) illustrate progressive illumination patterns according to an exemplary embodiment of the present invention.
Figure 21B:
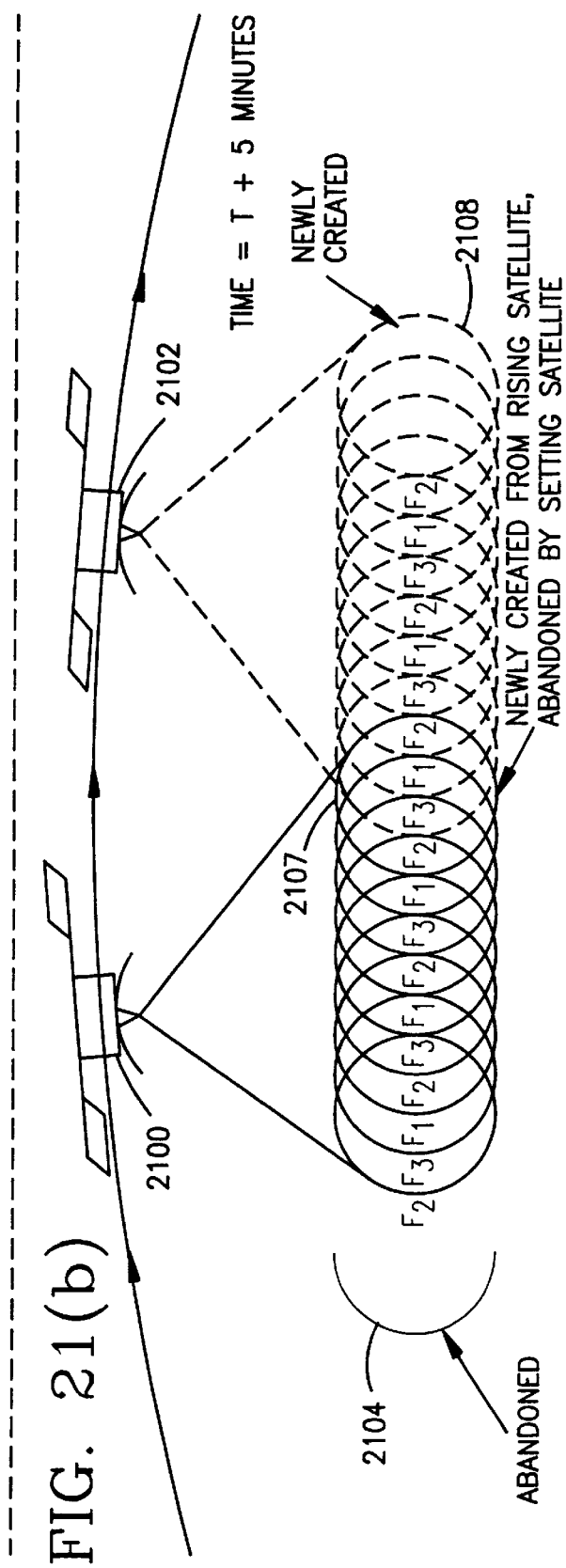

The operation of this exemplary embodiment of the present invention is depicted in FIGS. 21(a) and 21(b). At a certain time T (FIG. 21(a)) a rising satellite 2100 illuminates areas with frequencies (left to right) F1,F2,F3,F1,F2,F3,F1, F2 and a falling satellite 2102 illuminates further areas with frequencies (left to right) F3,F1,F2,F3,F1,F2,F3,F1 which continue the frequency re-use sequence. At, for example, time T+5 minutes (FIG. 21(b)) the rising satellite 2100 has ceased to illuminate the rearmost F1 area 2104 which is presumably now obscured from view (i.e., the satellite is too low on the horizon for good communications with this area) while the setting satellite 2102 has stopped illuminating its rearmost area 2106 with frequency F3 for the same reason.

On the other hand, the rising satellite has created a new illumination area 2107 forward of its ground track to fill in the area vacated by the setting satellite. The rising satellite 2100 can appropriately illuminate the new illumination area 2107 with the same frequency as its predecessor used. Meanwhile, the satellite 2102 that is setting with respect to this area is rising as viewed from areas ahead of its ground track, and uses the released capacity to create a new area 2108 forward of its ground track illuminated with frequency F2.

It will be appreciated that instead of different frequencies, the overlapping areas could have been allocated different timeslots in a TDMA frame, or different frequency/timeslot combinations in a hybrid FDMA/TDMA system. Either way, the availability of a large number of channels allows the overlapping beams to be much more finely spaced than in the example of FIGS. 21(a) and 21(b), so that it is almost equally effective to allocate a mobile to an adjacent beam as to the optimum beam. Logically, one should allocate a mobile preferably to a beam in which the mobile is centrally located. However if the corresponding channel is occupied, the mobile can be allocated to a slightly off-center beam and may be handed over to the on-center beam when the call using that channel terminates.

In the exemplary TDMA embodiment, the rising satellite and the setting satellite can both illuminate the same area using the same frequency, providing different timeslots are used. Thus, a channel and satellite allocation strategy according to the present invention is to allow calls in the changeover region to terminate naturally on the setting satellite and to re-employ their vacated timeslots in the same region and on the same frequency to set up new calls using the rising satellite.

FIG. 22 is a block diagram of an exemplary control processor that supplies the matrix coefficients to the numerical matrix processor of the hub station, e.g., block 1603 in FIG. 13. Inputs to the control processor 2200 include satellite orbital data including attitude control information from the independent satellite Telemetry, Tracking and Command (TT&C) subsystem (not shown). Using satellite orbital and satellite antenna pointing information (attitude control information) and an input from a real time clock, the control processor 2200 can determine the matrix coefficients needed such that a given area will be illuminated by a specific frequency in a specific time slot. These coefficients are systematically updated in step with changes in the real time clock to maintain these illuminated areas approximately fixed irrespective of satellite motion. The control processor 2200 also receives information transmitted from mobile stations making a random access on a calling channel that allows the control processor to determine the best available channel/beam combination to use. This information provides a rough indication of the location of the mobile and the control processor then determines the available beam centered most closely on this location. This in turn determines the frequency and/or timeslot that should be used for communication with the mobile.

It will be apparent to one skilled in the art that TDMA and FDMA are not the only access methods that are compatible with the present invention. Code Division Multiple Access (CDMA) can also be used, where illumination areas are similarly staggered over the earth according to a CDMA code use pattern. Indeed, any multiple access method which defines a channel by means of a set of access parameters can have systematically staggered illumination areas depending on those access parameters. Moreover, the access method used on the downlink can be different from the access method used on the uplink, providing a set of uplink access parameters is paired with a corresponding set of downlink parameters in each offset beam or staggered illuminated area. For example, a combination of TDMA on the downlink with CDMA on the uplink, the uplink transmission being continuous apart from a short interruption during reception of the downlink slot, is disclosed in U.S. patent application Ser. No. 08/179,954 filed on Jan. 11, 1994 and entitled "TDMA/FDMA/CDMA Hybrid Radio Access Methods", which is incorporated here by reference. Having described an exemplary embodiment wherein dynamic traffic channel assignment allows traffic to be adapted to the deterministic characteristics of signal processing, a complementary, exemplary embodiment will now be described wherein capacity can be optimized through coding and frequency re-use schemes.

The ultimate capacity of a cellular satellite communications is limited by available bandwidth, as power limitations can always be solved by money, e.g., by launching more satellites. Practically, however, there are financial constraints on power and political constraints on bandwidth, therefore it is desirable to use bandwidth efficiently without significant sacrifice of power efficiency.

It shall be appreciated that the trade-off of bandwidth and power efficiency for a cellular (i.e., area or global coverage system) is different from that of a single link, as a single link trade-off does not consider the possibility of frequency re-use in adjacent cells. The units of capacity in the two cases are in fact different, being Erlangs/MHz for a single link and Erlangs/MHz/SqKm for a cellular system.

A cellular system illuminates a service area by dividing it into cells and using some fraction 1/N of the total available bandwidth in each. A cluster of N neighboring cells can thus be allocated different 1/N fractions so that they do not interfere. Outside the cluster, for cells far enough away, the bandwidth can be re-allocated to another cluster.

The reduction of interference by employing an N-cell re-use pattern is measured in terms of the carrier to interference ratio C/I, which is the ratio of wanted signal power to the sum of the power of all unwanted spectrally and temporally overlapping signals. Increasing N increases the C/I, but reduces the bandwidth available in every cell, thereby limiting system capacity. Reducing N worsens C/I but increases the bandwidth available to every cell. If the modulation and coding scheme can tolerate the reduced C/I, capacity will thus be increased by reducing N.

One method of providing greater C/I tolerance is to use redundant coding. This method increases the bandwidth per signal, however, which offsets the benefit conferred by shrinking the re-use pattern N. The question to be asked is where the optimum lies.

In land-based cellular systems, this question has been deeply studied, leading some people to conclude that the extreme bandwidth expansion of CDMA techniques combined with immediate frequency re-use in every cell provides the highest capacity. According to exemplary embodiments of the present invention, however, it is found that capacity increases with increasing coding and reduction of N until N=1 is reached with a coding rate of about ⅓ (for landcellular). At this point the system is not regarded as being truly CDMA as each channel is still only used once in every cell. CDMA can be defined as the use of each channel more than once in each cell, i.e., a fractional value of N. For example, N=½ means each channel is used twice in every cell, which would be classified as CDMA.

Whether this further reduction of N to fractional values continues to increase capacity depends on what type of CDMA system is employed and on the nature of the propagation channel and receiver complexity used in the system.

Three types of CDMA systems may be distinguished:
i) Conventional, non-orthogonal CDMA
ii) Orthogonal CDMA
iii) Interference cancellation CDMA (subtractive CDMA, joint demodulation, etc.)

For the landbased cellular world, it is found that the capacity drops off below N=1 for CDMA of type (i), levels off for orthogonal CDMA (which is really equivalent to giving every signal a unique frequency or timeslot) and increases for systems of type (iii). Moreover, the gain found in systems of type (iii) for landbased cellular where N<1 is due to the high near-far environment such that the interference averaging inherent in CDMA techniques includes many transmitters of significantly reduced power, and due to the landbased cellular scenario being C/I limited rather than noise, C/No, limited. Neither of these features are relevant to satellite communications systems. Accordingly, the present invention explores what kind of coding/frequency re-use trade-off would maximize capacity for a given bandwidth allocation in C/No-limited satellite communication systems.

The signal spillover between cells in a landbased cellular system is a function of the fourth-power-of-distance propagation law. In cellular-satellite systems C/I is a function of antenna beam pattern sidelobes. It is necessary therefore to develop some model of antenna beam patterns to perform coding optimization.

Figure 23:
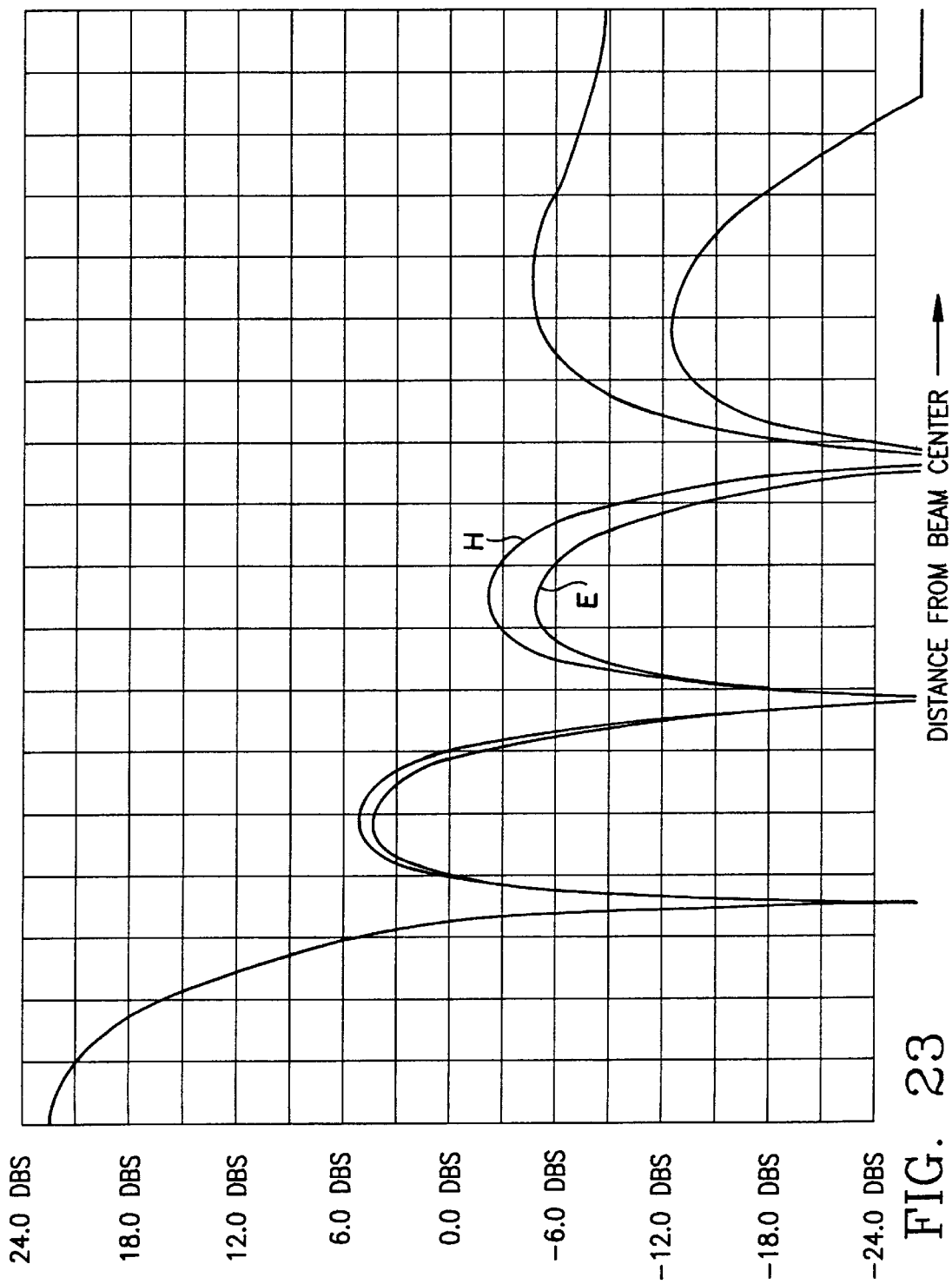
FIG. 23 is a graphical representation of an exemplary radiation pattern for a circular-symmetric, uniform aperture illumination function.

The beam pattern of the antenna depends on the surface current distribution over the aperture, called the aperture illumination function. Without invoking the supergain phenomenon, the most efficient use of aperture is obtained with uniform illumination. This gives the best gain but the highest sidelobes. The radiation pattern is plotted in FIG. 23 for a uniformly illuminated circular aperture. The sidelobes in the E and H planes are slightly different owing to an extra cosine factor that appears in the plane containing the surface current vector. This difference manifests itself as cross-polarization components when circular polarization is employed. Henceforth the E and H plane patterns will simply be averaged for the calculation of C/I.

Reference is made again to FIG. 5 which illustrates a 3-cell frequency re-use pattern, wherein the shaded cells use the same channel f1 while the others use f2 or f3. This re-use pattern will be used to investigate the coding/frequency re-use tradeoff for satellite communications, however, those skilled in the art will appreciate that any re-use pattern, e.g., 7, 9, 12, 21, etc., could be used. Interfering cells lie on the points of a hexagon and it suffices to consider the first two rings of six interferers. Before their interference levels can be computed however, it is necessary to choose the correct scaling of the beam pattern to match the cell diameter.

If the beams are scaled to cross at −3 dB relative to peak gain midway between two cells, it is well known that this does not result in maximum beam-edge gain. A higher gain is achieved if the beam is narrowed, which increases the peak gain more than increased edge-loss experienced.

Figure 24:
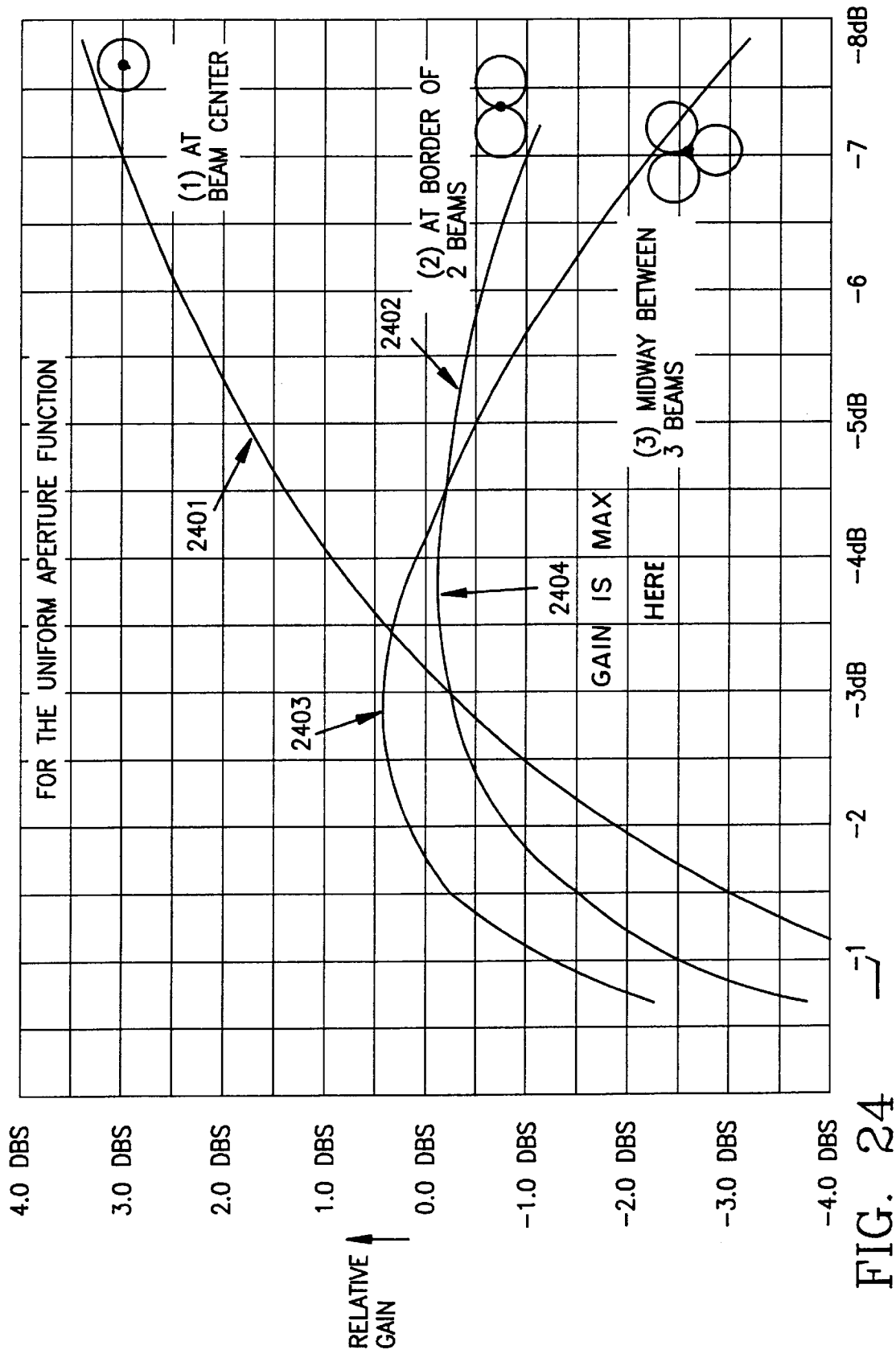
FIG. 24 is an exemplary graph of relative signal gain versus beam crossover points.

FIG. 24 is a plot of peak gain 2401 (at the center of a cell), edge gain 2402 (midway between two cells) and the gain midway between three cells 2403 as a function of the two-cell crossover point in dB down from peak, relative to the peak gain of the −3 dB crossover case. For reasons that will be explained later, the two-cell edge gain has been scaled by a factor of two in this plot (i.e., 3.01 dB is added) and the 3-cell edge gain has been scaled by a factor of 3 (i.e., 4.771 dB has been added). This does not affect where the respective gains peak, but affects the perception of which of the three is the worst case. According to this graph, the worst case occurs midway between two cells, and the worst case gain is maximized when the 2-cell edge is 3.8 dB down on the peak gain, i.e., at point 2404.

Figure 25:
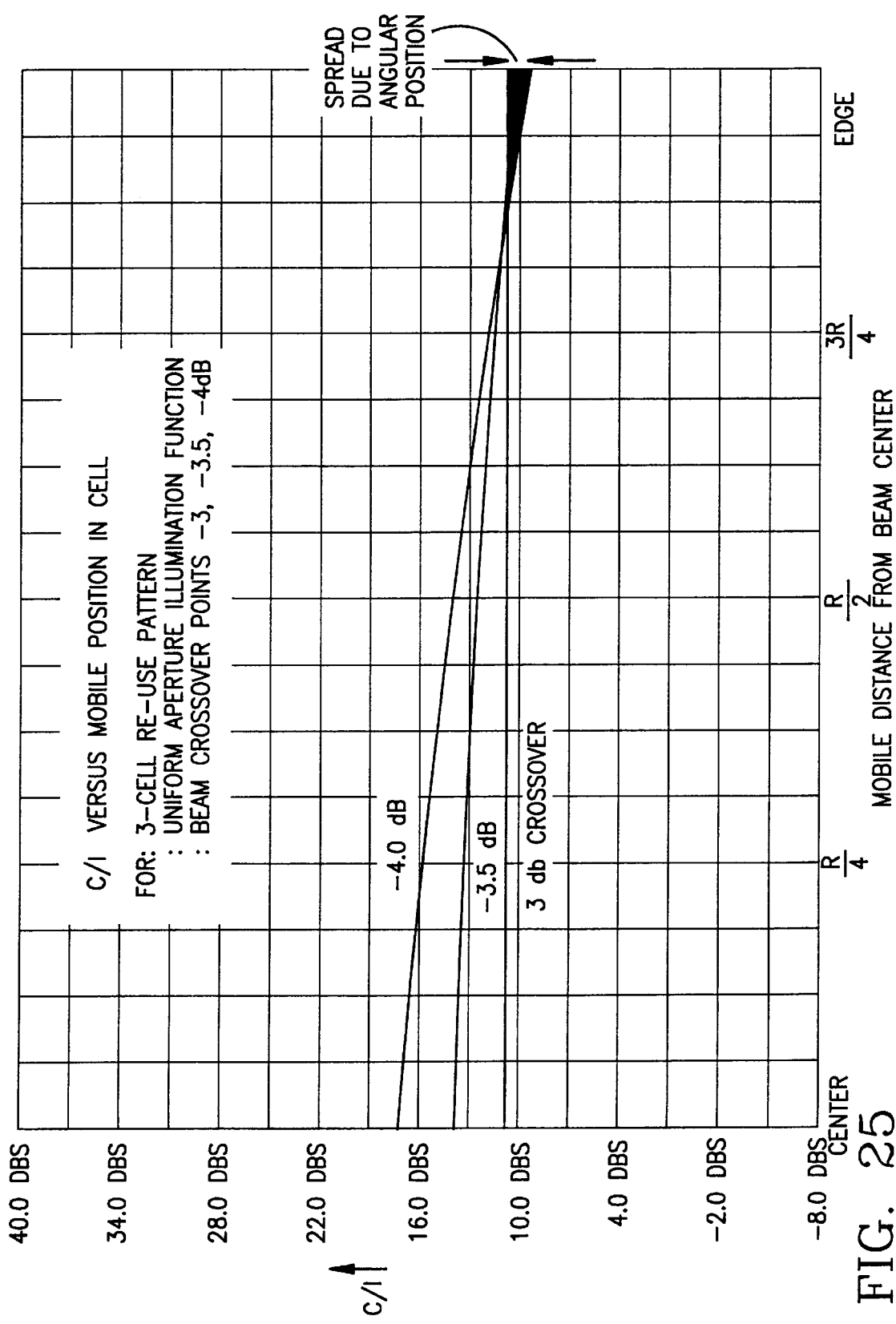
FIG. 25 is an exemplary graph illustrating C/I versus mobile position in cell for a 3-cell frequency re-use pattern.

The way in which the C/I parameter depends on the beam crossover point is shown for the 3-cell re-use pattern of FIG. 5 in FIG. 25. FIG. 25 is plotted as a function of mobile station distance from beam center for crossover points of −3, −3.5 and −4dB showing that C/I over most of the cell radius increases if the beams are narrowed beyond that which gives maximum edge gain. If necessary, choosing a crossover point of −4.5 dB would cause negligible loss of edge gain while improving C/I at cell center by a further 3 dB to about 20 dB. C/I at cell edge according to FIG. 4 would be just less than 10 dB, but this includes the unmitigated beam edge crossover loss which, as will be explained later, will not be incurred because no mobiles need be located there.

Figure 26:
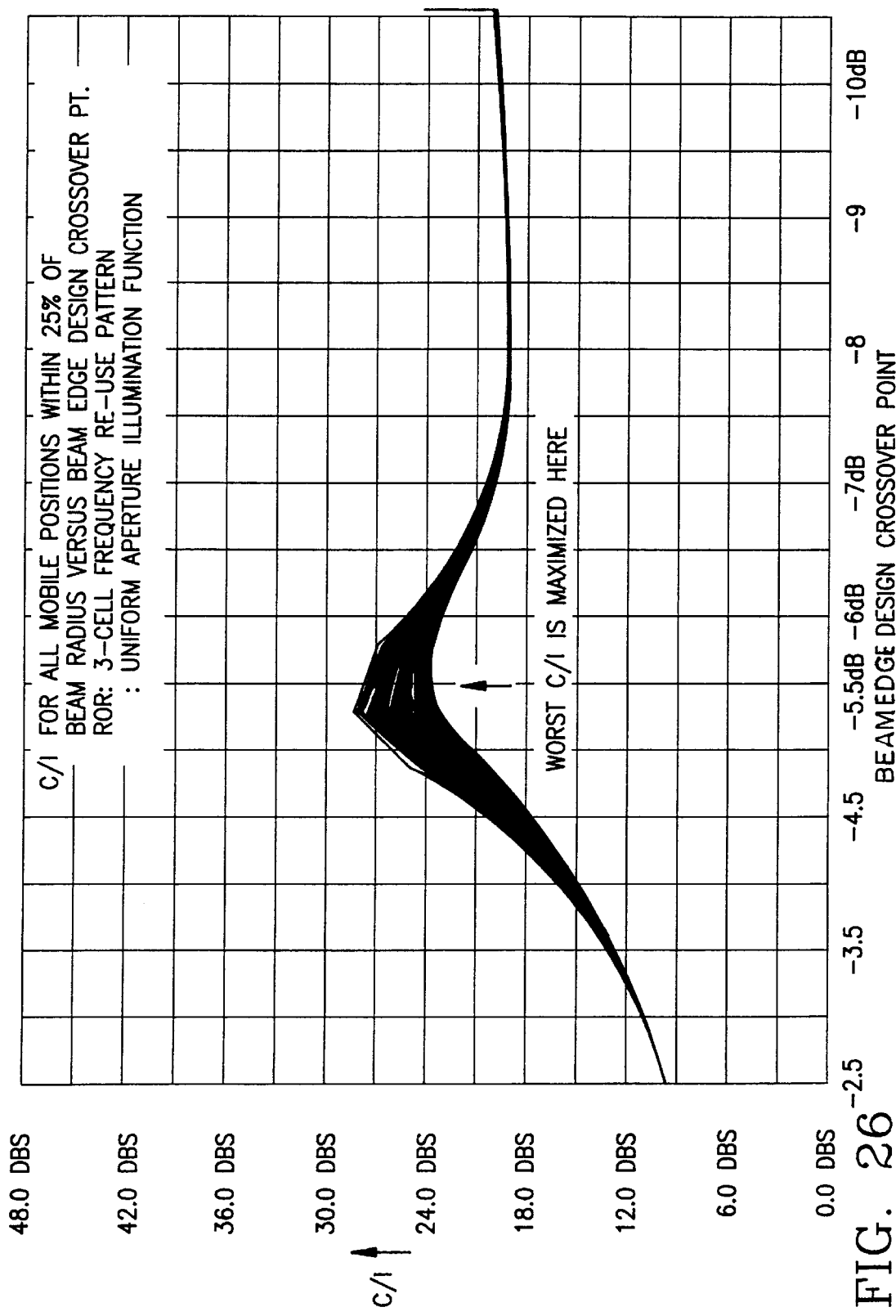
FIG. 26 is an exemplary graph illustrating C/I versus beam edge crossover point.

If mobiles assigned to a particular channel and beam are chosen to be those located within 25% of the maximum cell radius, the C/I for all points within that area will be as plotted in FIG. 26. The worst case C/I is maximized to about 23 dB with a beam crossover design point of −5.5 dB, somewhat beyond that which gives maximum edge gain, so in practice the −4.5 dB crossover point would be used, giving a worst case C/I of 18 dB.

Figure 27:
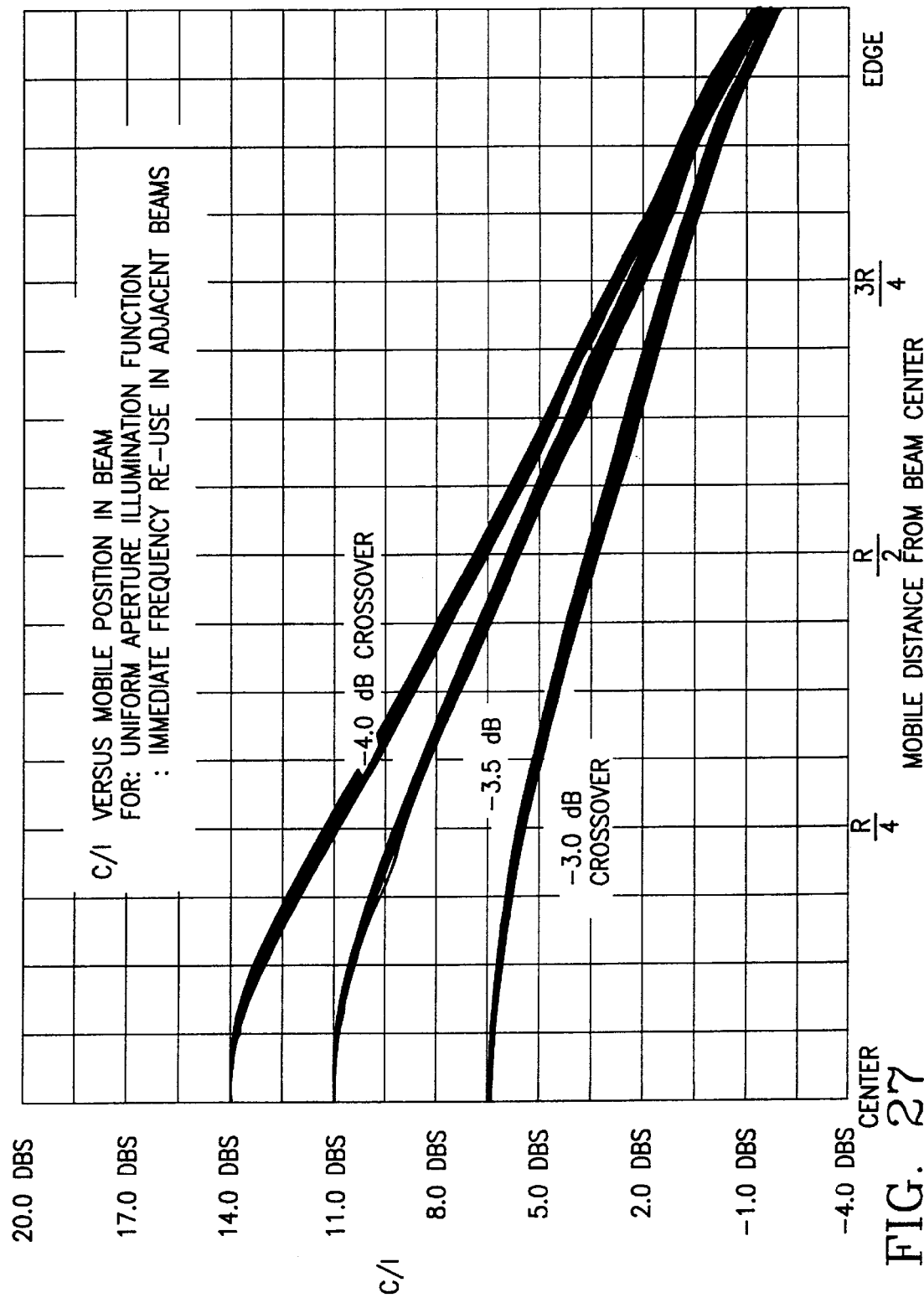
FIG. 27 is an exemplary graph illustrating C/I versus mobile position in cell for an immediate frequency re-use system.

The same calculations are now repeated for the N=1 frequency re-use pattern, i.e., immediate frequency re-use in adjacent cells, and results are plotted in FIG. 27. This shows a cell-enter C/I of 14 dB for the 4 dB crossover case, but a cell edge C/I of about −1.5 dB. The thickness of the curves in FIG. 27 is due to superimposition of plots for all mobile angular positions in the cell, and dependence on angular position is a little more noticeable in the N=1 case than the N=3 case. The first 6 rings of 6 interferers were summed to obtain the plot of FIG. 27.

Figure 28:
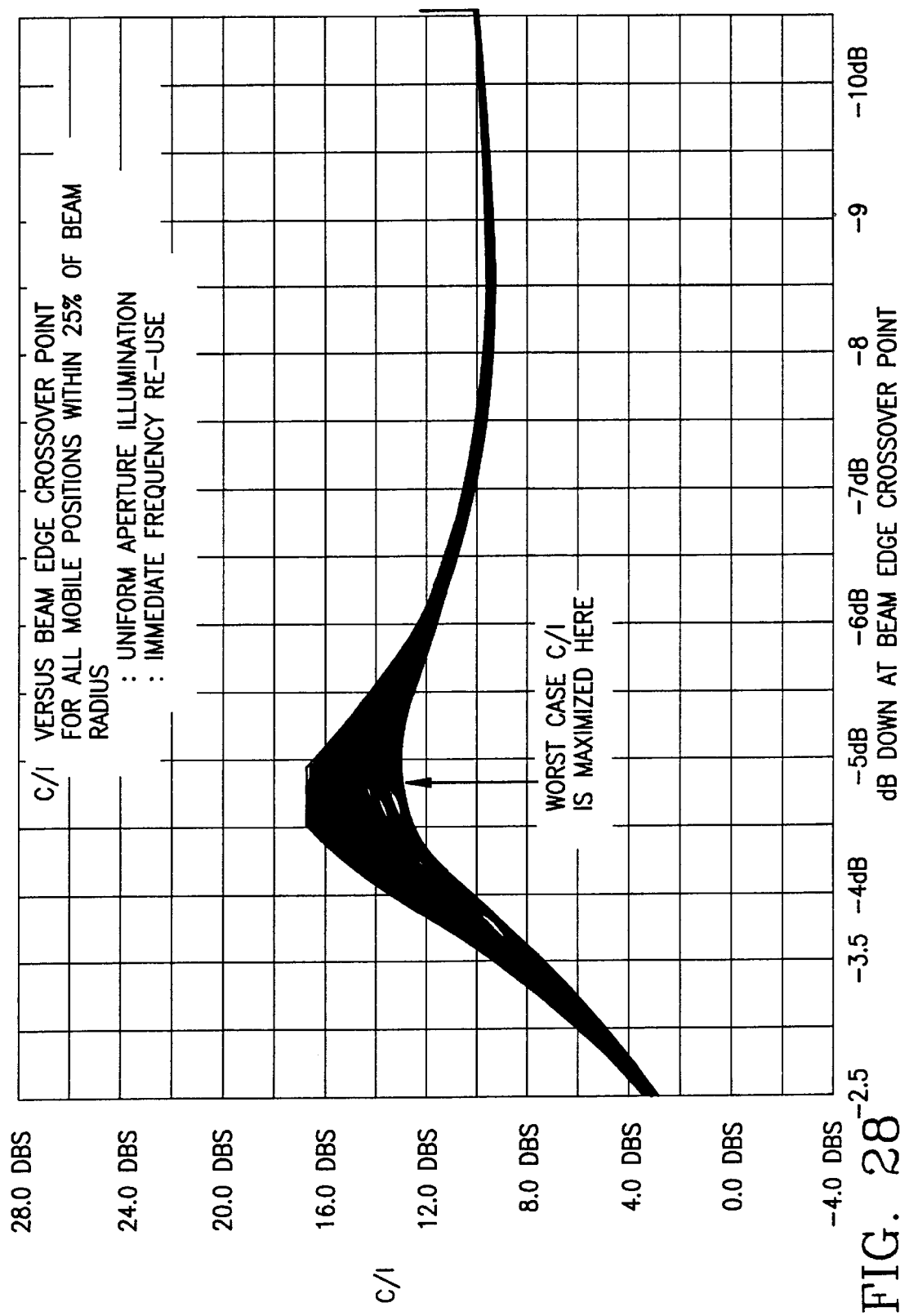
FIG. 28 is an exemplary graph illustrating C/I versus beam edge crossover point for an immediate frequency re-use system.
Figure 29:
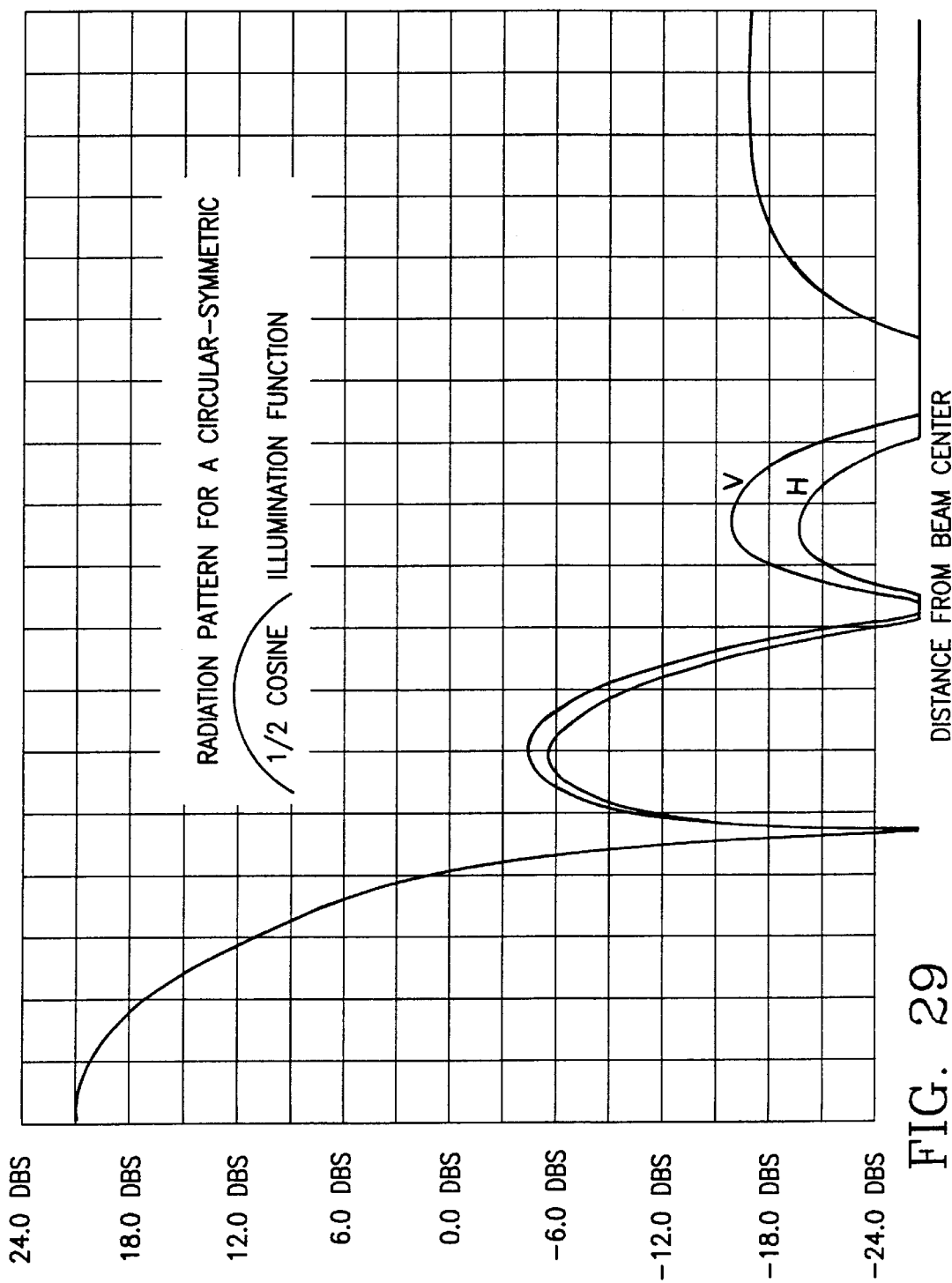
FIG. 29 illustrates an exemplary radiation pattern for a circular-symmetric, ½ cosine aperture illumination function.

Again, as will be shown later, mobiles using a particular channel and beam can be restricted to those lying within 25% of beam center or less, so it is of interest to maximize the worst case C/I within this region, as shown in FIG. 28. The worst case C/I in this case maximizes at 13 dB by choosing the beam crossover point to be 4.8 dB, but this may be restricted to −4.5 dB to avoid loss of beam edge gain for only a small reduction in C/I to 12.5 dB.

Figure 34:
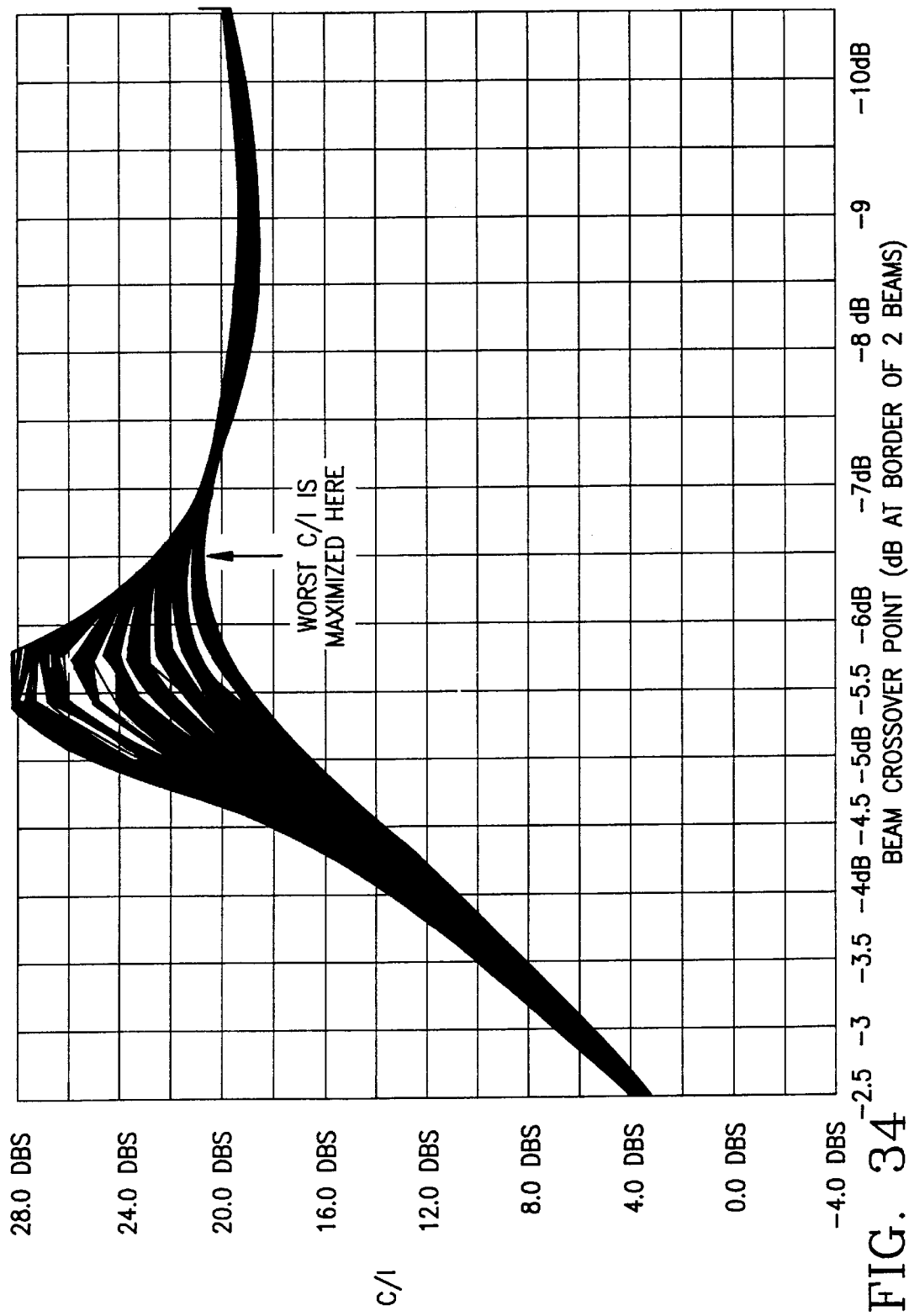
FIG. 34 is an exemplary graph illustrating C/I at all points within 25% of beam radius as a function of dB down at beam edge crossover for an immediate frequency re-use system using the aperture illumination function of FIG. 29.

FIGS. 29–34 give the results for repeating the whole process described above for a different aperture illumination function, the ½-cosine wave. This aperture illumination function is slightly less aperture-efficient than a uniform distribution, but gives lower sidelobe levels (see FIG. 29) leading to higher C/I, particularly in the 3-cell re-use case (20 dB over whole cell, or 27 dB out to 25% of radius). As seen in FIG. 34, the C/I for immediate frequency re-use out of 25% of cell radius is 13.5 dB with the practical beam-edge crossover point of −4.5 dB. Since this was 12.5 dB for the uniform illumination, case of FIG. 28 it should be noted that this value is not very sensitive to the aperture function being used.

The bit error rate is generally plotted as a function of Eb/No, which is equal to the ratio of signal power to the noise power if it were to be measured in a bandwidth equal to the bit rate. The latter does not imply any assumption that any physical receiver filter bandwidth must be equal to the bitrate; it is only that "bitrate" is a convenient unit of bandwidth for defining the noise density with which the performance of any given receiver will be tested. The receiver error rate performance will of course depend on the choice of its bandwidth, and that which optimizes performance at a given Eb/No may be greater or less than the bitrate depending on the modulation and coding being used.

The C/I parameter is, by contrast, the ratio of wanted to unwanted signal power in the physical receiver bandwidth. This ratio, however, is independent of the choice of receive filter if the C and I have the same spectral shape and are thus equally affected by the filter. With the simplification that any 'I' passed through the receive filter will have the same effect on error rate as an equivalent amount of white noise, NoB, passed by the filter, where B is the noise bandwidth, the effect of I can be expressed in terms of an equivalent increase in noise density No by an amount Io to No+Io, where Io is given by $$I = Io.B \text{ i.e. } Io = I/B$$

For BPSK modulation, the optimum receiver bandwidth is indeed equal to the bitrate, while for QPSK modulation the optimum receiver bandwidth is equal to half the bitrate. The bitrate here though is the coded bitrate/chiprate, whereas the bitrate for defining Eb/No is the information rate. Thus:

B=Bitrate/r for coding rate r in the BPSK case,

B=Bitrate/2r in the QPSK case, and for general M-ary modulation,

B=Bitrate/rLog$_2$(M)=Bitrate/mr where m is the bits per symbol.

Therefore the total bit energy Eb to noise plus interference density ratio is given by:

$$\frac{Eb}{(No + Io)} = \left[\frac{No}{Eb} + \frac{Bitrate}{B} \cdot \frac{I}{C}\right]^{-1} = \left[\frac{No}{Eb} + mr \cdot \frac{I}{C}\right]$$

For less than 0.5 dB degradation of the Eb/No required for a given error rate due to finite C/I, the value of mr.I/C should thus be one tenth No/Eb.

For example, if the ratio Eb/No without interference of 3 dB is desired, then to operate at 3.5 dB Eb/No the C/I must be 10 mr.Eb/No. For BPSK or QPSK and different code rates, the required C/I for exemplary coding rates is given below:

| REQUIRED C/I using | BPSK | QPSK |
|---|---|---|
| Coding rate 1 (none) | 13.5 dB | 16.5 dB |
| ½ | 10.5 dB | 13.5 dB |
| ⅓ | 8.7 dB | 11.7 dB |
| ¼ | 7.5 dB | 10.5 dB |

The above is for a static channel and does not take into account that lower Eb/Nos are needed with lower rate codes for the same error rate.

"Error Correction Coding for Digital Communications" by Clark and Cain gives the required Eb/Nos for 0.1% BER for constraint length 6 convolutional code rates of 1, ¾, ⅔, ½ and ⅓ as follows:

| r | Eb/No for BER = 0.1% |
|---|---|
| 1 | 6.7 dB |
| ¾ | 3.9 dB |
| ⅔ | 3.5 dB |
| ½ | 3.0 dB |
| ⅓ | 2.6 dB |

By extrapolation it may be estimated that rate ¼ would require 2.3 dB with diminishing returns thereafter. Using these Eb/No figures, the C/I required for less than a given degradation are calculated to be:

| | REQUIRED C/I for 0.5 dB | | 1.0 dB loss | | 3.0 dB loss | |
|---|---|---|---|---|---|---|
| | BPSK | QPSK | BPSK | QPSK | BPSK | QPSK |
| 1 Coding rate 1 (none) | 17.2dB | 20.2dB | 13.7 | 16.7 | 9.7 | 12.7 |
| ¾ | 13.2 | 16.2 | 10.9 | 13.9 | 6.9 | 9.9 |
| ⅔ | 12.2 | 15.2 | 8.7 | 11.7 | 4.7 | 7.7 |
| ½ | 10.5 | 13.5 | 7.0 | 10.0 | 3.0 | 6.0 |
| ⅓ | 8.3 | 11.3 | 4.8 | 7.8 | 0.8 | 3.8 |
| ¼ | 6.8 | 9.8 | 3.3 | 6.3 | −0.7 | 12.3 |
| ⅕ | 5.7 | 8.7 | 2.2 | 5.2 | −1.8 | 1.2dB |

Thus, while the Eb/No for a given error rate levels out with increasing coding, the C/I required continues to decrease due to the continually increasing bandwidth. This equates to the separate concepts of coding gain (which applies to Eb/No) and processing gain (which applies to C/I). Coding gain is bounded by Shannon's limit, while processing gain continues to increase with bandwidth as in a CDMA system.

The above results for the static channel are pessimistic for fading channels. When Rician or Rayleigh fading is present, the mean Eb/No can be increased above the static Eb/No requirement to maintain the same error rate. However, on the satellite downlink the C/I does not exhibit fading, because both the I and C reach a given mobile over exactly the same channel and fade by exactly equal amounts. Thus the C/I does not decrease by 10 dB when the Eb/No fades 10 dB, but instead stays at the original value.

In the fading channel, since the error rate at the mean Eb/No is considerably less than the target value, and when it fades to the static Eb/No value still only equals the target value, it is clear that the error rate only reaches the target value by virtue of fades to below the static Eb/No value. In fact it can be shown that the preponderance of errors arise from the instantaneous Eb/No region well below the static Eb/No value, where the same C/I causes less degradation. It can be assumed that lower C/I values can be tolerated in conjunction with the higher Eb/No values needed to account for fading.

Thus the 12.5–13.5 dB C/I values achievable out to 25% of beam radius with immediate frequency re-use are acceptable with coding rates of ½ to ⅓ and using QPSK. Increasing the re-use pattern to N=3 would yield 3 times less bandwidth per cell, requiring that all coding be removed and even higher order modulations than QPSK to be contemplated in order to achieve the same bandwidth efficiency, but with the penalty of needing considerably higher power (e.g., Eb/No of 7.7 dB to 10.7 dB for achievable C/I's with the 3-cell re-use pattern). Thus there is no gain in bandwidth efficiency using an N=3 or greater frequency re-use pattern instead of N=1, only a major penalty that either is paid in power efficiency (for maintaining the same bandwidth efficiency by removing coding, as in the AMSC system) or in bandwidth efficiency if coding is retained.

To make use of the above result it is explained below how use of a beam can be restricted to mobiles located, for example, only out to 25% of the beam radius or less.

A gain of up to 2:1 in capacity can be achieved in cellular systems with a type of frequency planning known as "re-use partitioning". In a simple form of re-use partitioning, the available channels in a cell are partitioned into three sets that are preferentially used for a) mobiles within the inner ⅓ of the total cell area; b) for mobiles between ⅓ and ⅔ of the cell area, and c) for mobiles in the outer ⅓ of the cell area. Assuming a uniform area distribution of mobiles within the cell, this partitioning achieves equal demand for each of the channel sets. The allocation of channels to equal area rings is then permuted in the neighboring cells according to a 3-cell re-use pattern with the result that no two neighboring cells use the same channel out to their mutual border, with consequent increase in C/I for no loss of capacity. The overall re-use pattern to achieve a given C/I may then be shrunk to achieve an increase in capacity. Based on the foregoing principles, re-use partitioning and coding can be optimally combined according to examplary embodiments of the present invention which will now be described.

Figure 35:
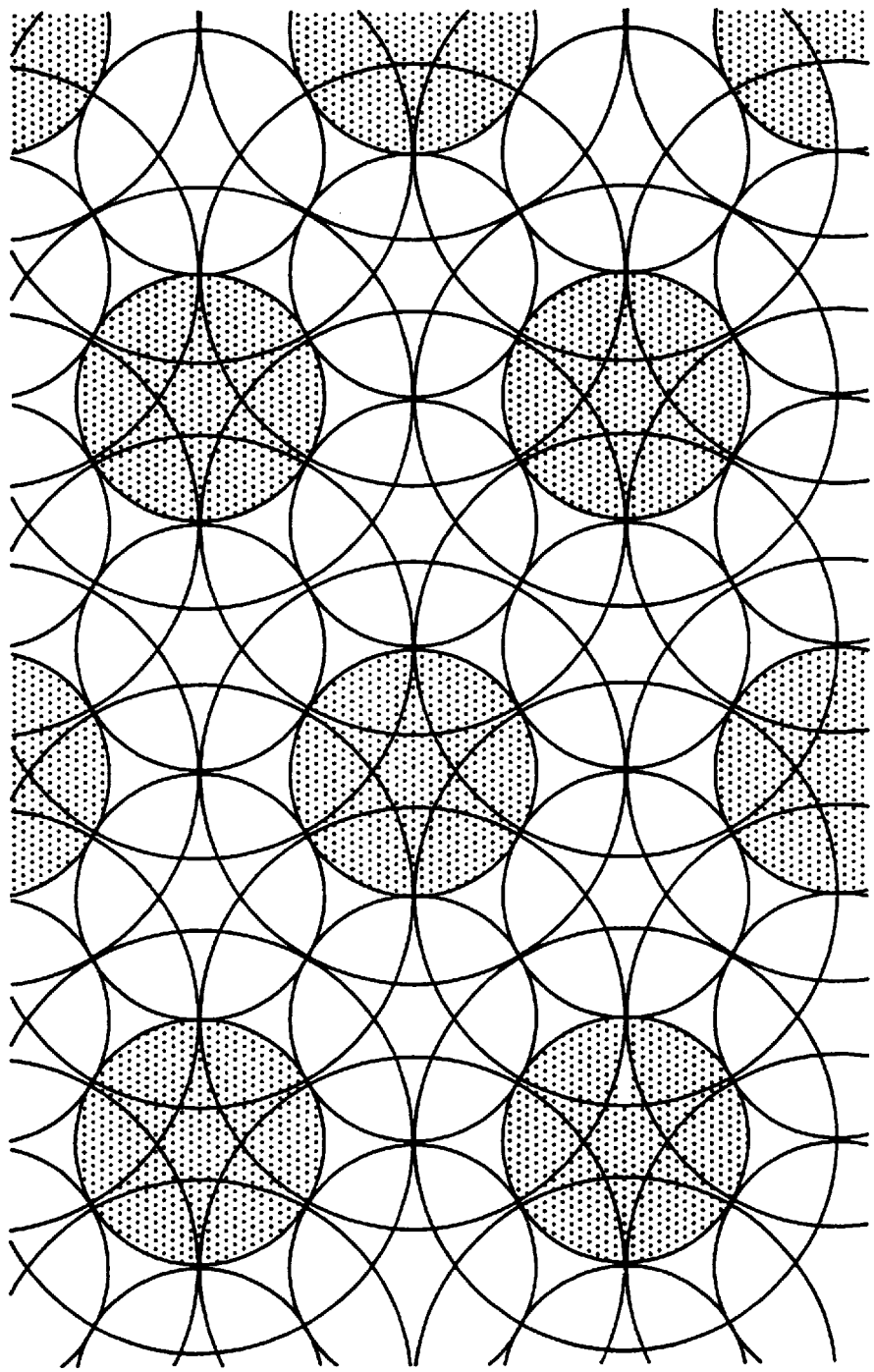
FIG. 35 illustrates beam and cell patterns according to an exemplary embodiment of the present invention.

FIG. 35 shows a simplified example form for the case where three channels or groups of channels (which may be frequencies, timeslots, codes or combinations thereof), designated by the colors black, red and green are available in every beam. The beam edges at the design crossover point (e.g., −4.5 dB) are shown by the larger colored circles of FIG. 35.

The large black touching circles thus refer to beams using the "black" channel and touch at −4.5 dB down from the peak gain. The large red touching circles represent the beam patterns for the red channel. These are displaced relative to the "black" beams, and this fixed displacement is achieved for example by modifying the phases of a phased array for the "red" channel relative to the "black" channel. It may also be achieved by use of a multiply-fed parabolic reflector, in which the unmodified beam patterns are used for the "black" channels, but in which three adjacent feeds are energized each with ⅓rd of the energy destined for a "red" cell. Due to coherent addition, the gain in the center of the "red" cell will be 3 times a "black" beam gain at that point, effectively "filling in the hole". The "green" beams are formed in exactly the same way for the "green" frequency or timeslot. This is achieved using ground based hardware that directs the appropriate combination of signals through the transponder channel directly associated with each of the feeds.

In FIG. 35, the smaller circles show the areas out to which a particular channel is to be used, beyond which a different channel is available with a more centrally directed beam. The area has been filled in in the case of the black beam to assist in identifying it. This area extends from the center of a beam out to the beam radius over root(3), that is the "cell" area is only ⅓rd of the "beam" area, and mobiles in the "cell" only use the "beam" out to slightly more than 50% of the beam radius.

Figure 30:
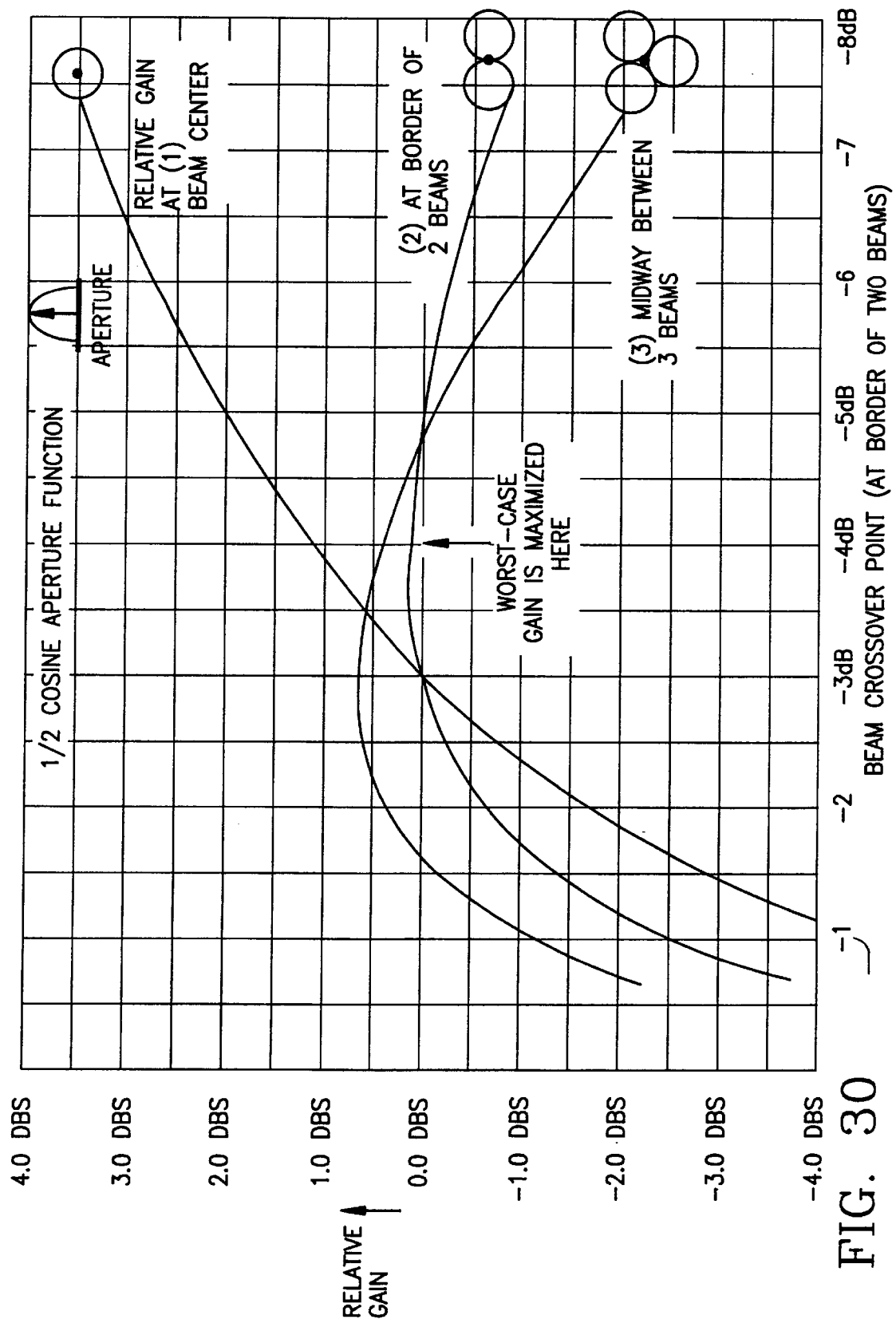
FIG. 30 is an exemplary graph of relative signal gain versus beam crossover points for the illumination function pattern of FIG. 29.
Figure 31:
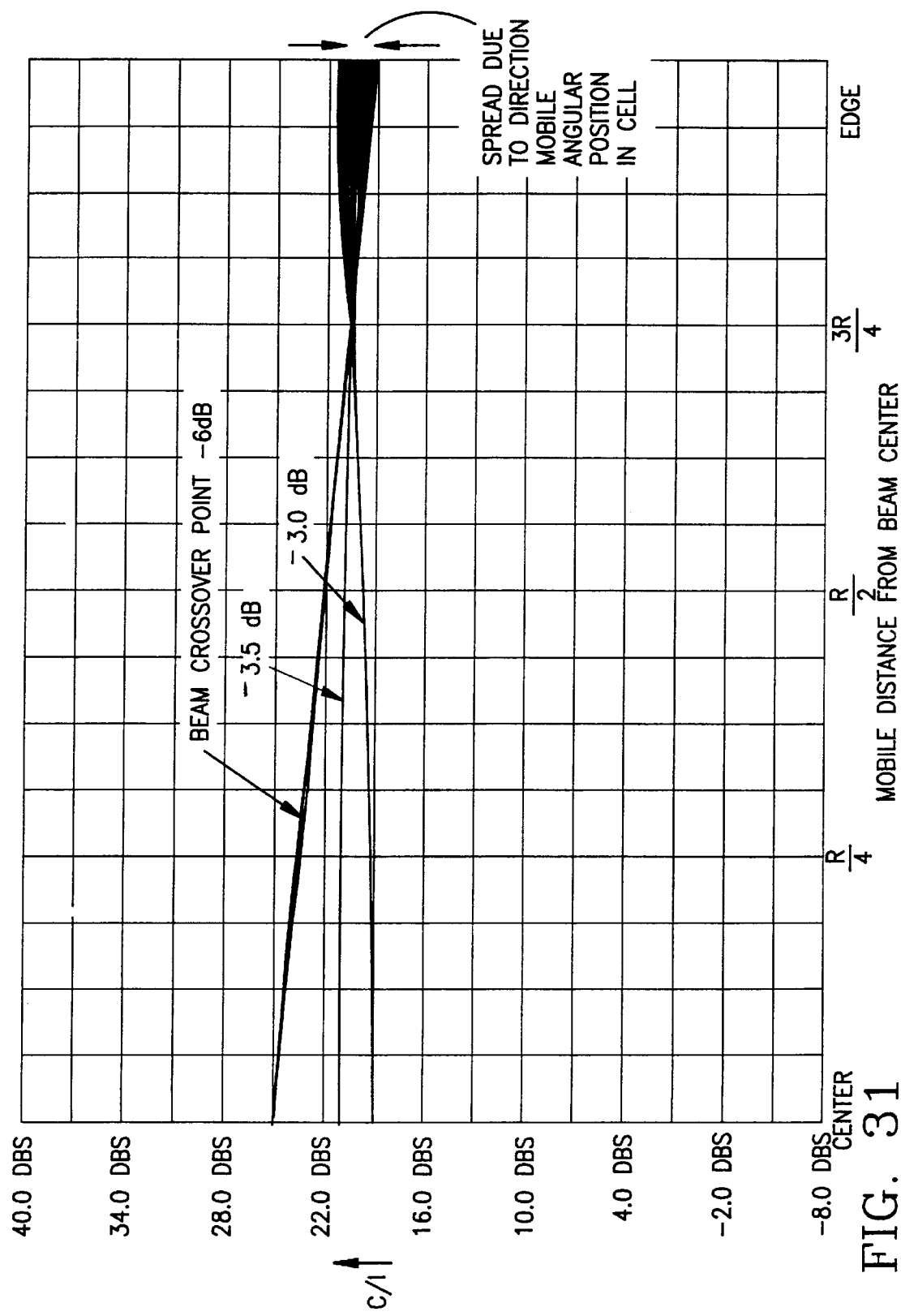
FIG. 31 is an exemplary graph illustrating C/I versus mobile position in cell for a 3-cell re-use pattern for the illumination function of FIG. 29.
Figure 32:
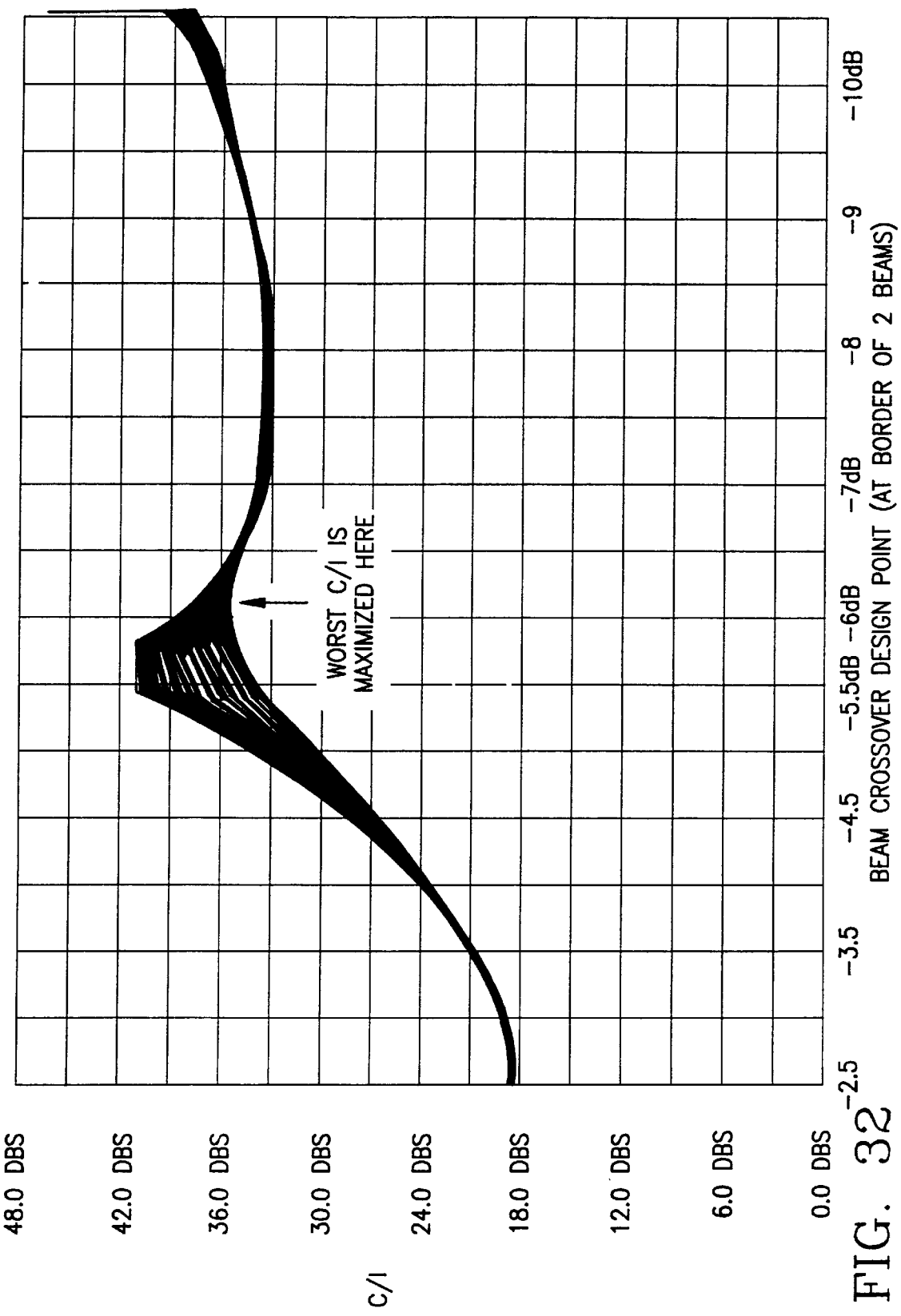
FIG. 32 is an exemplary graph illustrating C/I versus beam crossover point at all mobile positions within 25% of cell radius for a 3-cell re-use pattern for the illumination function of FIG. 29.
Figure 33:
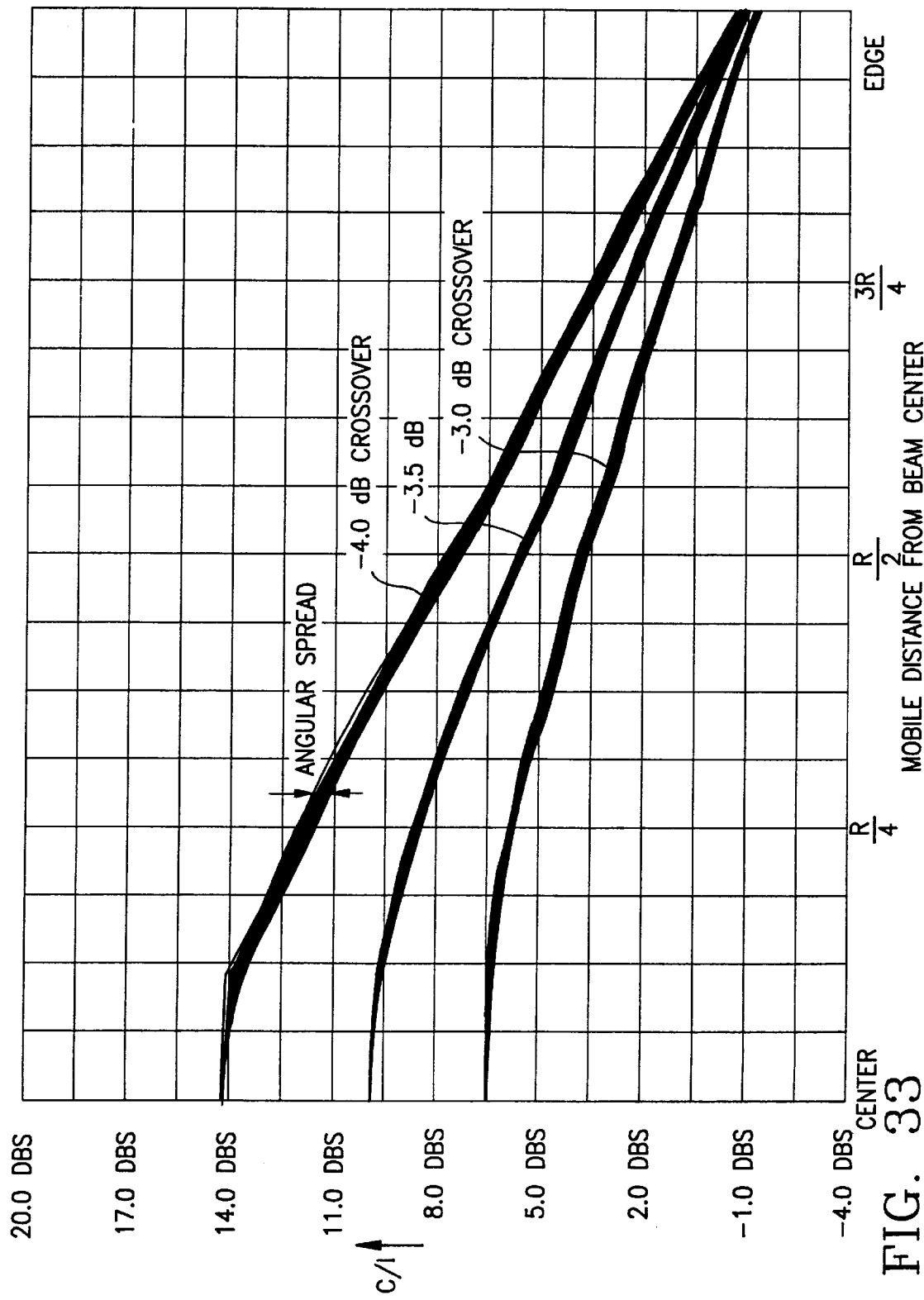
FIG. 33 is an exemplary graph illustrating C/I versus mobile position in cell for immediate frequency re-use for the illumination function of FIG. 29.
Figure 36:
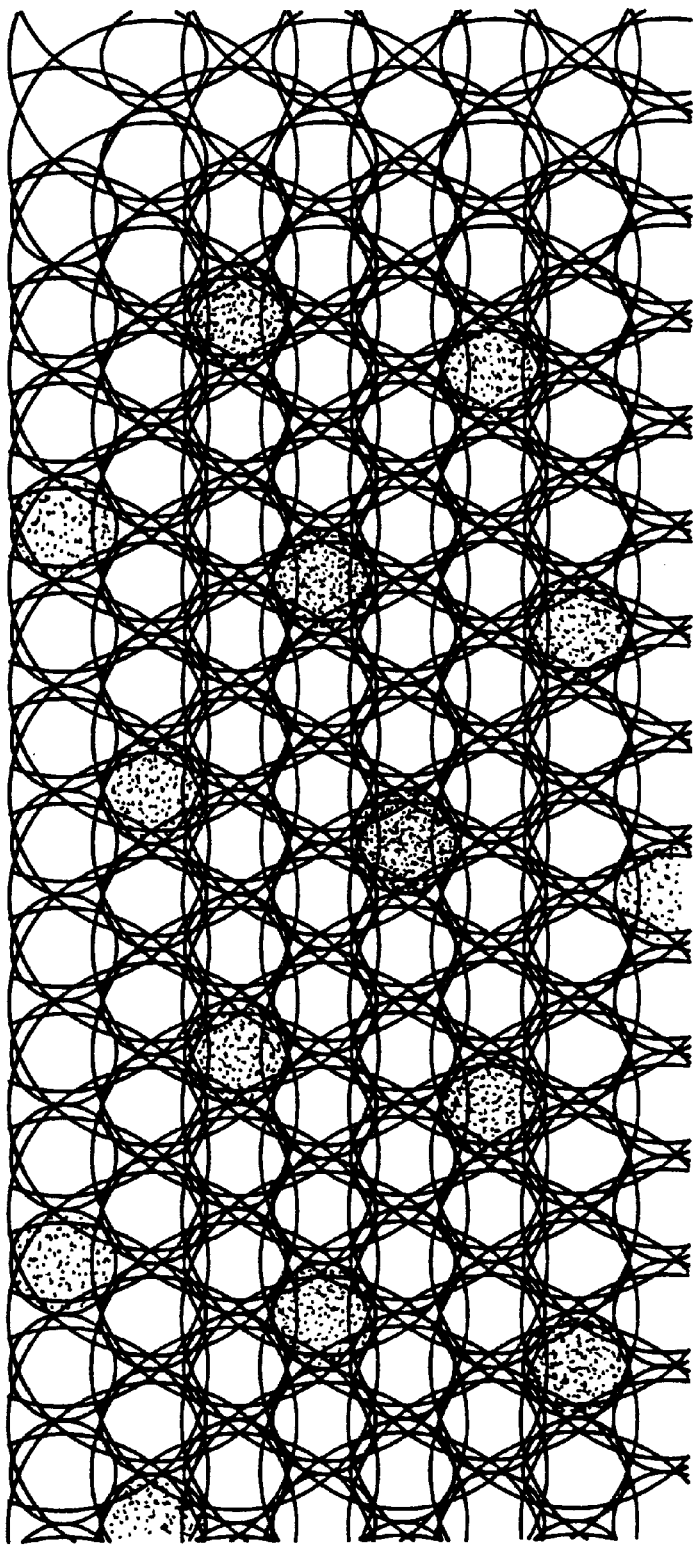
FIG. 36 illustrates another exemplary beam and cell pattern using seven communication channels.

In practice, of course, many more than three channels are available per beam, so it is possible to plan for cells that are only 1/M of the beam spot area where M is the number of channels available. If M=7 for example, beams are only used out to 1/root(7) of their radius, as illustrated in FIG. 36. In practice M will be at least 100, so cell radius can be ¹/₁₀th of the beam radius, hence the gain and C/I performance of the beam configuration is only important for a fraction of the beam spot coverage. This does not necessarily mean it is possible to shrink the spot to obtain more gain, as it would not then be possible so easily to "fill in the holes". With a large number of offset beams it is desirable to phase the physical feeds to produce peak gain anywhere, and as indicated by FIGS. 24 and 30. The hardest place to obtain gain (by phasing only two feeds together) is midway between two spots, and the gain under those circumstances is maximized by choosing the beam edge crossover points as indicated on FIGS. 24 and 30. The gain between two beams is then twice the beam edge gain (e.g., 3 dB up) while the gain between three beams is three times the gain of one beam at that point. This explains the scaling used on FIGS. 24 and 30 for comparing the gain at those three points.

Thus, the error correction coding of rate between ½ and ⅓ which is, in any case, contemplated for power efficiency reasons, can also provide tolerance of the C/Is obtained with immediate frequency re-use in every beam, if the technique of re-use partitioning just explained above is employed. The technique of re-use partitioning achieves this without resort to null-creation or interference cancellation, i.e., all antenna degrees of freedom are used to maximize gain. The technique of interference cancellation or creating pattern nulls at the center of neighboring cells can be employed as a further bonus to reduce C/I from neighboring beams to negligible proportions.

An exemplary coding scheme which can be used to implement this exemplary embodiment of the present invention is punctured convolutional coding based on rate ¼ or ⅕th, but in which the coding of each uncoded speech bit is adapted according to its perceptual significance to a level between, for example, rate ½ and rate ⅕. Although BPSK tolerates 3 dB lower C/I than QPSK, there seems no reason to incur the 2:1 bandwidth efficiency loss. The C/I tolerance of QPSK with twice the coding is in fact better than BPSK with half as much coding, therefore a quaternary modulation can be used at least for the downlink.

The above discussion is based on coherent demodulation performance, which is achievable in the satellite-to-mobile channel using quite wideband TDM and is not achievable with narrowband FDM. The criterion for the downlink method is that the number of information bits to be demodulated and decoded shall be large over the time during which the fading component of the channel can be considered static, that is about 200 uS at 2.5 GHz and a vehicle speed of 100 Km/Hr. Thus the information rate needs to be a couple of orders higher than 5 Kb/s and with, for example, a ⅓ mean coding rate the transmitted bit rate needs to be greater than 1.5 Mb/s, which will pass through a 1 MHz bandwidth channel using quaternary modulation. The capacity provided by systems based on the foregoing techniques is of the order of 100 Erlangs per MHz per spot area using a 4 Kb/s vocoder or 166 Erlangs per MHz per spot using a 2.4 Kb/s vocoder.

One exemplary technique for implementing the above-described re-use scheme of the present invention is by means of ground-based beam-forming, as described earlier in this specification. This involves providing feeder links to carry the signal for each antenna feed from the central ground station to the satellite in such a way that the relative phase and amplitude differences between the signals is preserved. Using such a coherent transponder, only one transponder channel is needed on the satellite per antenna feed point.

An alternative means of implementing the present invention for the fixed-beam case disclosed is set forth below, which avoids the need for coherent feeder links at the expense of more hardware on the satellite. The use of on-board beam forming is simplest if it is fixed and not variable, which may be more suited to a geostationary satellite that illuminates fixed areas. For a non-geostationary satellite this exemplary embodiment of the present invention can still be employed, but it is not then so easy to obtain the advantage of systematically adapting the beam forming to compensate for satellite motion so that beams illuminate fixed areas.

Figure 37:
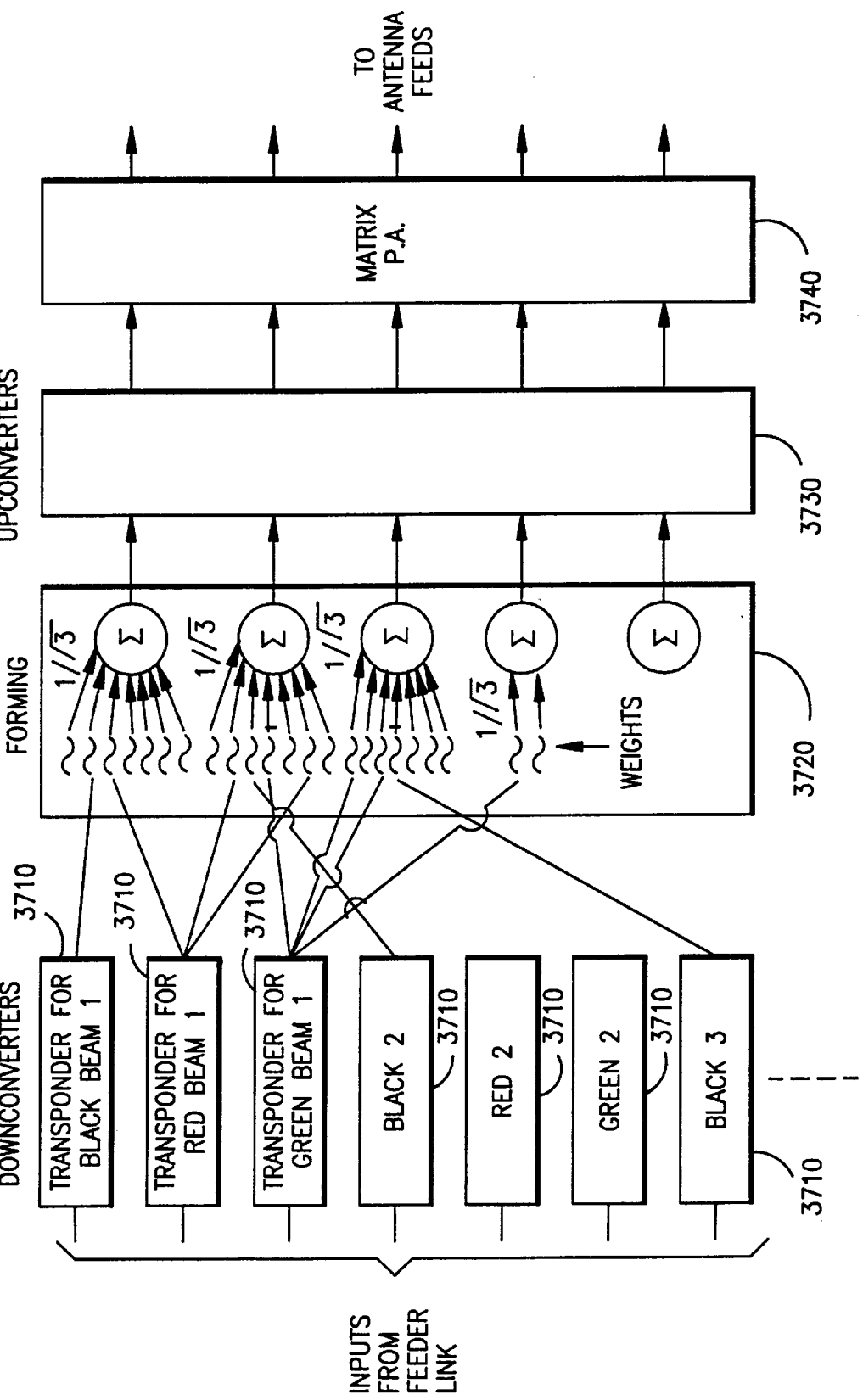
FIG. 37 is a block diagram of a fixed beam forming apparatus according to yet another exemplary embodiment of the present invention.

The implementation of the fixed beam-forming transponder is shown in FIG. 37 for the FDMA case, i.e., the total available bandwidth is divided into N sub-bands, each of which is used to illuminate areas on the ground according to a cellular re-use pattern such as shown in FIG. 35. The case of three sub-bands—designated black, red and green as per FIG. 35—is used by way of illustration.

A set of transponder channels 37 receive signals from a corresponding set of feeder links and downconvert them to a suitable intermediate frequency for amplification and filtering. The I.F. outputs of 3710 are applied to I.F. beam-forming network 3720 which forms weighted combinations of the I.F. signals. The "black" channels are arbitrarily chosen to correspond directly to unmodified antenna patterns, i.e., black signal 1 shall be radiated directly and only through antenna feed number 1; black signal 2 shall be radiated only through antenna feed number 2, etc. The beam-forming network thus connects black channels with unity weighting into only that summing network corresponding to the designated antenna feed.

The red channels and green channels however shall be radiated with a beam pattern centered midway between three black beams. The red beam that shall lie midway between black beams 1, 2 and 3 is thus connected to their associated three summing networks through voltage/current weightings of 1/root(3) (power weightings of ⅓). One third of the "red" energy is thus radiated through each of the three feeds surrounding the desired "red" center. Likewise, the green beam lying midway between black beams 2, 3 and 4 is connected via weightings of 1/root(3) to the summers associated with feeds 2, 3 and 4. The weightings quoted above are exemplary and simplified for the purposes of illustration. Since the I.F. beamforming network can in principle be realized with a network comprising mainly simple resistive elements, more complex sets of weights can be used with acceptable complexity impact. For example, a beam can be formed by feeding more than three adjacent feeds, and negative weights can be used to create nulls in the radiation pattern at desired places or otherwise to reduce the sidelobe levels in order to increase the C/I.

Figure 38:
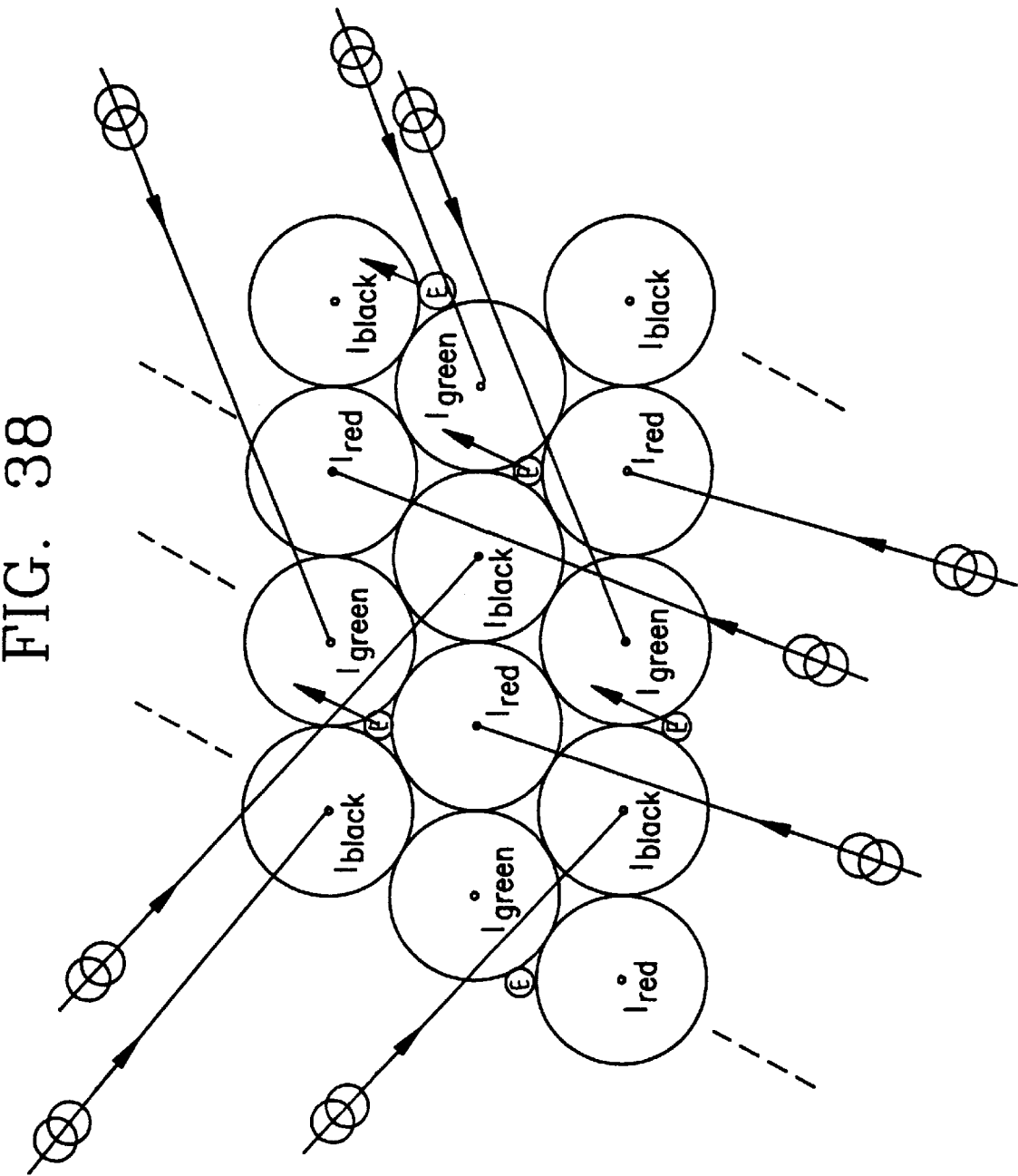
FIG. 38 is a diagram of current injection and extraction points illustrating a beam forming apparatus according to an exemplary embodiment of the present invention.

One method to form a resistive I.F. beamforming network uses a continuous sheet or thin film of resistive material deposited on an insulating substrate. This sheet is notionally regarded as corresponding to the two dimensional surface to be illuminated by the beams. Signal currents corresponding to the "black" beam signals are injected into the sheet at points disposed in correspondence to the centers of the "black" cells, while "red" and "green" signal currents are injected at sets of points midway between the black signal injection points and each other, as per FIG. 35. FIG. 38 illustrates the injection points by the labels 'I'.

Signal currents corresponding to the desired combinations of the black, red and green signals are extracted from the resistive plane by contacts disposed midway between the black, red and green injection points. These current extraction points are indicated by 'E' in FIG. 38. This technique provides the same weight distributions for the black, red and green beams, in contrast with the previous example that had single weights of 1 for the black beams and three equal weights of 1/root(3) for the red and green beams. Extracted currents are fed to "virtual earth" amplifier inputs or low-input impedance amplifiers such as grounded base bipolar transistors. The set of weights realized by this technique can be tailored by choice of the shape and size of the current injection and extraction contact lands. No simple rule is proposed for deciding the size and shape—a proposition must simply be verified by carrying out a two-dimensional finite-element computer analysis of the current flow in and potentials existing on the resistive sheet.

Once the combined signals have been produced by the I.F. beam forming network they are fed to a bank of upconvertors 3730 for frequency translation to the desired satellite-mobile frequency band. The upconvertors are all driven by the same local oscillator signal so as to preserve the relative phase of the signals, and have matched gain to preserve relative amplitudes. The upconverted signals may then be amplified by a matrix power amplifier 3740 to raise the power level to the desired transmit power.

The inventive technique described above can be extended to produce any number of virtual beams associated with subdivisions of the total frequency band available. In the three-color example, each "color" is associated with a ⅓rd sub-bandwidth. If 16.5 MHz total is available, for example, each transponder channel bandwidth can be nominally 5.5 MHz. If the number of feeds is 37, for example, 37, 5.5 MHz "black" beams are generated, 37, 5.5 MHz wide red beams and 37, 5.5 MHz green beams. Thus the total bandwidth available for communication is 37 times 16.5 MHz, as it would have been had it been possible to employ immediate frequency re-use of all 16.5 MHz in the "black" beams only. Thus the present invention provides the same efficient use of bandwidth as an immediate frequency re-use pattern but with a considerably improved C/I.

The extra capacity thus available is, in the FDMA version, obtained by increasing the number of transponder channels and thus hardware complexity proportionally. It will now be shown how an exemplary TDMA embodiment can be advantageously constructed in which the capacity increase is obtained without increased hardware complexity.

Figure 39:
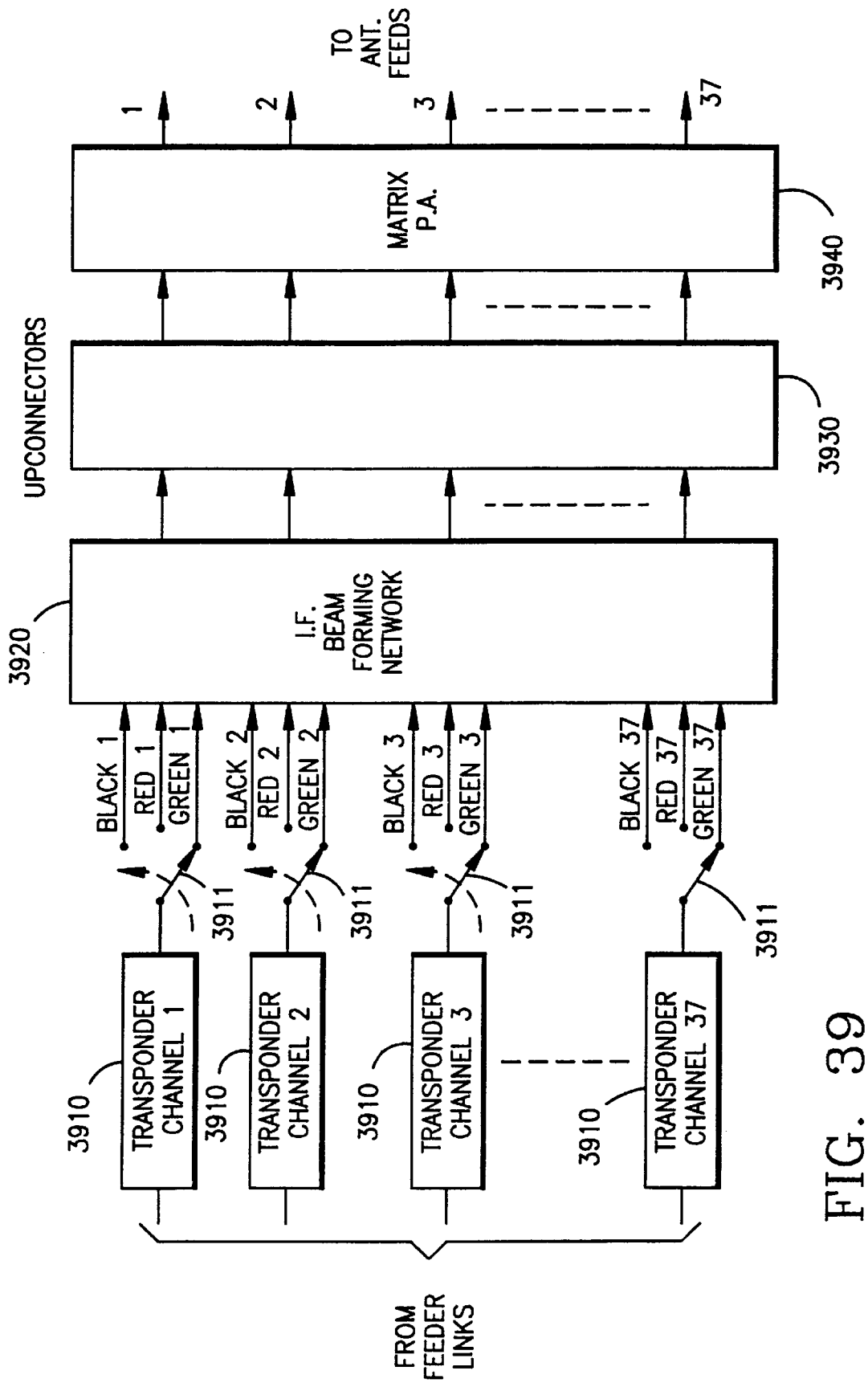
FIG. 39 illustrates an exemplary TDMA embodiment of the beam forming apparatus of FIG. 37.

FIG. 39 illustrates the exemplary TDMA embodiment. In this case the number of transponder channels 3910 is the same as the number of antenna feeds, and the bandwidth of each channel is the full bandwidth available to the system. The I.F. beam forming network 3920 also functions as previously described to synthesize black, red and green beams, but only one color is connected at a time to the set of transponder channels by virtue of the commutating switches 3911. Either (1) all transponder channels are connected to a corresponding number of "black" beam inputs, or, (2) by operating switches 3911 all at the same time, all transponders are connected to the red beam inputs, or (3), as shown in FIG. 39, to the green beam inputs.

The switches are cycled such that for a first portion of a TDMA frame period (e.g., ⅓rd) the black beams are used, for a second portion of the time the red beams are energized, and for a third portion of the time the green beams are energized. The time periods during which the switches dwell in each position do not have to be equal, and can in principle be adapted according to which color has the highest instantaneous capacity demand in any cell. The functioning of the rest of the transponder is as previously described for the FDMA case.

It will be appreciated that the commutation of switches 3911 is synchronized with transmissions from the central ground station or stations, and this can be achieved by any of a variety of techniques, such as providing an on-board clock that can be programmed form the ground to execute the regular cycle of switch operations and to synchronize the ground station transmissions to the satellite, which is the master timer. Alternatively a ground station can transmit a switch command using a control channel separate from the traffic channels. The method of achieving synchronism of the beam gyrations with the ground network is immaterial to the principle of the present invention.

It may be appreciated that, although both the TDMA and FDMA versions of the invention disclosed above used fixed beam forming networks, it is possible by an obvious extension of the method to permute the allocation of frequencies or time slots to beam colors by use of switches 3911 controlled from the ground in such a way as to keep the areas of the earth illuminated by a given frequency or time slot as nearly as possible fixed. This is of course achieved more accurately by using greater numbers of "colors" (that is timeslots or sub-bands). Increasing the number of sub-bands involves hardware complexity in the FDMA case, so the TDMA version is preferred in this respect. The phasing of the commutation switches may thus be chosen so as to compensate for satellite motion and keep the areas illuminated by a particular timeslot or frequency more or less constant. The present invention can be applied to any number of timeslots and sub-bands, and in the latter case a digital implementation comprising analog-to-digital conversion of the transponder signals, digital filtering and digital beam forming using digital weight multiplication may be advantageous.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A coherent satellite transponder for transponding a plurality of signals received from a ground station comprising:
   a corresponding plurality of receiving means for receiving said signals using frequency or phase modulation on a corresponding number of carrier frequencies and demodulating them to produce video signals;
   coherent upconverting means for translating each of said video signals to a new carrier frequency while preserving their relative amplitude and phase characteristics;
   transmitter-antenna means for amplifying each of said translated signals to a desired transmit power level and transmitting them using a corresponding antenna means.

2. A transponder according to claim 1, in which said receiving means receives approximately half of received signals using Right Hand Circular antenna polarization and the rest using Left Hand Circular polarization.

3. A transponder according to claim 2, in which corresponding carrier frequencies used by receiving means using RHC polarization are the same as those of receiving means using LHC polarization.

4. A transponder according to claim 2, in which said corresponding carrier frequencies used by receiving means using RHC polarization are interleaved between those of receiving means using LHC polarization.

5. A transponder according to claim 2, wherein said signals with Right Hand Circular polarization are offset from said signals with Left Hand Circular polarization by half a channel spacing.

6. A transponder according to claim 1, wherein said transmitter-antenna means transmits signals in a direction depending on said relative amplitude and phase characteristics.

7. A coherent satellite transponder for transponding signals received from a plurality of ground stations comprising:
   receiver-antenna means having a plurality of antenna elements for receiving combinations of said signals from said ground stations;
   coherent downconverting means for translating each of said received combinations to a corresponding at least one video signal while preserving relative phase and amplitude characteristics between said combinations of said signals received by said plurality of antenna elements;
   transmitter-modulator means for modulating each of said video signals onto a corresponding carrier frequency using frequency or phase modulation, amplifying them to desired transmit power levels and transmitting them using transmit antenna means.

8. A transponder according to claim 7, in which said transmitter-modulator means transmits approximately half of received signals using Right Hand Circular antenna polarization and the rest using Left Hand Circular polarization.

9. A transponder according to claim 8 in which corresponding carrier frequencies for said RHC polarized transmissions are the same as those for LHC transmissions.

10. A transponder according to claim 8 in which corresponding carrier frequencies for said RHC polarized transmissions lie interleaved between those of LHC transmissions.

11. A transponder according to claim 8, wherein said signals with Right Hand Circular polarization are offset from said signals with Left Hand Circular polarization by half a channel spacing.

12. A transponder according to claim 8, including a first set of voltage controlled oscillators for processing signals which are subject to Left Hand Circular polarization, and a second set of voltage controlled oscillators for processing signals which are subject to Right Hand Circular polarization.

13. A transponder according to claim 12, including a first summer for summing signals processed by said first set of oscillators, and a second summer for summing signals processed by said second set of oscillators.

14. A transponder according to claim 13, including a first amplifier for amplifying a summed signal output from said first summer, and a second amplifier for amplifying a summed signal output from said second summer.

15. A transponder according to claim 14, including a polarized horn antenna for receiving an output from said first and second amplifiers.

16. A transponder according to claim 7, wherein said downconverting means preserves the relative phase and amplitude characteristics between signals received on a same frequency.

* * * * *